(12) United States Patent
Shin et al.

(10) Patent No.: US 11,227,516 B1
(45) Date of Patent: Jan. 18, 2022

(54) FLEXIBLE DISPLAY DEVICE

(71) Applicant: LG ELECTRONICS INC., Seoul (KR)

(72) Inventors: A Ram Shin, Seoul (KR); Sung Lyong Cha, Seoul (KR); Dong Jun Choi, Seoul (KR); Gil-Jae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/085,336

(22) Filed: Oct. 30, 2020

(51) Int. Cl.
*G06F 1/16* (2006.01)
*G06F 1/18* (2006.01)
*G09F 9/30* (2006.01)

(52) U.S. Cl.
CPC ............ *G09F 9/301* (2013.01); *G06F 1/1652* (2013.01); *G06F 1/181* (2013.01)

(58) Field of Classification Search
CPC ......... G09F 9/301; G06F 1/1652; G06F 1/181
See application file for complete search history.

(56) References Cited

U.S. PATENT DOCUMENTS

| | | | | |
|---|---|---|---|---|
| 9,678,539 B2* | 6/2017 | Hayk | ............. | G06F 1/1652 |
| 11,029,733 B2* | 6/2021 | Lee | ............. | G09F 9/301 |
| 2010/0093410 A1 | 4/2010 | Cho et al. | | |
| 2013/0058063 A1* | 3/2013 | O'Brien | ............. | G06F 1/1652 |
| | | | | 361/807 |
| 2015/0153777 A1* | 6/2015 | Liu | ............. | G06F 1/1652 |
| | | | | 345/173 |
| 2016/0179141 A1* | 6/2016 | Kim | ............. | G06F 1/1652 |
| | | | | 361/749 |
| 2016/0216737 A1* | 7/2016 | Hayk | ............. | G06F 1/1626 |
| 2016/0324021 A1* | 11/2016 | Takayanagi | ............. | G06F 1/1652 |
| 2019/0268455 A1* | 8/2019 | Baek | ............. | G06F 1/1652 |
| 2020/0348727 A1* | 11/2020 | Lee | ............. | G06F 1/1626 |
| 2021/0181801 A1* | 6/2021 | Yin | ............. | H04M 1/0237 |

FOREIGN PATENT DOCUMENTS

| | | |
|---|---|---|
| KR | 100837192 | 6/2008 |
| KR | 101170476 | 8/2012 |
| KR | 1020180038605 | 4/2018 |
| KR | 1020200011099 | 2/2020 |

OTHER PUBLICATIONS

PCT International Application No. PCT/KR2020/010504, International Search Report dated Apr. 29, 2021, 3 pages.

* cited by examiner

*Primary Examiner* — Rockshana D Chowdhury
(74) *Attorney, Agent, or Firm* — Lee, Hong, Degerman, Kang & Waimey PC

(57) ABSTRACT

A flexible display device is disclosed. The flexible display device includes a first body, a second body, a flexible display, a first wheel, and a second wheel. The first wheel and the second wheel may be rotatably coupled to the first body. A lateral surface of the first wheel comes into contact with a first rolling surface of the second body in a first contact direction, and a lateral surface of the second wheel comes into contact with a second rolling surface of the second body in a second contact direction, wherein the first contact direction and the second contact direction are symmetrical to each other about a reference surface. When the second body moves relative to the first body in a first direction or in a direction opposite to the first direction, the first wheel and the second wheel roll on the first rolling surface and the second rolling surface.

20 Claims, 25 Drawing Sheets

[FIG. 1]
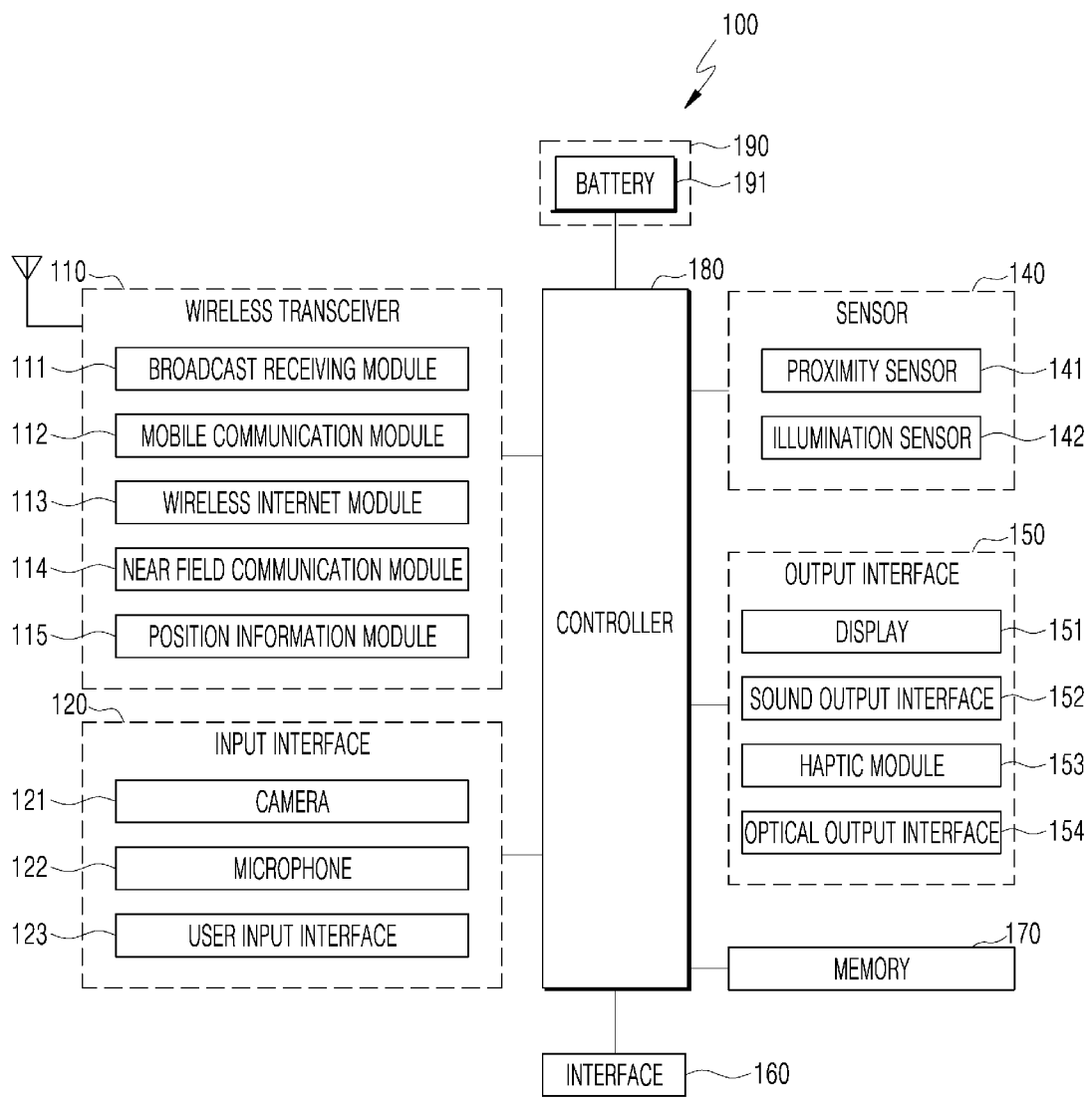

[FIG. 2a]
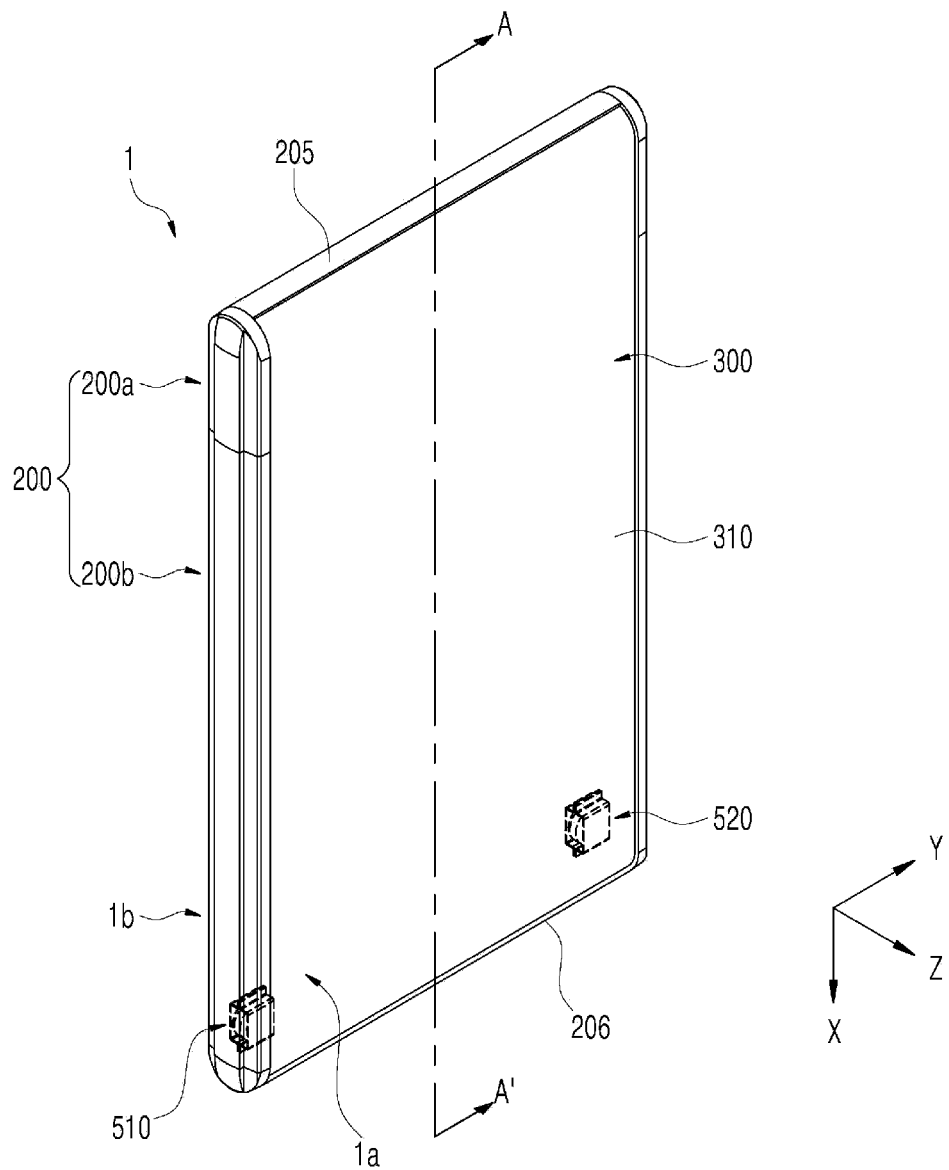

[FIG. 2b]
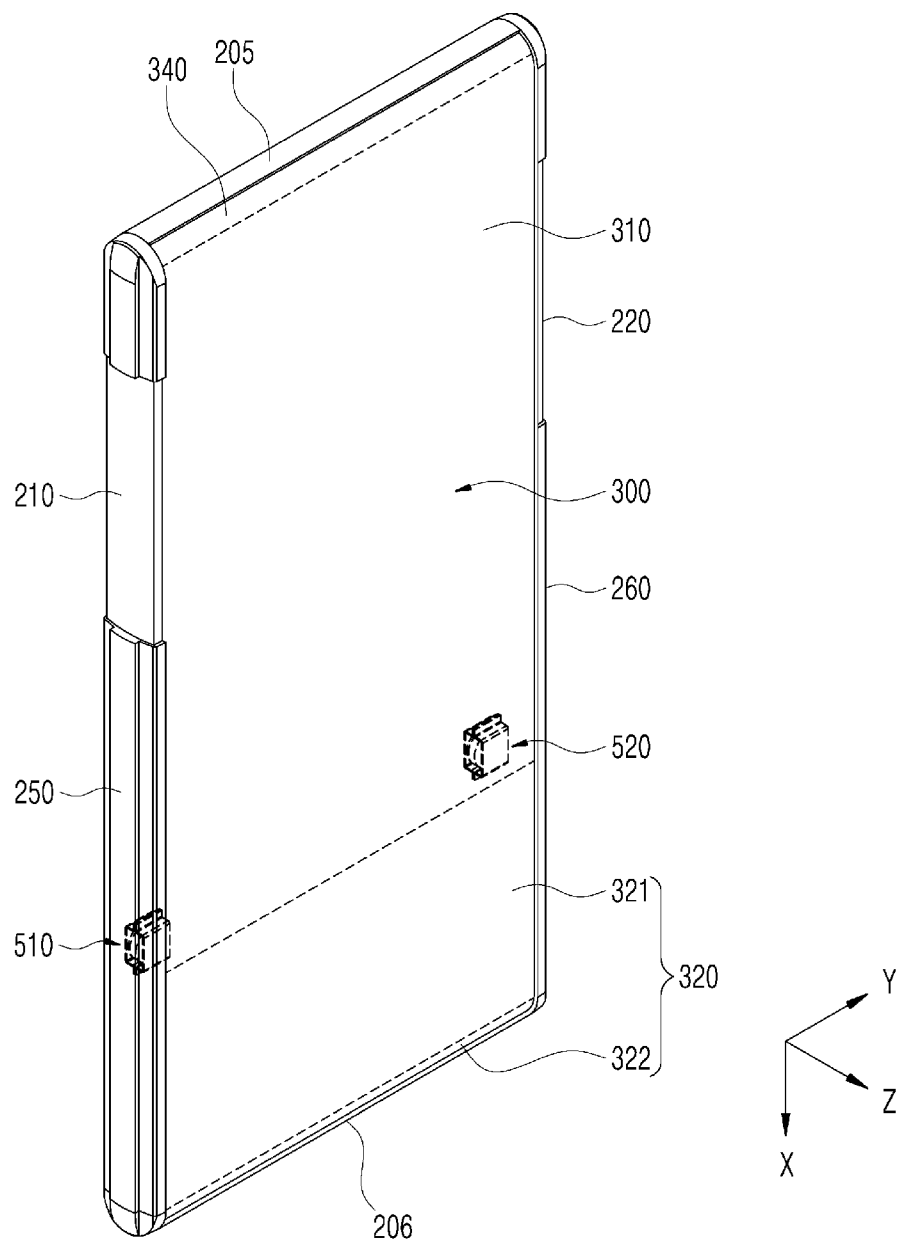

[FIG. 3a]
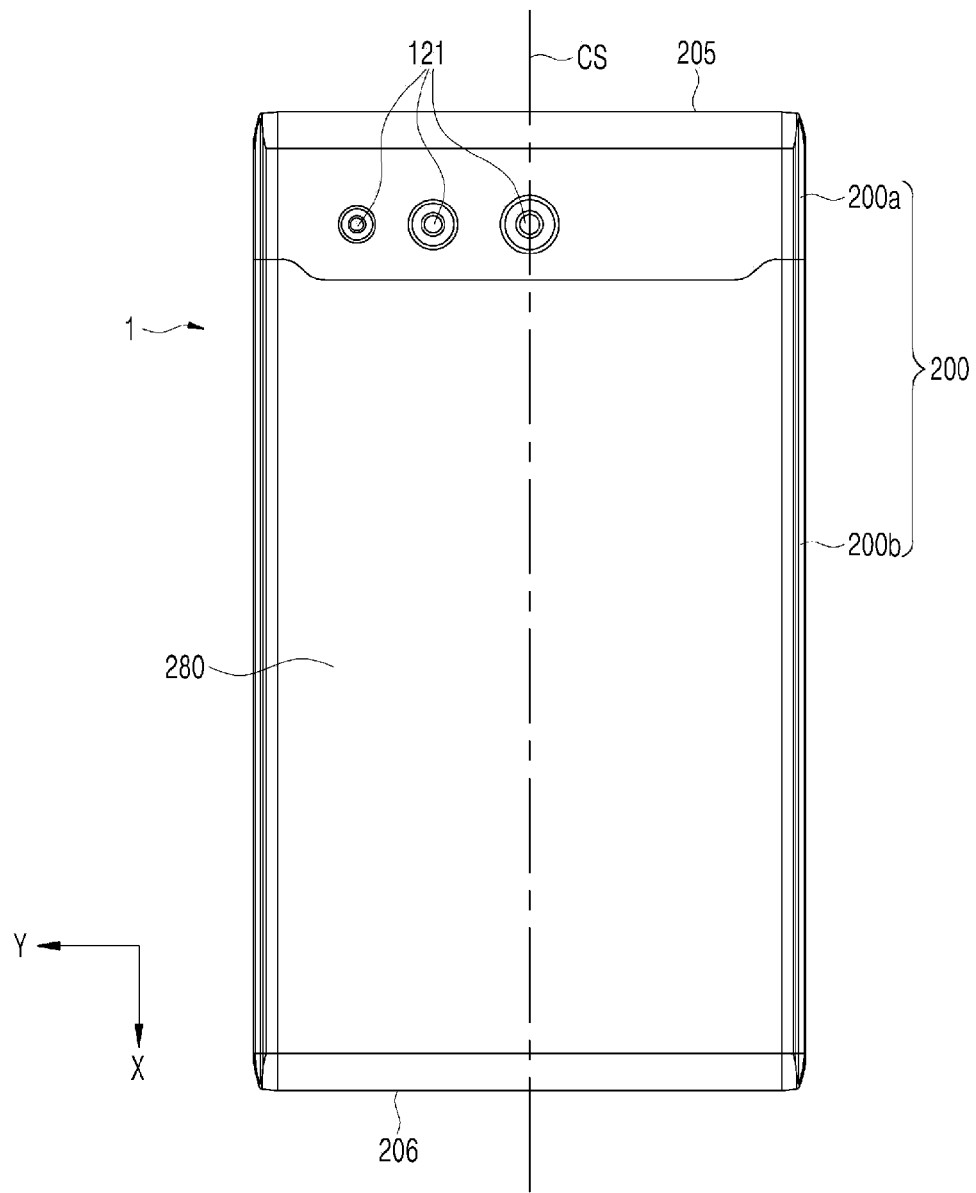

[FIG. 3b]
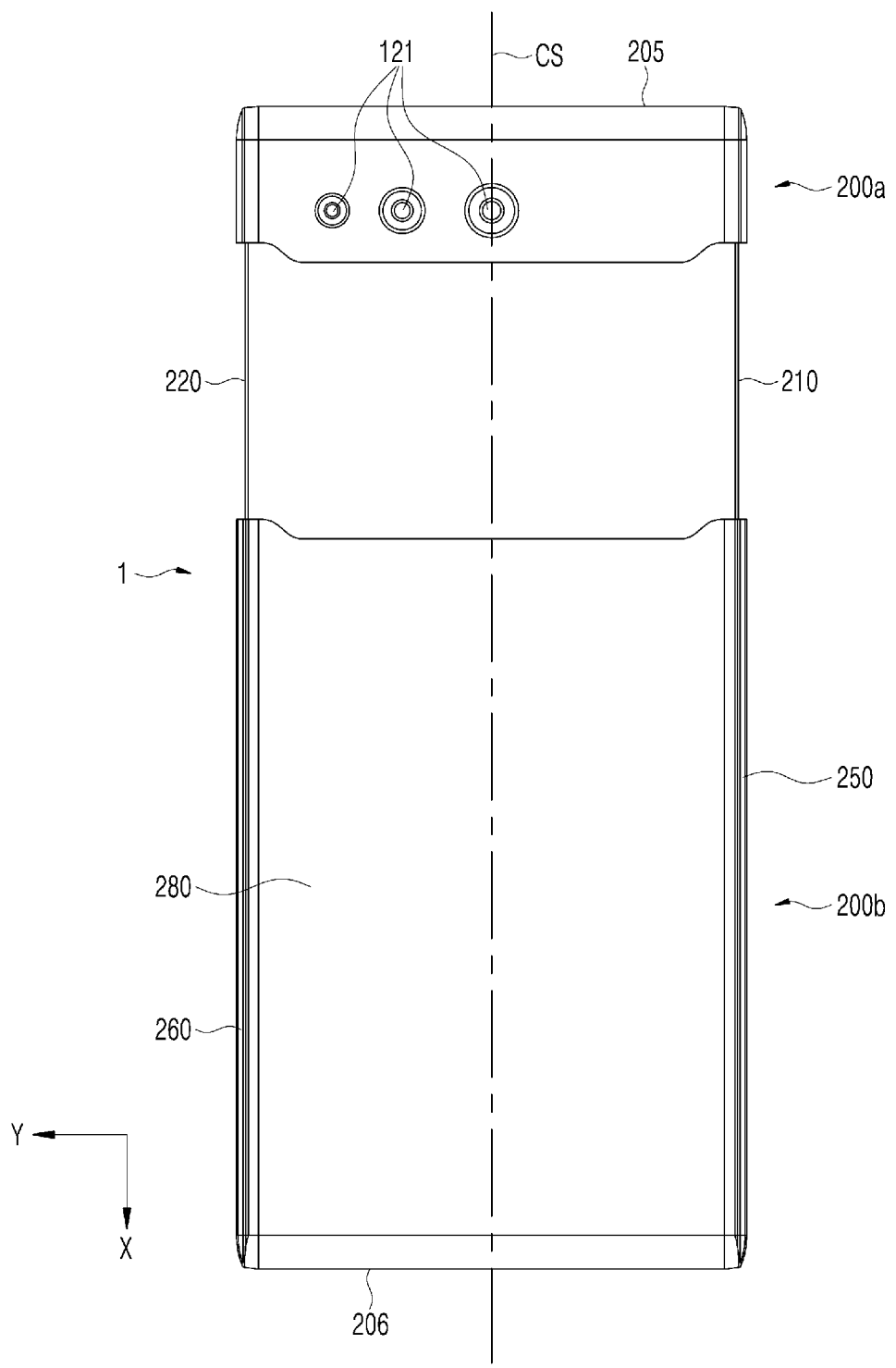

[FIG. 4]
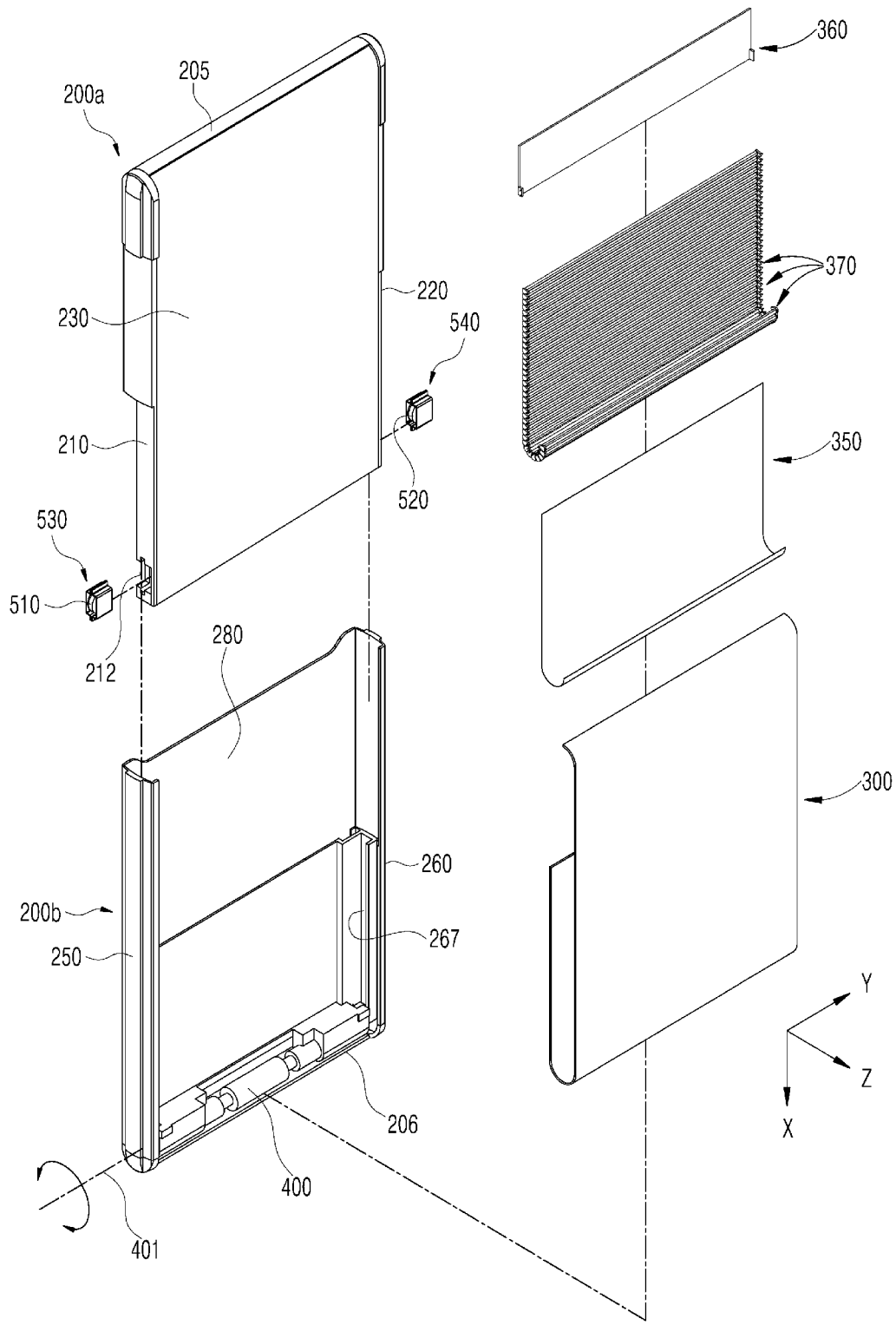

[FIG. 5a]
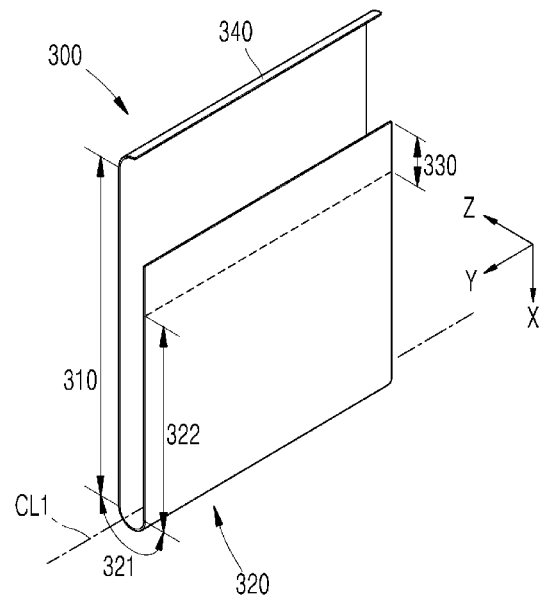
[FIG. 5b]
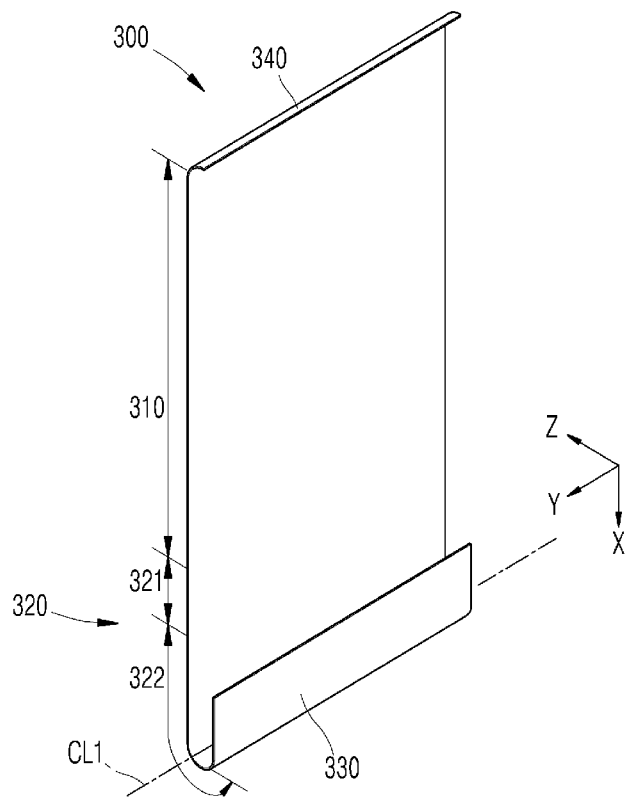

[FIG. 6a]
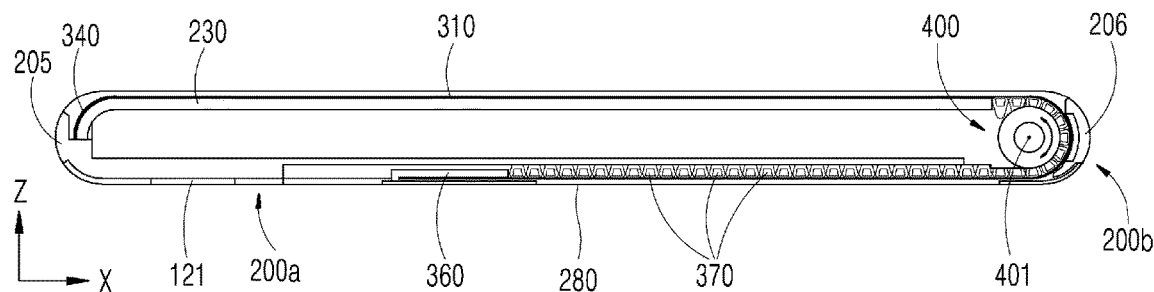
[FIG. 6b]
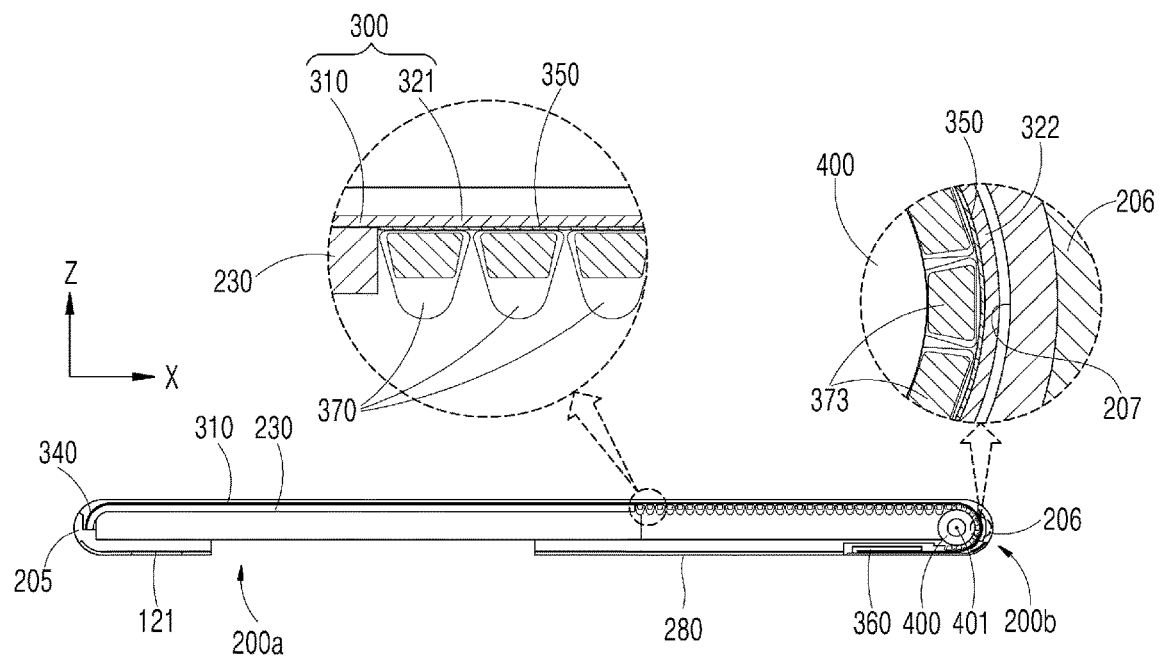

[FIG. 7a]
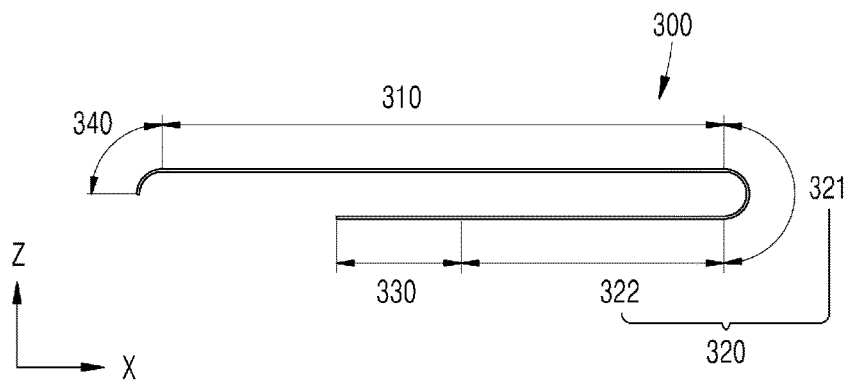
[FIG. 7b]
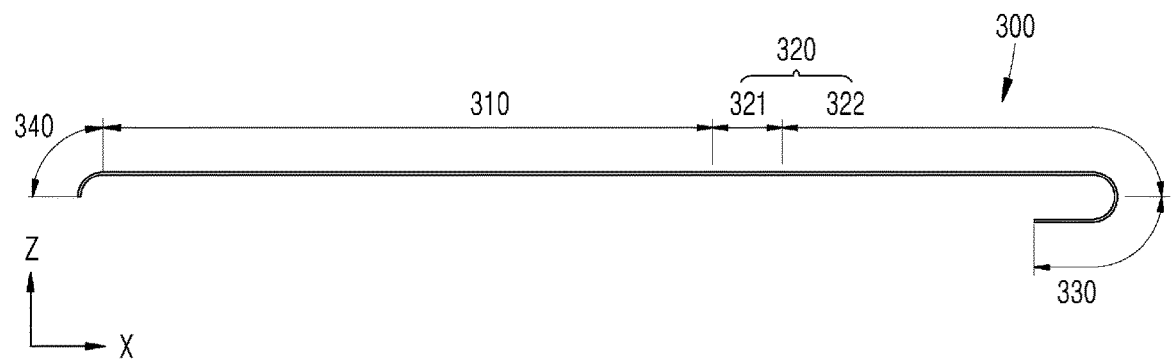
[FIG. 8a]
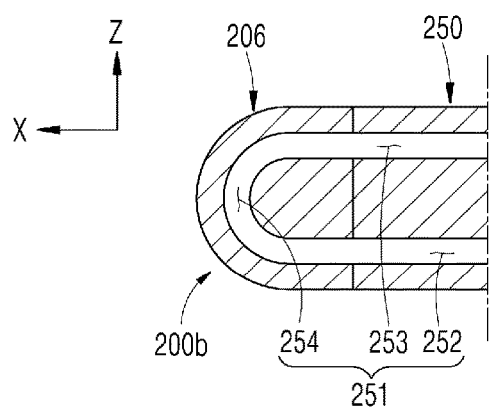

[FIG. 8b]
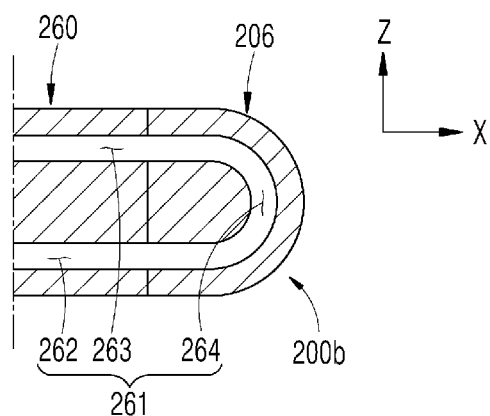
[FIG. 9]
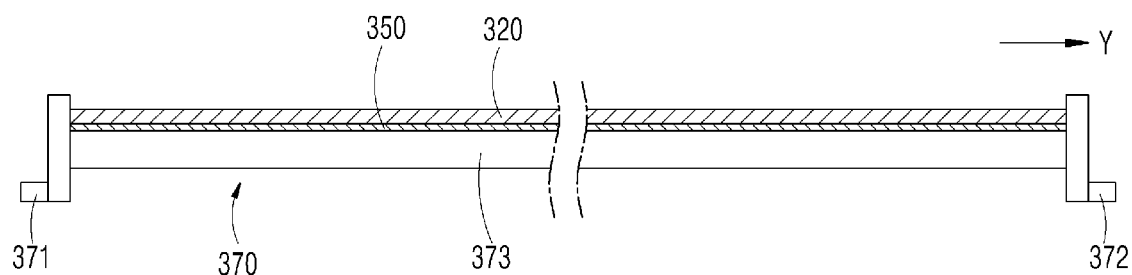

[FIG. 10a]
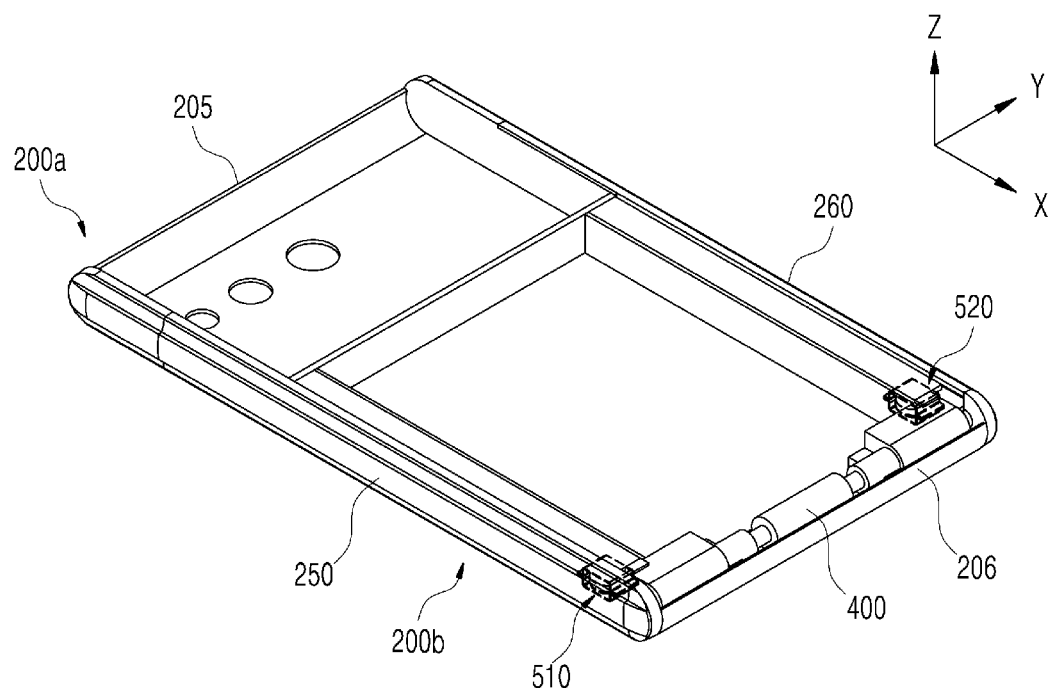

[FIG. 10b]
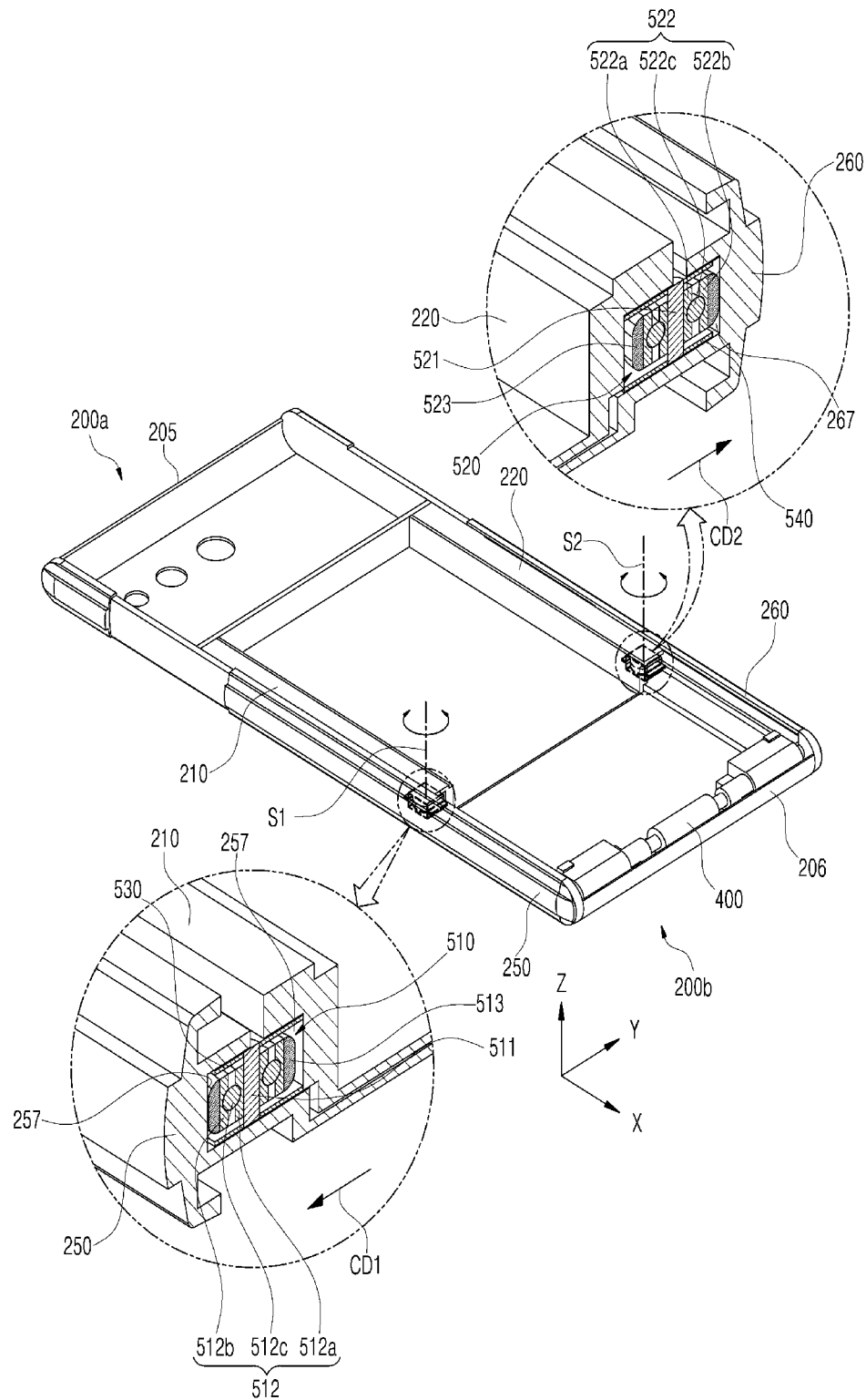

[FIG. 11a]
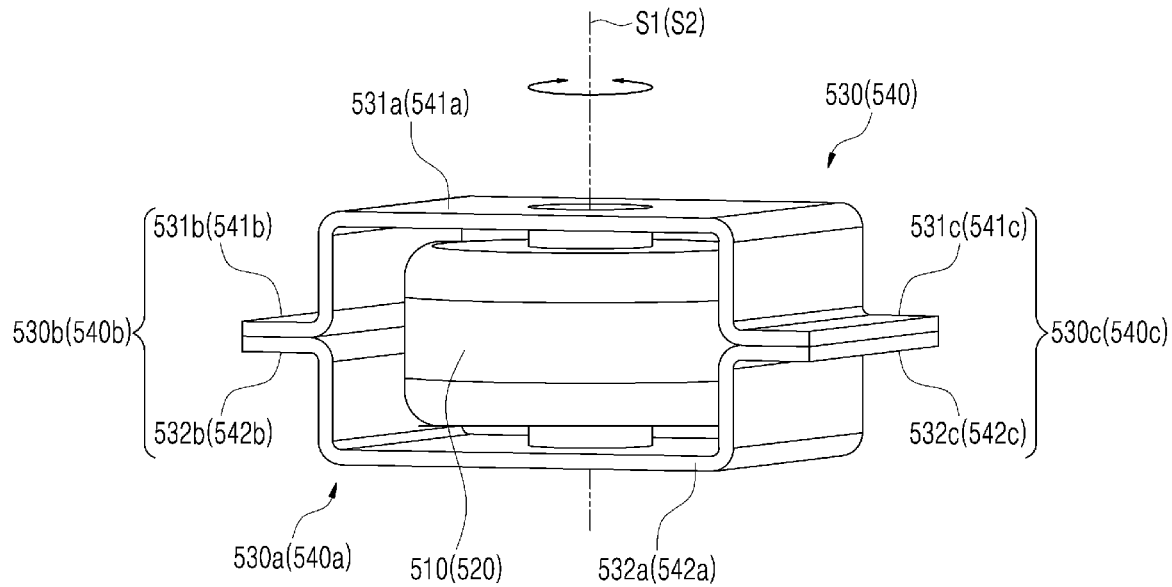
[FIG. 11b]
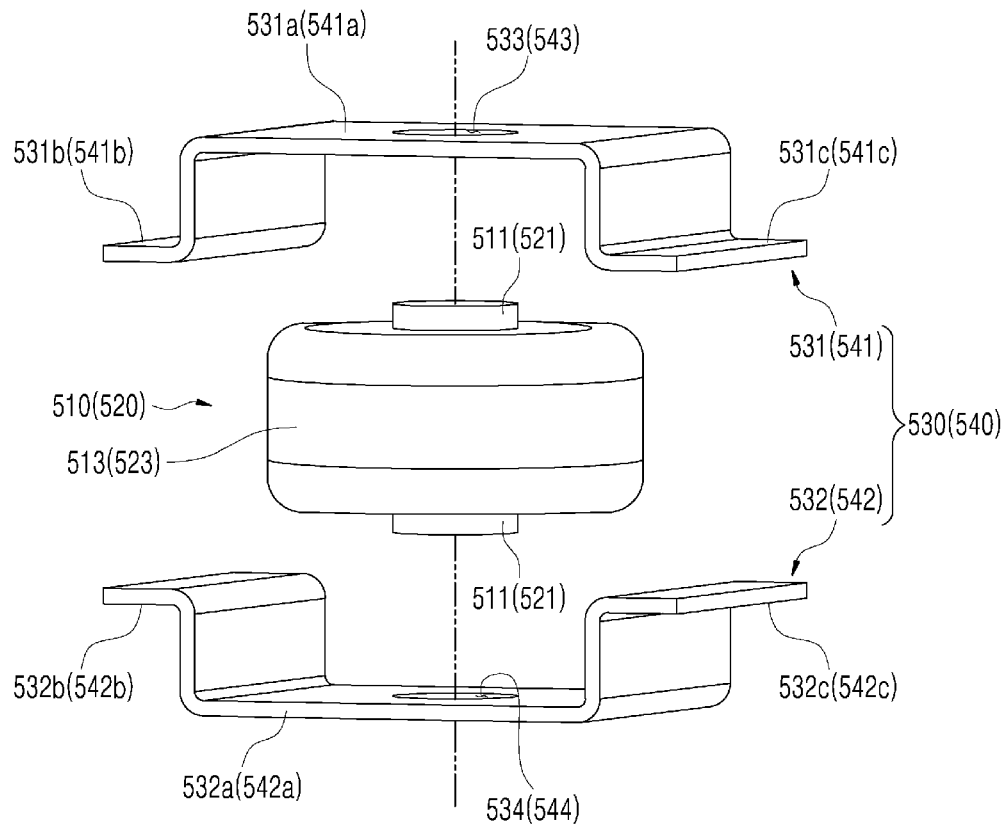

[FIG. 11c]
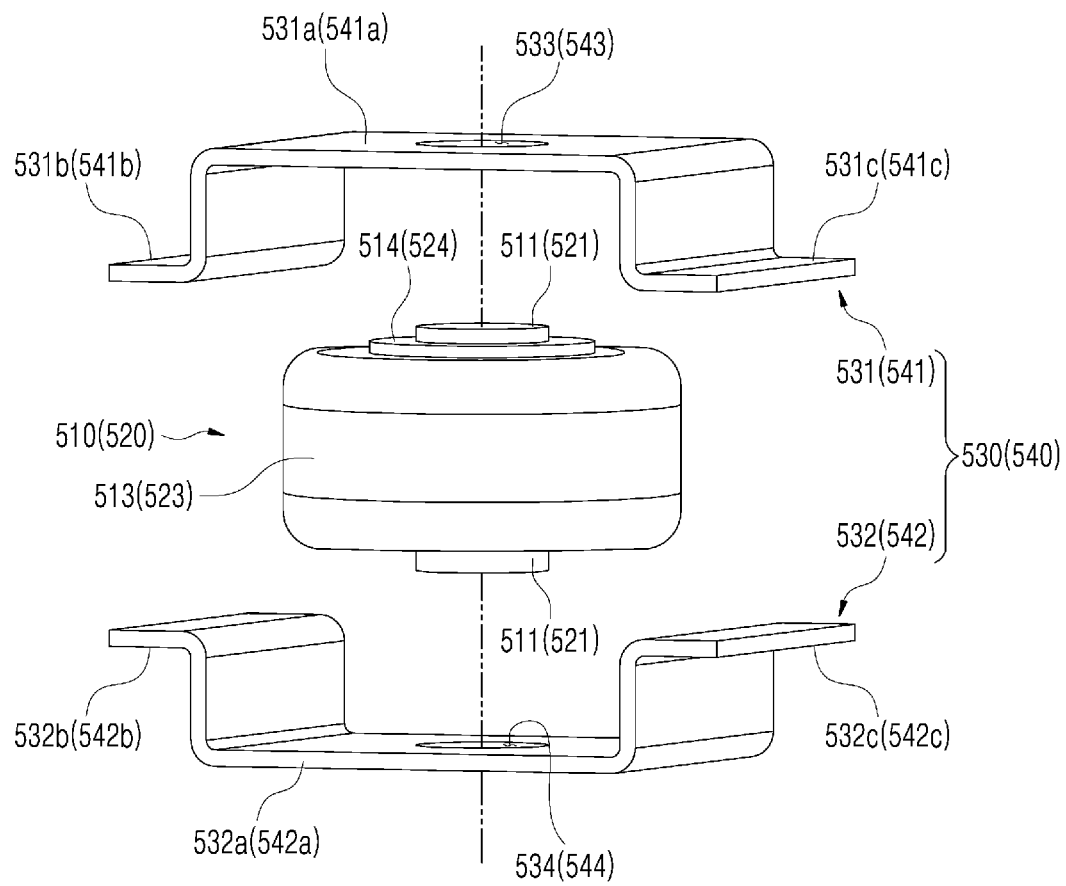
[FIG. 11d]
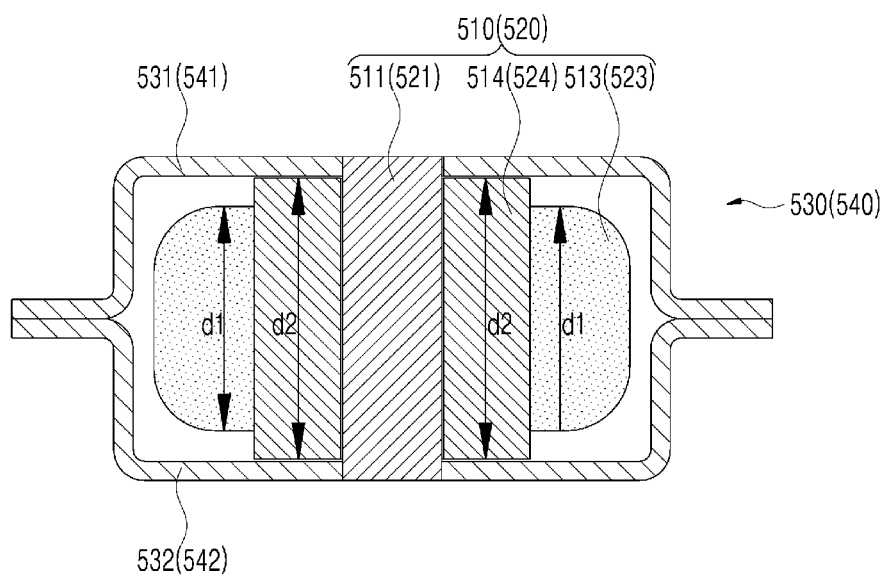

[FIG. 12a]
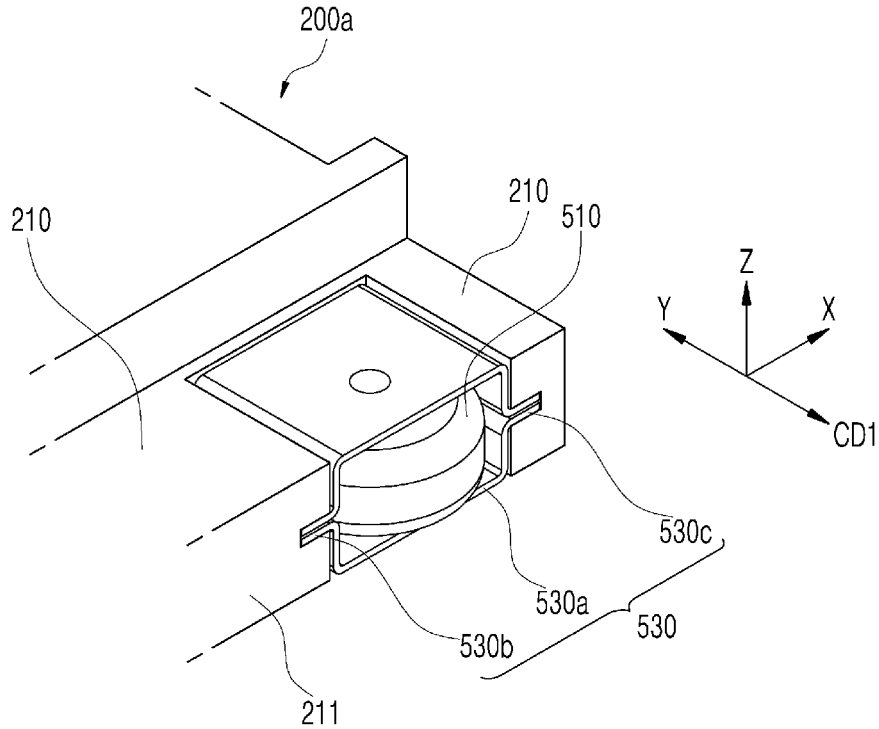
[FIG. 12b]
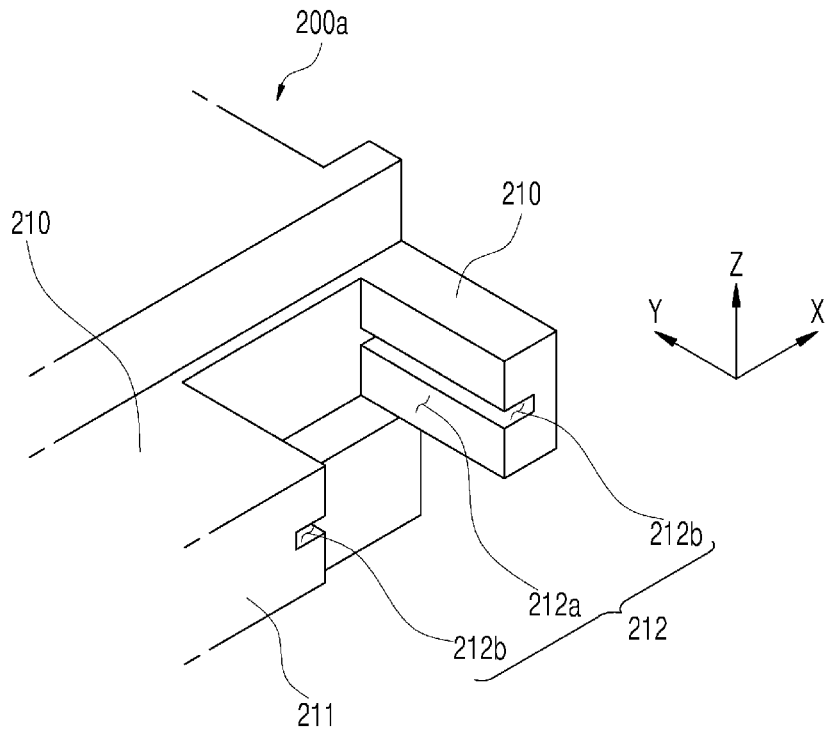

[FIG. 12c]
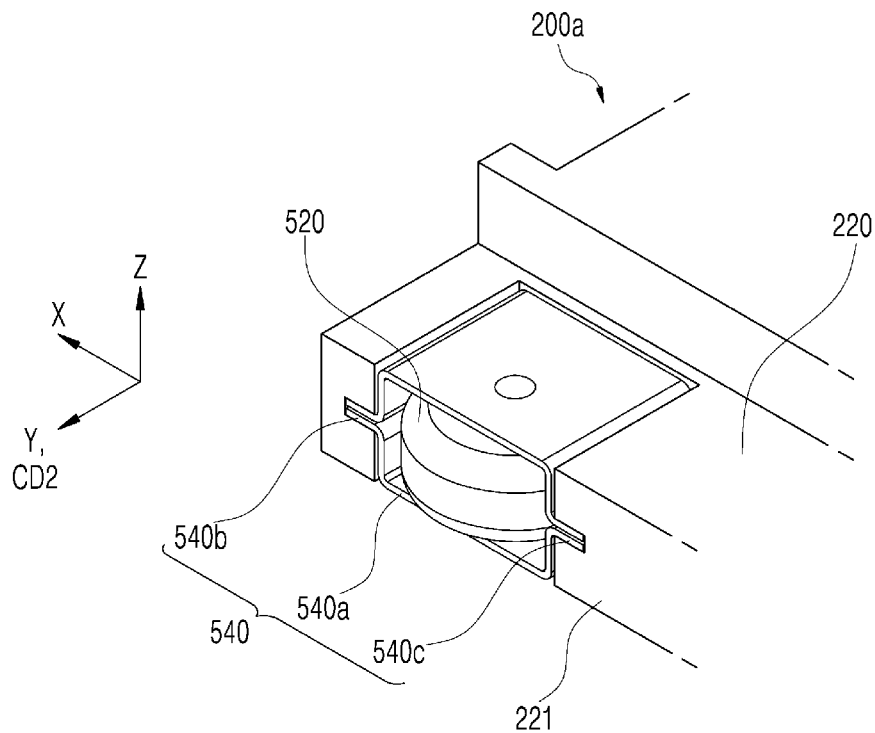
[FIG. 12d]
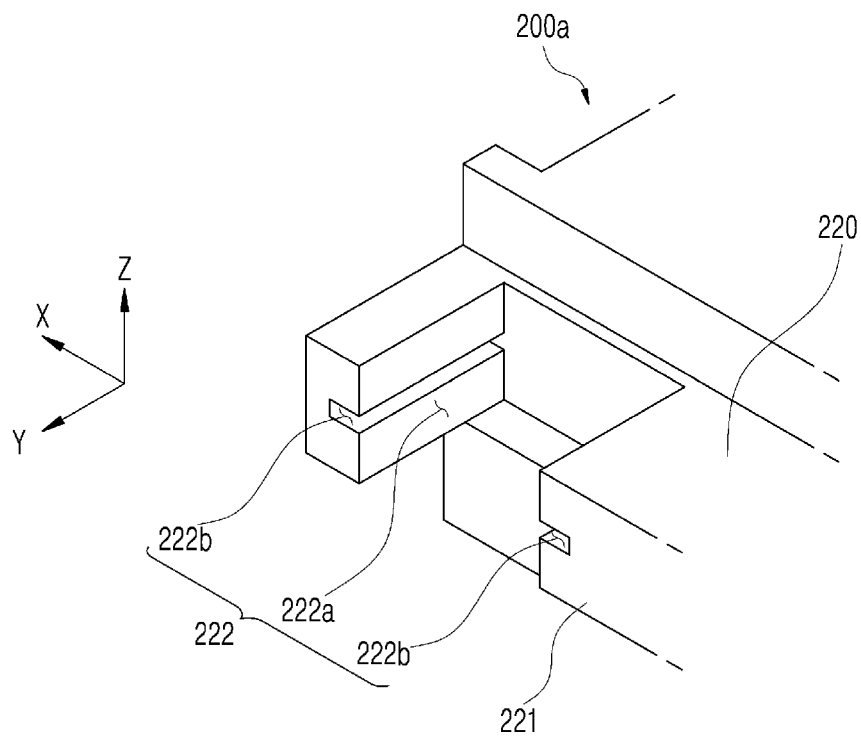

[FIG. 13]
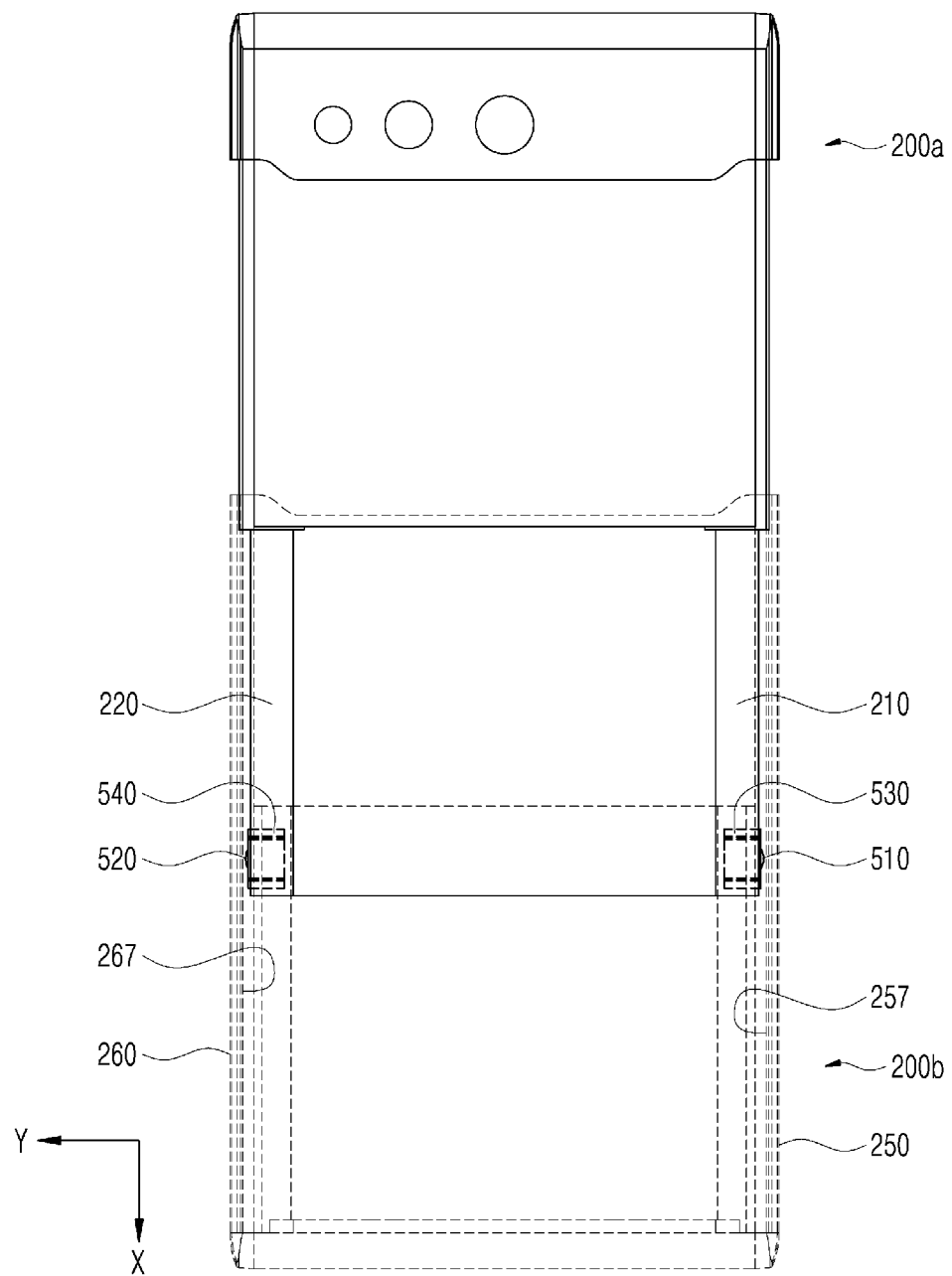

[FIG. 14]
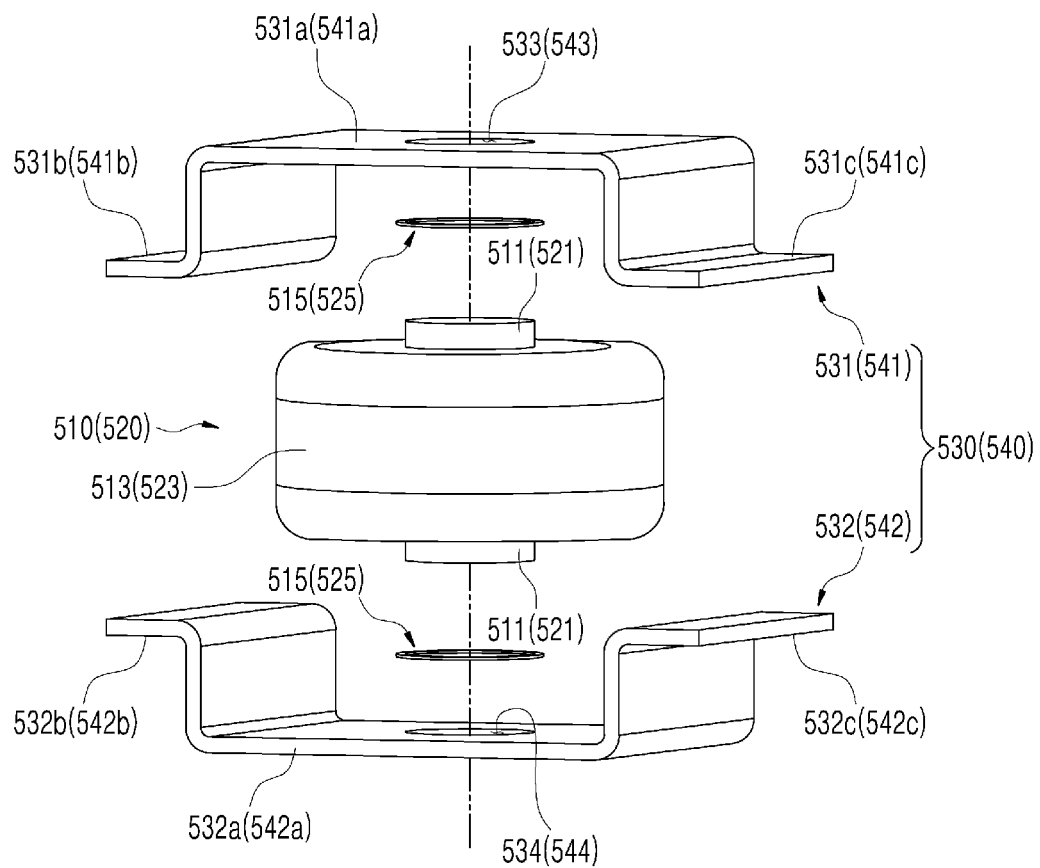

[FIG. 15a]
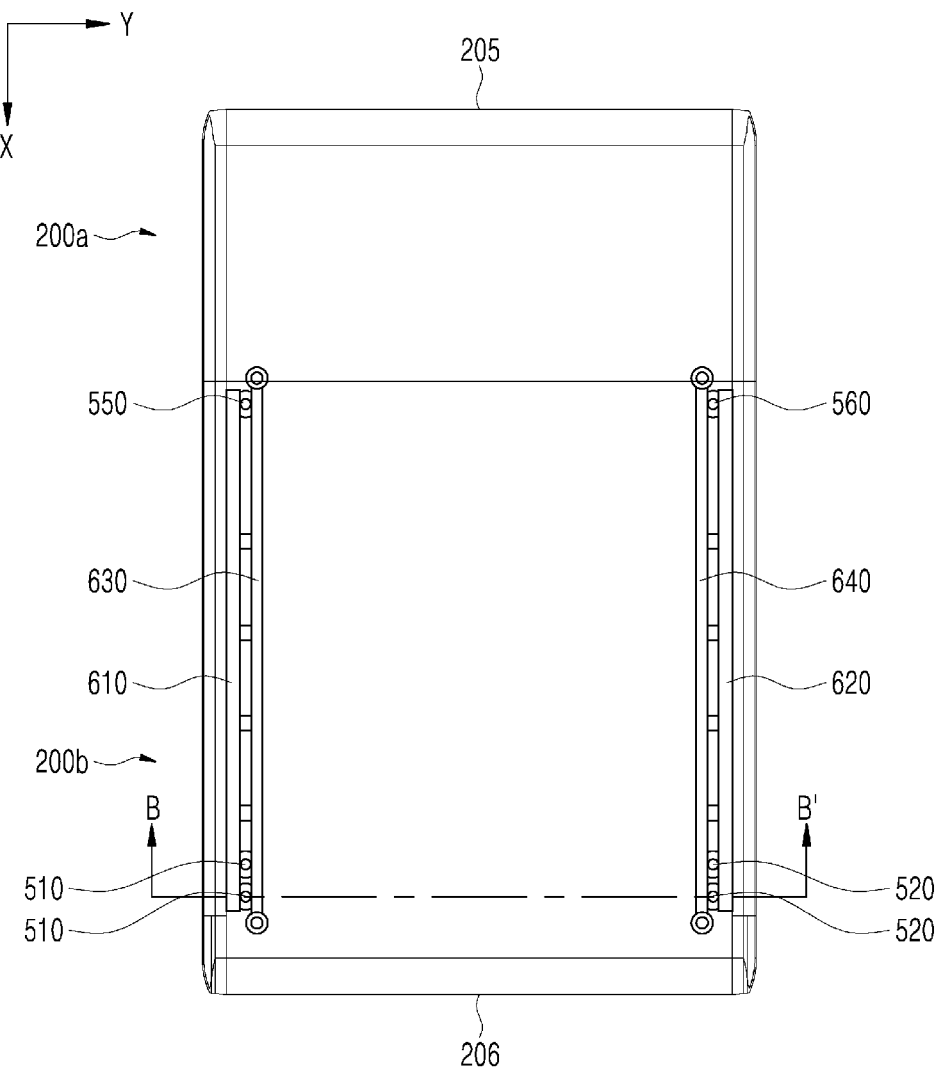

[FIG. 15b]
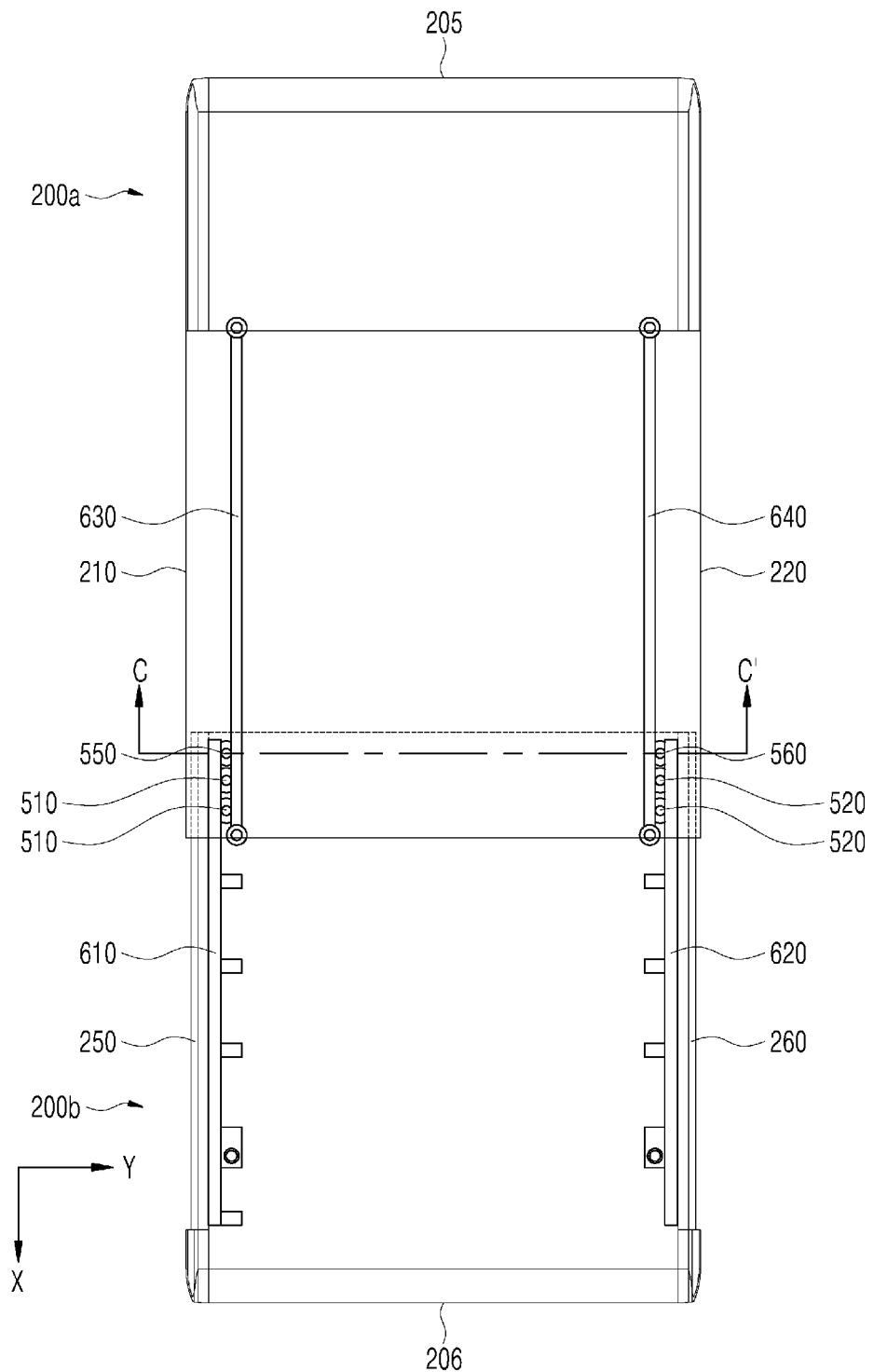

[FIG. 16a]
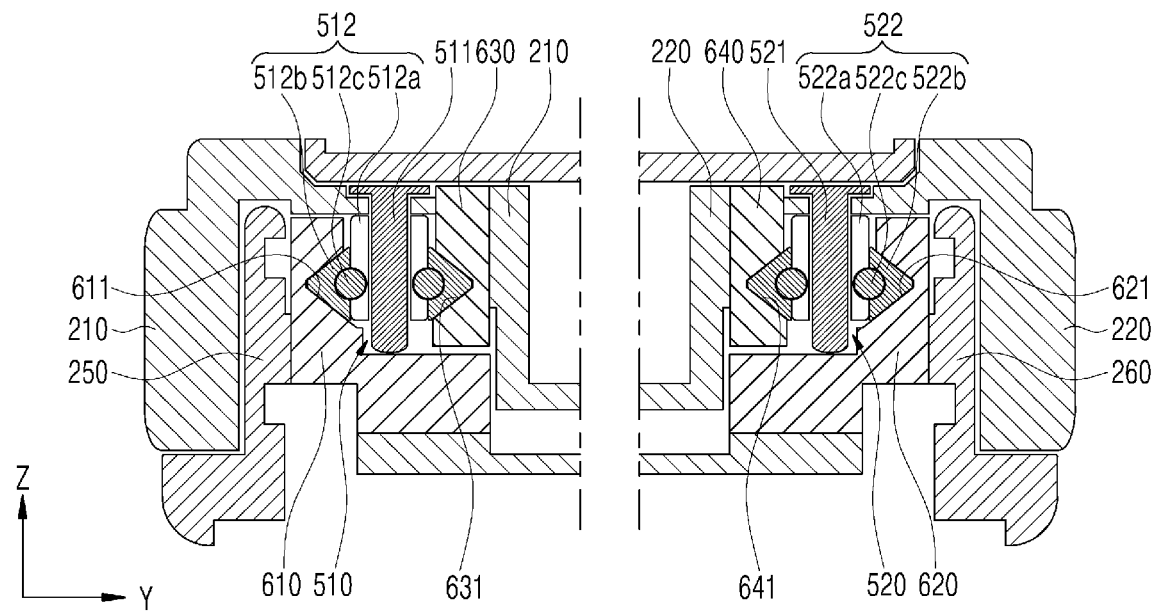
[FIG. 16b]
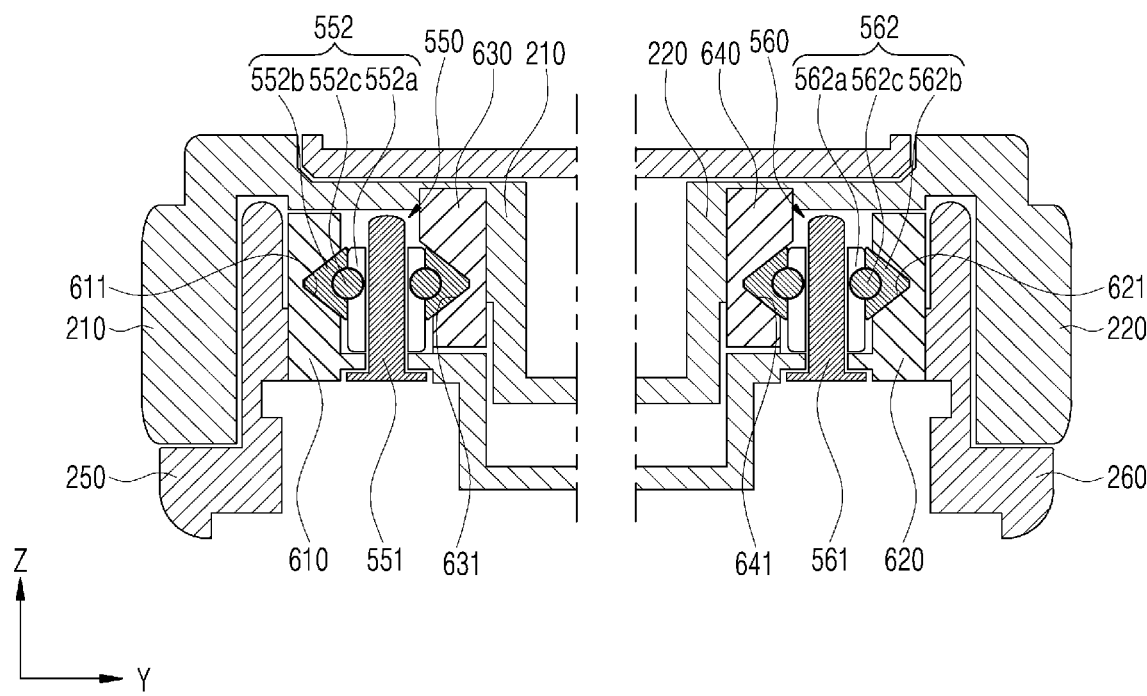

[FIG. 17a]
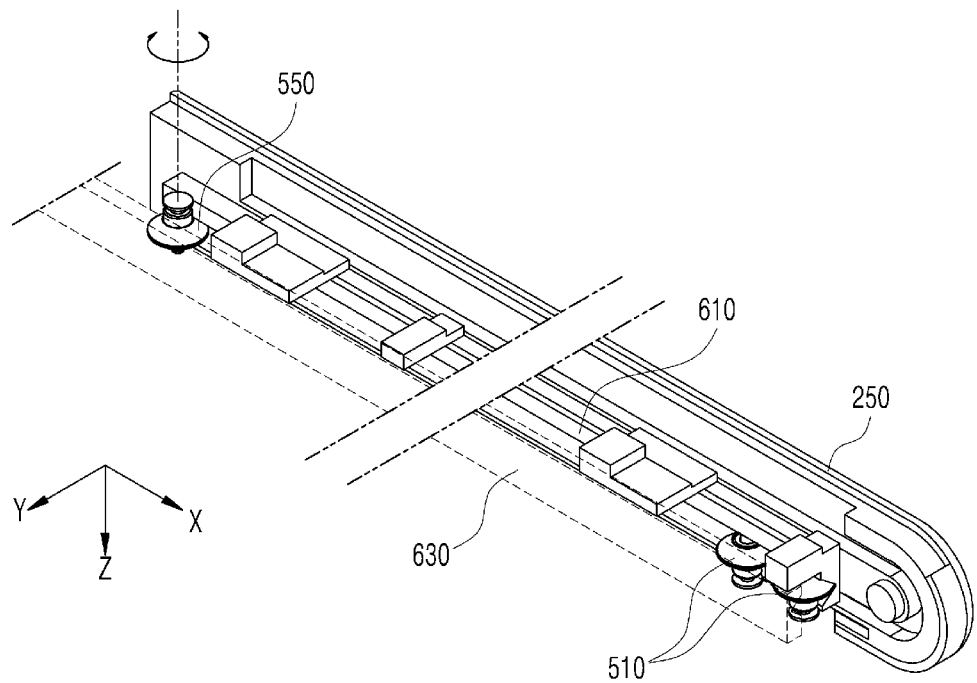
[FIG. 17b]
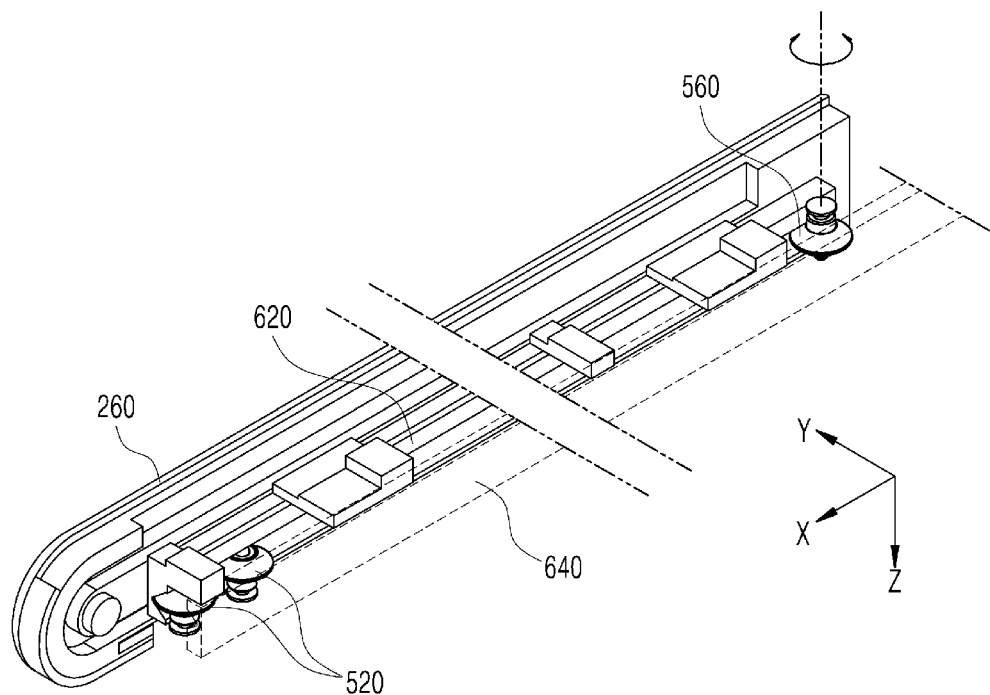

[FIG. 17c]
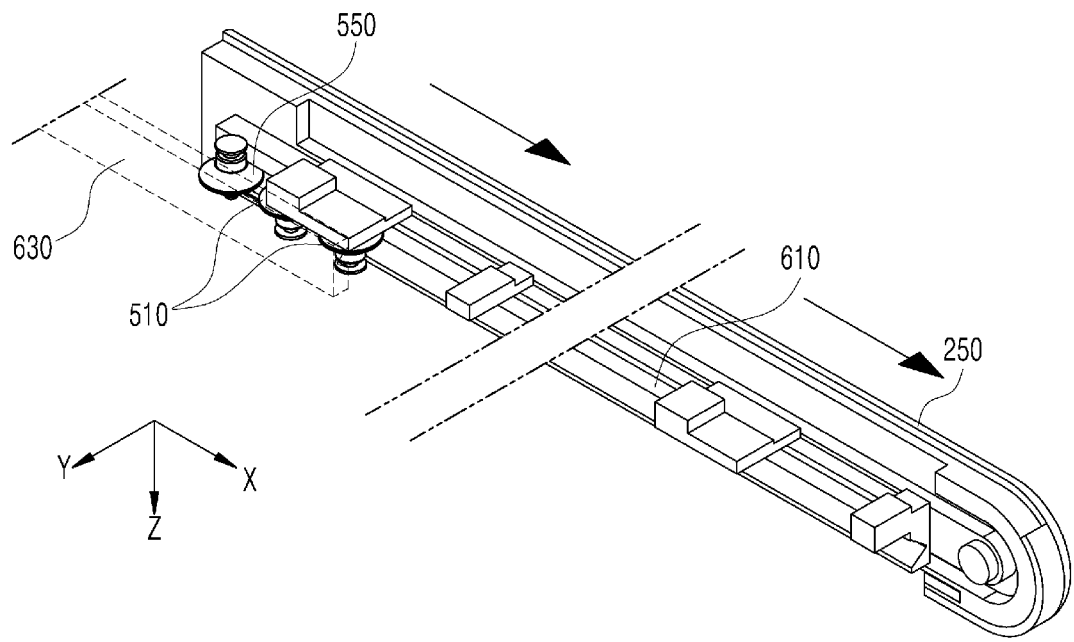
[FIG. 17d]
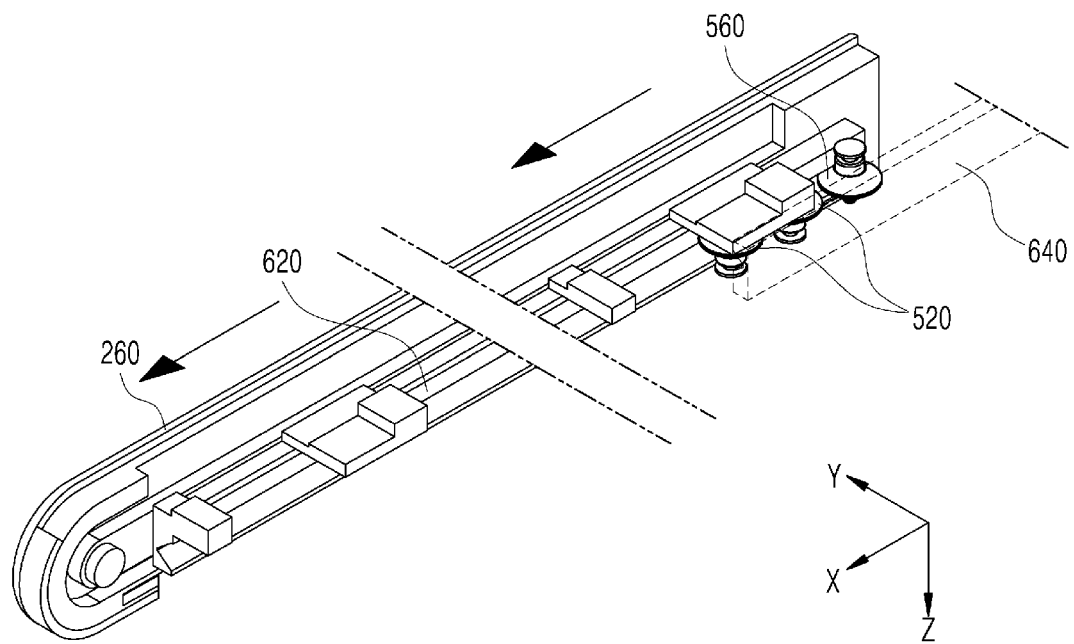

[FIG. 18a]
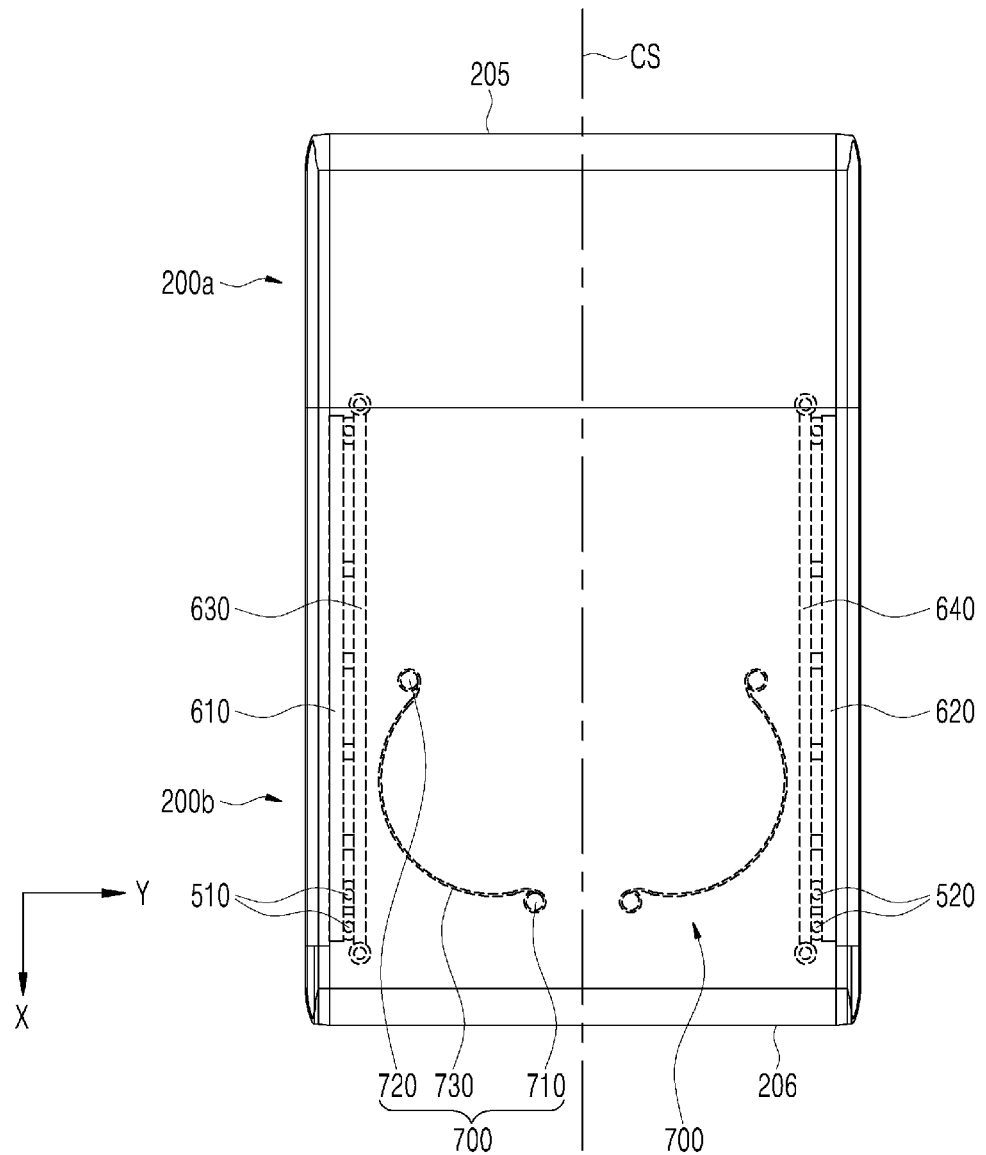

[FIG. 18b]
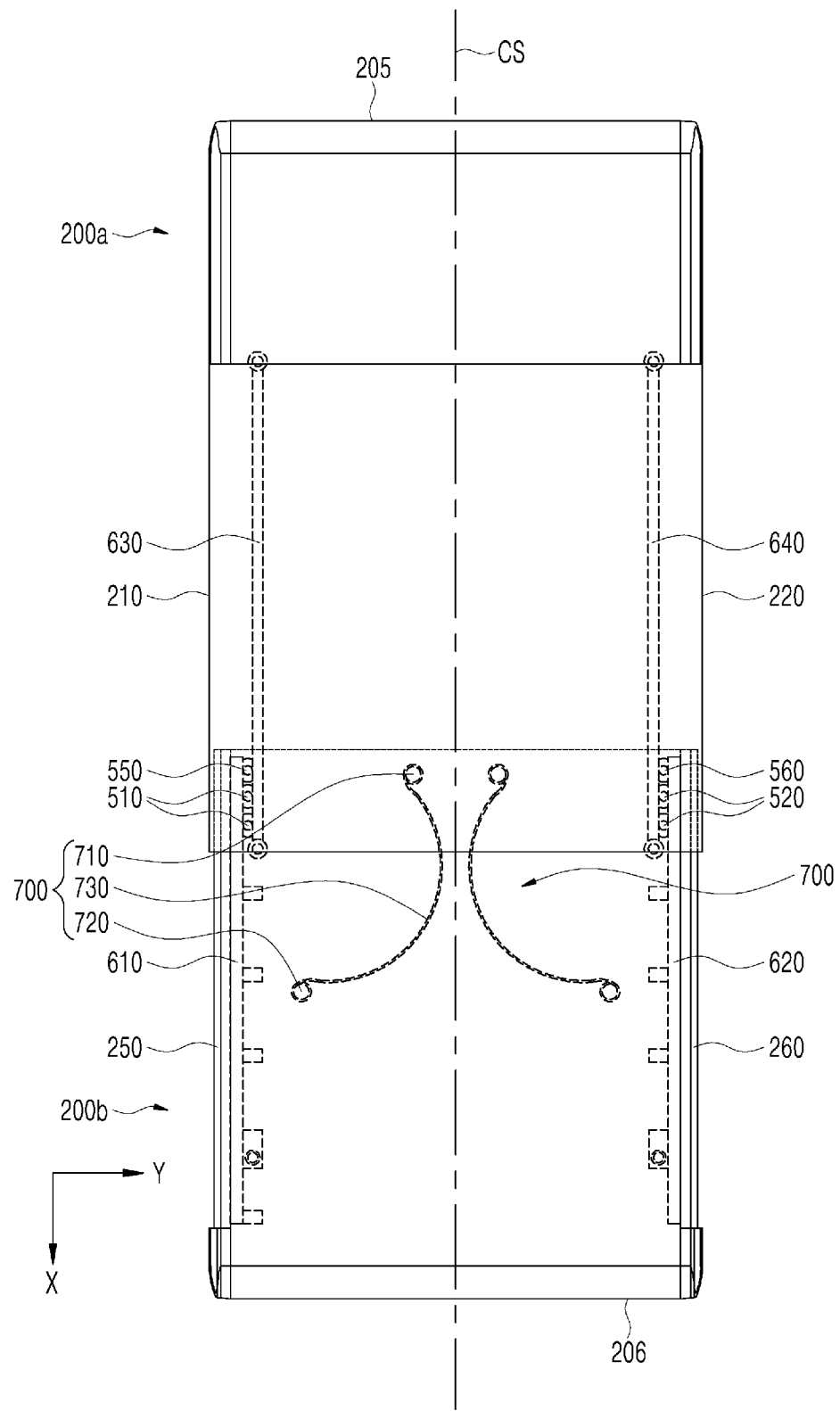

FLEXIBLE DISPLAY DEVICE

CROSS-REFERENCE TO RELATED APPLICATION

Pursuant to 35 U.S.C. § 119, this application claims the benefit of an earlier filing date and right of priority to International Application No. PCT/KR2020/010504, filed on Aug. 7, 2020, the contents of which are hereby incorporated by reference herein in its entirety.

FIELD

The present disclosure relates to a device including a flexible display and, more particularly, to a portable device including a flexible display characterized in that the size of the device is changed as two bodies slide with respect to each other.

BACKGROUND

Various devices using a flexible display that can be bent while displaying image information have been developed and introduced.

Such a flexible display has been applied to mobile terminals such as mobile phones, smart phones, etc., and users can carry such mobile terminals and use them in various places.

Representative examples of mobile devices to which a flexible display is applied are as follows.

Firstly, research and development has been underway for foldable devices having a structure in which a flexible display is applied to two bodies that are connected to each other by a folding structure (e.g., by a hinge). In such foldable devices, since the flexible display may be disposed to completely cover the two bodies and the folding structure, a relatively large-sized display can be implemented in the devices.

As another example of devices using a flexible display, rollable devices having a structure in which a display is rolled up and unrolled have been studied and developed. In such rollable devices, as the flexible display is rolled, the total size or area of the entire display can be reduced. On the contrary, as the flexible display is unrolled, the total size or area of the entire display can be increased.

As still another example of devices using a flexible display, there are devices in which as two bodies slide with respect to each other, a flexible display having a U-shape due to a curved middle portion thereof is deformed such that the surface area of the flexible display seen from one side thereof changes.

In the device in which the flexible display is deformed as two bodies slide with respect to each other, in order to ensure that the flexible display is deformed as intended, equal forces must be applied on the symmetrical left and right sides of the flexible display, and it is required to minimize friction (i.e., kinetic friction) that occurs between the two bodies when the two bodies slide with respect to each other.

If one of the two bodies fails to accurately move in an intended direction with respect to the other body, damage may occur to the flexible display. Therefore, each of the two bodies must move accurately in an intended direction.

The device in which the flexible display is deformed as the two bodies slide with respect to each other may be provided with a means for facilitating sliding movement of the two bodies. Here, the size of the means is required to be minimized within the range in which the sliding movement of the two bodies is ensured.

If the size of the means is not minimized, the size of the gap between the two bodies may increase, and as a result, the device may have a relatively poor aesthetic impression and relatively lower marketability.

In addition, if the size of the means is not minimized, there may be difficulties in securing the space receiving the means within the device and securing the space in which the flexible display is to be formed.

SUMMARY

An aspect of the present disclosure is directed to providing a flexible display device characterized in that when a flexible display is deformed as two bodies move (i.e., slide) relative to each other, rolling contact may occur at a means for facilitating the relative movement of the two bodies, such that slip and friction occurring when the two bodies move relative each other may be significantly reduced.

Another aspect of the present disclosure is directed to providing a flexible display device in which the flexible display is deformed as the two bodies move (i.e., slide) relative to each other, characterized in that an area occupied by the means for facilitating the relative movement of the two bodies may be minimized, and the size of the gap between the two bodies may be significantly reduced.

Yet another aspect of the present disclosure is directed to providing a flexible display device in which the flexible display is deformed as the two bodies move (i.e., slide) relative to each other, characterized in that the means for facilitating the relative movement of the two bodies may be formed in an edge portion of the flexible display device, and exposure of the means to the outside of the flexible display device may be minimized.

Still another aspect of the present disclosure is directed to providing a flexible display device in which the flexible display is deformed as the two bodies move (i.e., slide) relative to each other, characterized in that each of the two bodies may move accurately in an intended direction without tilting, and may move semi-automatically.

According to one aspect of the present disclosure, the flexible display device may be formed to be gripped and carried by a user. That is, the flexible display device may be formed to have approximately the same size, the same shape, and the same weight as general mobile terminals.

In some embodiments, the flexible display device may include a first body, a second body, and a flexible display.

The second body may be formed to move relative to the first body in a direction parallel to a first direction. The second body may move relative to the first body in the first direction. The second body may move relative to the first body in a direction opposite to the first direction.

The second body may reciprocate between a first position and a second position in the direction parallel to the first direction, relative to the first body. The first position may be a relative position of the second body with respect to the first body, and the second position may also be a relative position of the second body with respect to the first body.

When the second body is in the first position relative to the first body, it can be said that the flexible display device is in a first state, and when the second body is in the second position relative to the first body, it can be said that the flexible display device is in a second state. Accordingly, in the description of the present disclosure, "the first position" may be used in the same sense as "the first state of the flexible display device," and "the second position" may be used in the same sense as "the second state of the flexible display device."

The direction from the first position toward the second position is the first direction.

The second body may include a support.

The support may be formed along a second direction, which is a direction orthogonal to the first direction.

The support may be formed in the shape of a roller that is rotatable about a rotational axis extending in the second direction. That is, the support may be rotatably coupled to the second body.

The flexible display may include a first region and a second region.

The first region may be a region of the flexible display that is coupled to the first body. The first region may be fixedly coupled to the first body.

The first region may be fixed in front of the first body to face forward. The first region may form a front surface of the flexible display device. The first region may be formed as a plane surface. The first region may be parallel to the first direction and the second direction.

The second region may be a region of the flexible display that extends from the first region. A portion of the second region may be curved. A portion of the second region may be curved into a semicircular shape, and as the second body moves, the position of the curved portion in the second region may be changed.

A surface area of the second region that forms a single plane surface with the first region may change as the second body moves.

When the second body moves in the first direction relative to the first body, the surface area of the second region that forms a single plane surface with the first region may increase. When the second body moves in the direction opposite to the first direction relative to the first body, the surface area of the second region that forms a single plane surface with the first region may decrease.

The second region may be curved around the support.

A portion of the second region may be curved about a curvature center line, which coincides with the rotational axis of the support, to form a curved surface.

The second region may include a first connected region and a second connected region.

The first connected region may be a region that extends from the first region.

The second connected region may be a region that extends from the first connected region.

When the second body is in the first position, the first connected region may be curved around the support to form a curved surface, and the second connected region may be parallel to the first region. When the second body is in the first position, the first connected region may be curved around the support to form a curved surface. When the second body is in the first position, the first connected region may form a curved surface of a semicircular shape about the curvature center line.

When the second body is in the second position, the first connected region may form a single plane surface with the first region, and a portion of the second connected region may be curved around the support, forming a curved surface. When the second body is in the second position, a portion of the second connected region may be curved around the support to form a curved surface. When the second body is in the second position, a portion of the second connected region may form a curved surface of a semicircular shape about the curvature center line.

According to an aspect of the present disclosure, the second body may include a first rolling surface and a second rolling surface.

The first rolling surface and the second rolling surface may be formed to be parallel to the first direction.

According to an aspect of the present disclosure, the flexible display device may include a first wheel and a second wheel.

The first wheel may be rotatably coupled to the first body. The first wheel may come into contact with the first rolling surface on a lateral surface of the first wheel in a first contact direction perpendicular to the first direction.

The second wheel may be rotatably coupled to the first body. The second wheel may come into contact with the second rolling surface on a lateral surface of the second wheel in a second contact direction perpendicular to the first direction.

In some embodiments, the first contact direction and the second contact direction may be symmetrical to each other about a reference surface that bisects the first body and the second body along a line parallel to the first direction.

In some embodiments, the reference surface may be a surface that bisects the first body and the second body.

In some embodiments, a rotational axis of the first wheel and a rotational axis of the second wheel may be parallel to a direction orthogonal to a surface of the first region.

In some embodiments, the first wheel may include a first shaft, a first bearing, and a first rubber cap.

In some embodiments, the first wheel may include a first shaft, a first rotation part, and a first rubber cap.

The first wheel may selectively include the first bearing or the first rotation part. That is, the first wheel may include either one of the first bearing or the first rotation part.

The first shaft may form the rotational axis of the first wheel.

The first bearing may be rotatably coupled to the first shaft.

The first rotation part may be made of an engineering plastic having lubricity. The first rotation part may be rotatably coupled to the first shaft.

The first rubber cap may be made of a rubber material, and may form an outer circumferential surface of the first wheel.

When the first wheel includes the first bearing, the first rubber cap may be fixedly coupled to an outer circumferential surface of the first bearing.

When the first wheel includes the first rotation part, the first rubber cap may be fixedly coupled to an outer circumferential surface of the first rotation part. Here, a thickness of the first rubber cap in a direction of the rotational axis may be smaller than a thickness of the first rotation part in the direction of the rotational axis.

In some embodiments, the second wheel may include a second shaft, a second bearing, and a second rubber cap.

In some embodiments, the second wheel may include a second shaft, a second rotation part, and a second rubber cap.

The second wheel may selectively include the second bearing or the second rotation part. That is, the second wheel may include either one of the second bearing or the second rotation part.

The second shaft may form the rotational axis of the second wheel.

The second bearing may be rotatably coupled to the second shaft.

The second rotation part may be made of an engineering plastic having lubricity. The second rotation part may be rotatably coupled to the second shaft.

The second rubber cap may be made of a rubber material, and may form an outer circumferential surface of the second wheel.

When the second wheel includes the second bearing, the second rubber cap may be fixedly coupled to an outer circumferential surface of the second bearing.

When the second wheel includes the second rotation part, the second rubber cap may be fixedly coupled to an outer circumferential surface of the second rotation part. Here, a thickness of the second rubber cap in the direction of the rotational axis may be smaller than a thickness of the second rotation part in the direction of the rotational axis.

The first body may include a first side edge portion and a second side edge portion.

The first side edge portion and the second side edge portion may be parallel to the first direction.

The second body may include a third side edge portion and a fourth side edge portion.

The third side edge portion and the fourth side edge portion may be parallel to the first direction.

In some embodiments, the first side edge portion and the second side edge portion may be disposed between the third side edge portion and the fourth side edge portion.

The first wheel may be rotatably fixed to the first side edge portion.

The second wheel may be rotatably fixed to the second side edge portion.

The first rolling surface may form an inner surface of the third side edge portion.

The second rolling surface may form an inner surface of the fourth side edge portion.

In some embodiments, the flexible display device may include a first coupling groove, a second coupling groove, a first bracket, and a second bracket.

The first coupling groove may be formed in the first side edge portion in the shape of a concave groove that is dented inward from an outside of the first side edge portion. The second coupling groove may be formed in the second side edge portion in the shape of a concave groove that is dented inward from an outside of the second side edge portion.

The first bracket may receive the first wheel such that both ends of the first shaft, which forms the rotational axis of the first wheel, are fixed, and may be inserted into the first coupling groove and fixed therein. The first bracket may be formed of a metal material.

The second bracket may receive the second wheel such that both ends of the second shaft, which forms the rotational axis of the second wheel, are fixed, and may be inserted into the second coupling groove and fixed therein. The second bracket may be formed of a metal material.

The flexible display device may include a first guide ring and a second guide ring.

The first guide ring may be placed on the first shaft, which forms the rotational axis of the first wheel, and may be interposed between the first wheel and the first bracket.

The second guide ring may be placed on the second shaft, which forms the rotational axis of the second wheel, and may be interposed between the second wheel and the second bracket.

Each of the first wheel and the second wheel may be fixed to an end portion of the first body that is relatively close to the support with respect to the first direction.

According to an aspect of the present disclosure, the flexible display device may include a first outer rail and a second outer rail.

The first outer rail may include a first outer rolling groove formed on an inner surface of the first outer rail to be parallel to the first direction, and may be fixed to the third side edge portion.

The second outer rail may include a second outer rolling groove formed on an inner surface of the second outer rail to be parallel to the first direction, and may be fixed to the fourth side edge portion.

In some embodiments, the first wheel may be rotatably coupled to the first side edge portion, and may come into contact with the first outer rolling groove.

In some embodiments, the second wheel may be rotatably coupled to the second side edge portion, and may come into contact with the second outer rolling groove.

The flexible display device may further include a first inner rail and a second inner rail.

The first inner rail may include a first inner rolling groove formed on an outer surface of the first inner rail to be parallel to the first direction, and may be fixed to the first side edge portion.

The second inner rail may include a second inner rolling groove formed on an outer surface of the second inner rail to be parallel to the first direction, and may be fixed to the second side edge portion.

In some embodiments, the first wheel may come into contact with the first inner rolling groove, and the second wheel may come into contact with the second inner rolling groove.

The flexible display device may further include a third wheel and a fourth wheel.

The third wheel may be rotatably coupled to the third side edge portion behind the first wheel with respect to the first direction, and may come into contact with the first inner rolling groove.

The fourth wheel may be rotatably coupled to the fourth side edge portion behind the second wheel with respect to the first direction, and may come into contact with the second inner rolling groove.

In some embodiments, the first wheel may come into contact with the first inner rolling groove, and the second wheel may come into contact with the second inner rolling groove.

In some embodiments, the third wheel may come into contact with the first outer rolling groove, and the fourth wheel may come into contact with the second outer rolling groove.

In some embodiments, a longitudinal cross-section of each of the first wheel, the second wheel, the third wheel, and the fourth wheel may have a rhombus shape. In some embodiments, a longitudinal cross-section of a lateral surface of each of the first wheel, the second wheel, the third wheel, and the fourth wheel may have a shape of an isosceles triangle that is rotationally symmetrical about each of the rotational axis. In some embodiments, a radially outer surface of each of the first wheel, the second wheel, the third wheel, and the fourth wheel may have a V-shaped convex cross section. Each of the first outer rolling groove and the first inner rolling groove may have a V-shaped concave cross section corresponding to the radially outer surface of the first wheel or the third wheel, and each of the second outer rolling groove and the second inner rolling groove may have a V-shaped concave cross section corresponding to the radially outer surface of the second wheel or the fourth wheel.

In some embodiments, a cross section of each of the first outer rolling groove, the second outer rolling groove, the first inner rolling groove, and the second inner rolling groove cut along the first direction may have a triangular shape.

In some embodiments, the first wheel and the second wheel may be provided as a pair of first wheels and a pair of second wheels, respectively.

In some embodiments, the pair of first wheels and the pair of second wheels may be symmetrical to each other, the first outer rail and the second outer rail may be symmetrical to each other, the first inner rail and the second inner rail may be symmetrical to each other, and the third wheel and the fourth wheel may be symmetrical to each other, about the reference surface.

In some embodiments, the flexible display device may further include an actuator.

The actuator may be made of a metal material.

The actuator may be formed in the shape of, for example, a spring.

The actuator may be formed in a curved shape along a surface that is parallel to the first region.

One end portion of the actuator may be rotatably coupled to the first body, and the other end portion of the actuator may be rotatably coupled to the second body.

The actuator may be elastically deformed.

A degree of elastic deformation of the actuator measured when the second body is between the first position and the second position may be greater than a degree of elastic deformation of the actuator measured when the second body is in the first position or the second position.

The flexible display device may further include a plurality of support bars.

The plurality of support bars may be formed to extend in a direction that is parallel to the second direction. The plurality of support bars may be fixed to an inner surface of the second region.

Each of the plurality of support bars may include a first support slider, a second support slider, and a connection arm.

The first support slider may form one end portion of a support bar.

The second support slider may form the other end portion of the support bar at the opposite side thereof to the first support slider.

The connection arm may connect the first support slider to the second support slider and may support the second region.

The second body may include a first movement guide groove and a second movement guide groove.

The first movement guide groove may be formed as a U-shaped groove, and may form a path into which the first support slider is inserted and through which the first support slider moves.

The second movement guide groove may be formed as a U-shaped groove to form a path into which the second support slider is inserted and through which the second support slider moves.

When the user moves the second body relative to the first body while gripping the first body, or when the user moves the first body relative to the second body while gripping the second body, the first wheel may roll on the first rolling surface with the lateral surface thereof contacting the first rolling surface in the first contact direction, and the second wheel may roll on the second rolling surface with the lateral surface thereof contacting the second rolling surface in the second contact direction. The first contact direction and the second contact direction may be symmetrical to each other about the reference surface. Accordingly, friction between the first wheel and the first rolling surface and between the second wheel and the second rolling surface occurring due to slipping may be prevented, and friction (i.e., kinetic friction) occurring around the first wheel and the second wheel may be significantly reduced. Accordingly, the flexible display device may operate smoothly.

The first wheel and the second wheel may be coupled to the first body, and each of the first rolling surface and the second rolling surface may form a portion of the inner surface of the second body. When a direction orthogonal to the first direction and the second direction is a third direction, the direction of the rotational axes of the first wheel and the second wheel may be parallel to the third direction. Here, thicknesses of the first wheel and the second wheel in the third direction may be sufficiently small, and diameters of the first wheel and the second wheel in the first direction and the second direction may be sufficiently small, as compared to the total size of the flexible display device. That is, the area (i.e., space) occupied by the first wheel and the second wheel relative to the entire area of the flexible display device may be minimized. Accordingly, limitations regarding the form (i.e., design limitations) of the first body and the second body caused by the first wheel and the second wheel may be reduced, and the size of the gap formed between the first body and the second body may be minimized.

When the flexible display device includes the first wheel, the second wheel, the first rolling surface, and the second rolling surface, the first rolling surface may form the inner surface of the third side edge portion and may be positioned further outside than the first wheel, and the second rolling surface may form the inner surface of the fourth side edge portion and may be positioned further outside than the second wheel. Meanwhile, when the flexible display device includes the first outer rail, the second outer rail, the first wheel, and the second wheel, the first outer rail may be positioned further outside than the first wheel, and the second outer rail may be positioned further outside than the second wheel. Accordingly, when the second body moves between the first position and the second position, the first wheel and the second wheel may be prevented from being exposed to the outside, and foreign material may be blocked from getting into the first wheel and the second wheel.

In the flexible display device, when the second body moves relative to the first body, the first wheel and the third wheel may roll on the first outer rail and the first inner rail between the first outer rail and the first inner rail, and the second wheel and the fourth wheel may roll on the second outer rail and the second inner rail between the second outer rail and the second inner rail. Accordingly, the second body may move accurately in an intended direction (i.e., in the first direction or in the direction opposite to the first direction) relative to the first body without tilting, and an unintended deformation of the flexible display may be prevented.

In the flexible display device, the degree of elastic deformation of the actuator measured when the second body is between the first position and the second position may be greater than the degree of elastic deformation of the actuator measured when the second body is in the first position or the second position. Accordingly, the first state or the second state of the flexible display device may be stably maintained, and a clearance gap between the first body and the second body may be minimized. In addition, when the user slightly moves the second body relative to the first body while gripping the first body, the flexible display device may be semi-automatically deformed to the first state or the second state, and when the user slightly moves the first body relative to the second body while gripping the second body, the flexible display device may be semi-automatically deformed to the first state or the second state.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

FIG. 1 is a block diagram for explaining a flexible display device.

FIG. 2a is a perspective view of a flexible display in a first state, and FIG. 2b is a perspective view of the flexible display device of FIG. 2a in a second state in which the flexible display has been deformed. In FIGS. 2a and 2b, a first wheel, a second wheel, a first bracket, and a second bracket provided within the flexible display device are illustrated in dotted lines.

FIG. 3a is a rear view of the flexible display device of FIG. 2a, and FIG. 3b is a rear view of the flexible display device of FIG. 2b.

FIG. 4 is an exploded perspective view of the flexible display device of FIG. 2a.

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

FIG. 8a is a cross-sectional view illustrating inner surfaces of a third side edge portion and a second edge portion, and FIG. 8b is a cross-sectional view illustrating inner surfaces of a fourth side edge portion and the second edge portion.

FIG. 9 is a cross-sectional view schematically illustrating a state in which a support bar, an inner plate, and a flexible display are coupled.

FIG. 10a and FIG. 10b are perspective views respectively illustrating some parts of the flexible display device according to an embodiment of the present disclosure.

FIG. 11a is a perspective view illustrating a state in which a first wheel and a first bracket (or a second wheel and a second bracket) are coupled to each other according to an embodiment of the present disclosure, and FIG. 11b is an exploded perspective view of FIG. 11a.

FIG. 11c is a perspective view illustrating a state in which the first wheel and the first bracket (or the second wheel and the second bracket) are decoupled from each other according to an embodiment of the present disclosure, and FIG. 11d is a cross-sectional view schematically illustrating a state in which the first wheel and the first bracket (or the second wheel and the second bracket) of FIG. 11c are coupled to each other.

FIG. 12a illustrates a state in which the first wheel and the first bracket are coupled to a first coupling groove of a first body, FIG. 12b illustrates the first coupling groove of the first body, FIG. 12c illustrates a state in which the second wheel and the second bracket are coupled to a second coupling groove of the first body, and FIG. 12d illustrates the second coupling groove of the first body.

FIG. 13 is a rear view of the flexible display device in the second state according to an embodiment of the present disclosure.

FIG. 14 is a perspective view illustrating a state in which the first wheel and the first bracket (or the second wheel and the second bracket) are decoupled from each other according to an embodiment of the present disclosure.

FIGS. 15a and 15b are views for explaining the coupling relationship and working relationship between a first wheel, a second wheel, a third wheel, a fourth wheel, a first outer rail, a second outer rail, a first inner rail, and a second inner rail. FIG. 15a schematically illustrates the flexible display device in the first state, and FIG. 15b schematically illustrates the flexible display device in the second state.

FIG. 16a is a cross-sectional view of the flexible display device of FIG. 15a taken along the line B to B', and FIG. 16b is a cross-sectional view of the flexible display device of FIG. 15b taken along the line C to C'.

FIG. 17a illustrates the first wheel, the third wheel, the first outer rail, and the first inner rail of the flexible display device in the first state, FIG. 17b illustrates the second wheel, the fourth wheel, the second outer rail, and the second inner rail of the flexible display device in the first state, FIG. 17c illustrates the first wheel, the third wheel, the first outer rail, and the first inner rail of the flexible display device in the second state, and FIG. 17d illustrates the second wheel, the fourth wheel, the second outer rail, and the second inner rail of the flexible display device in the second state.

FIGS. 18a and 18b are views for explaining the coupling relationship and working relationship between a first body, a second body, and an actuator. FIG. 18a schematically illustrates the flexible display device in the first state, and FIG. 18b schematically illustrates the flexible display device in the second state.

DETAILED DESCRIPTION

Hereinafter, exemplary embodiments disclosed herein will be described in detail with reference to the accompanying drawings. Like reference numerals designate like elements, and redundant description thereof will be omitted.

Suffixes "module" and "unit" or "portion" or "part" for elements used in the following description are merely provided for facilitation of preparing this specification, and thus they are not granted a specific meaning or function. In the following description, when it is considered that known functions or structures may confuse the gist of the embodiments of the present disclosure, the known functions or structures are not explained. Further, the accompanying drawings are provided for easy understanding of the embodiment disclosed in the present specification, but the technical spirit of the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the articles "a," "an," and "the," include plural referents unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" is meant to be inclusive and means either, any, several, or all of the listed items.

A flexible display device described in the present specification may include a mobile terminal such as a portable phone, a smartphone, a laptop computer, a digital broadcast terminal, a personal digital assistant (PDA), a portable multimedia player (PMP), a navigation, a slate PC, a tablet PC, an ultra-book, a wearable device, a smart watch, a smart glass, a head mounted display (HMD), and the like.

It will be apparent to those skilled in the art that the configuration according to the embodiments disclosed in the present specification may be applied to fixed terminals such as a digital TV, a desktop computer, a digital signage, and the like, except for when the configuration is applied only to a mobile terminal. Hereinafter, in the present disclosure, for the convenience of description, the mobile terminal will be first described as an example of the flexible display device.

FIG. 1 is a block diagram for explaining a mobile terminal 100 related to the present disclosure.

The mobile terminal 100 may include a wireless transceiver 110, an input interface 120, a sensor 140, an output interface 150, an interface 160, a memory 170, a controller 180, and a power supply 190. The elements shown in FIG. 1 are not essential to implement the mobile terminal, and the mobile terminal described in this specification may include more or fewer elements than the above-enumerated elements.

More specifically, the wireless transceiver 110 may include one or more modules that enable wireless communications between the mobile terminal 100 and a wireless communication system, between the mobile terminal 100 and another mobile terminal 100, or between the mobile terminal 100 and an external server. Further, the wireless transceiver 110 may include one or more modules connecting the mobile terminal 100 to one or more networks.

The wireless transceiver 110 may include at least one of a broadcast receiving module 111, a mobile communication module 112, a wireless internet module 113, a near field communication module 114, or a position information module 115.

The input interface 120 may include a camera 121 or a video input interface, which are configured to receive input of a video signal, a microphone 122 or an audio input interface, which are configured to receive input of an audio signal, and a user input interface 123 (for example, a touch key or a mechanical key), which is configured to receive an input of information from a user. Voice data or image data collected by the input interface 120 may be analyzed and processed as a control command of the user.

The sensor 140 may include one or more sensors configured to sense at least one piece of information among information in the mobile terminal, surrounding environment information of the mobile terminal, or user information. For example, the sensor 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, or a biometric sensor). Further, the mobile terminal disclosed in the present specification may combine information sensed by at least two sensors from the above-mentioned sensors and may use the combined information.

The output interface 150 may be for generating outputs related to visual, auditory, or tactile senses, and may include at least one of a display 151, a sound output interface 152, a haptic module 153, or an optical output interface 154. The display 151 may form a mutual layer structure with a touch sensor or may be formed integrally with a touch sensor, to be implemented as a touch screen. The touch screen may serve as a user input interface 123 configured to provide an input interface between the mobile terminal 100 and the user, and at the same time, may provide an output interface between the mobile terminal 100 and the user.

The interface 160 may serve as a passage between the mobile terminal 100 and various types of external devices connected to the mobile terminal 100. The interface 160 may include at least one of a wired/wireless headset port, an external charger port, a wired/wireless data port, a memory card port, a port for connecting a device equipped with an identification module, an audio input/output (I/O) port, a video input/output (I/O) port, or an earphone port. In response to a connection between an external device and the interface 160, the mobile terminal 100 may perform an appropriate control regarding the connected external device.

Further, the memory 170 may store therein data supporting various functions of the mobile terminal 100. The memory 170 may store therein a plurality of application programs (or applications) driven in the mobile terminal 100, data for operations of the mobile terminal 100, and commands. At least some of the application programs may be downloaded from an external server through wireless communication. Further, for the basic functions of the mobile terminal 100 (for example, functions for receiving and making calls and receiving and sending messages), at least some of the application programs may be provided in the mobile terminal 100 from the time of manufacture. The application programs may be stored in the memory 170 and installed on the mobile terminal 100 so as to be driven by the controller 180 to perform operations (or functions) of the mobile terminal 100.

In addition to the operations related to the application programs, the controller 180 may generally control overall operation of the mobile terminal 100. The controller 180 may process a signal, data, or information that is inputted or outputted through the above-described elements or drive the application programs stored in the memory 170 to thereby provide appropriate information or functions to the user or process them.

Further, in order to drive the application programs stored in the memory 170, the controller 180 may control at least one of the elements described with reference to FIG. 1. Moreover, the controller 180 may combine and operate at least two of the elements included in the mobile terminal 100 to drive the application programs.

Under the control of the controller 180, the power supply 190 may be supplied with external power or internal power, and supply power to each element included in the mobile terminal 100. The power supply 190 may include a battery, and the battery may be an internal battery or a replaceable battery.

At least some of the above-described elements may operate in cooperation with each other to implement the operation or control of the mobile terminal or the control method of the mobile terminal according to various embodiments which will be described below. Further, the operation or control of the mobile terminal or the control method of the mobile terminal may be implemented on the mobile terminal by driving at least one application program stored in the memory 170.

Hereinafter, prior to describing various embodiments implemented by the mobile terminal 100 described above, the above-mentioned elements will be described in more detail with reference to FIG. 1.

The broadcast receiving module 111 of the wireless transceiver 110 may receive a broadcast signal and/or broadcast-related information from an external broadcast management server through a broadcast channel. The broadcast channel may include a satellite channel and a ground wave channel. The mobile terminal 100 may be provided with two or more broadcast receiving modules for simultaneous reception of at least two broadcast channels or for broadcast channel switching.

The broadcast management server may refer to a server that generates and transmits a broadcast signal and/or broadcast-related information, or a server that is supplied with a previously generated broadcast signal and/or broadcast-related information and transmits the supplied broadcast signal and/or broadcast-related information to the mobile terminal 100. The broadcast signal may include not only a TV broadcast signal, a radio broadcast signal, and a data broadcast signal, but also a broadcast signal obtained by combining a TV broadcast signal or a radio broadcast signal with a data broadcast signal.

The broadcast signal may be encoded according to at least one of technical standards for transmission and reception of a digital broadcast signal (or broadcast schemes, such as ISO, IEC, DVB, or ATSC), and the broadcast receiving module 111 may receive the digital broadcast signal by using an appropriate method meeting the technical specification determined by the technical standards.

The broadcast-related information may refer to information related to a broadcast channel, a broadcast program, or a broadcast service provider. The broadcast-related information may also be provided through the mobile communication network. Here, the broadcasting-related information may be received by the mobile communication module 112.

The broadcast-related information may exist in various forms, such as an electronic program guide of digital multimedia broadcasting (DMB) or an electronic service guide of a digital video broadcast-handheld (DVB-H). The broadcast signal and/or the broadcast-related information received through the broadcast receiving module 111 may be stored in the memory 170.

The mobile communication module 112 may transmit/receive a wireless signal to/from at least one of a base station, an external terminal, or a server on a mobile communication network established according to the technical standards for mobile communications or communication methods (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include a voice call signal, a video call signal, or various forms of data for transmission or reception of a text/multimedia message.

The wireless internet module 113 may refer to a module for wireless Internet connection, and may be installed in the mobile terminal 100 or installed outside the mobile terminal 100. The wireless internet module 113 may be configured to transmit and receive a wireless signal over a communication network according to wireless Internet technologies.

Wireless Internet technologies may include, for example, wireless LAN (MILAN), wireless fidelity (Wi-Fi), Wi-Fi direct, Digital Living Network Alliance (DLNA), wireless broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet module 113 may transmit and receive data in accordance with at least one wireless Internet technology from among the above-mentioned wireless Internet technologies and wireless Internet technologies that were not described above.

From the viewpoint that the wireless internet connection through, for example, WiBro, HSDPA, HSUPA, GSM, CDMA, WCDMA, LTE, and LTE-A is made through the mobile communication network, the wireless internet module 113, which performs the wireless Internet connection through the mobile communication network, may be understood as one type of the mobile communication module 112.

The near field communication module 114 may be for short-range communications, and may support short-range communications by using at least one of Bluetooth™, radio frequency identification (RFID), infrared data association (IrDA), ultra wideband (UWB), ZigBee, Short-range Communication (NFC), wireless fidelity (Wi-Fi), Wi-Fi Direct, or Wireless Universal Serial Bus (Wireless USB). The near field communication module 114 may support wireless communications, over a near-field wireless communication network, between the mobile terminal 100 and the wireless communication system, between the mobile terminal 100 and another mobile terminal 100, or between the mobile terminal 100 and a network in which another mobile terminal 100 (or external server) is located. The near-field wireless communication network may be a wireless personal area network.

Here, the another mobile terminal 100 may be a wearable device (for example, a smart watch, a smart glass, or a head mounted display (HMD)) capable of exchanging data (or interworking) with the mobile terminal 100 according to the present disclosure. The near field communication module 114 may sense (or recognize) the presence of a wearable device that is capable of communicating with the mobile terminal 100, in the vicinity of the mobile terminal 100. Moreover, when the detected wearable device is a device that has been authenticated to communicate with the mobile terminal 100 according to the present disclosure, the controller 180 may transmit at least a portion of data processed in the mobile terminal 100 to the wearable device through the near field communication module 114. Therefore, the user of the wearable device may use, through the wearable device, the data that have been processed in the mobile terminal 100. For example, according to this, when a phone call is received by the mobile terminal 100, the user may receive the phone call through the wearable device, or when a message is received by the mobile terminal 100, the user may check the received message through the wearable device.

The position information module 115 may be a module for obtaining a position (or a current position) of a mobile terminal, and its representative examples may include a global positioning system (GPS) module or a wireless fidelity (Wi-Fi) module. For example, when a GPS module is utilized, the mobile terminal may obtain the position of the mobile terminal by using a signal transmitted from a GPS satellite. As another example, when a Wi-Fi module is utilized, the mobile terminal may obtain the position of the mobile terminal on the basis of information on a wireless access point (AP) which transmits and receives wireless signals to and from the Wi-Fi module. If necessary, the position information module 115 may alternatively or additionally perform a function of another module of the wireless transceiver 110 to obtain data on the position of the mobile terminal. The position information module 115 may be a module used to obtain the position (or the current position) of the mobile terminal, and is not limited to a module that directly calculates or obtains the position of the mobile terminal.

Next, the input interface 120 may be for receiving input of video information (or signal), audio information (or signal), data, or information inputted by the user. For receiving input of the video information, the mobile terminal 100 may include a camera 121 or a plurality of cameras 121. The camera 121 may process an image frame such as a still image or a moving image obtained by an image sensor in a video call mode or a photographing mode. The processed image frame may be displayed on the display 151 or stored in the memory 170. Further, the plurality of cameras 121 provided in the mobile terminal 100 may be arranged to form a matrix structure, and a plurality of pieces of image information having various angles or focal points may be inputted to the mobile terminal 100 through the plurality of cameras 121 forming the matrix structure. In addition, the plurality of cameras 121 may be arranged to form a stereo structure to obtain left and right images used to implement a stereoscopic image.

The microphone 122 may process an external sound signal into electric voice data. The processed voice data may be utilized in various manners in accordance with the function that is being performed in the mobile terminal 100 (or in accordance with an application program that is being executed). Various noise removal algorithms for removing noise generated during the process of receiving the external sound signal may be implemented in the microphone 122.

The user input interface 123 may be for receiving information from the user, and when information is inputted through the user input interface 123, the controller 180 may control operation of the mobile terminal 100 so as to correspond to the inputted information. The user input interface 123 may include a mechanical input interface (or a mechanical key, such as a button located on a front, rear, or side surface of the mobile terminal 100, a dome switch, a jog wheel, a jog switch, etc.) and a touch type input interface. For example, the touch type input interface may be formed as a virtual key, a soft key, or a visual key displayed on a touch screen through a software process, or as a touch key disposed in a part other than the touch screen. The virtual key or the visual key may be displayed on the touch screen in various shapes, and may include, for example, graphics, text, icons, video, or a combination thereof.

The sensor 140 may sense at least one of information in the mobile terminal, information of the surrounding environment of the mobile terminal, or user information, and generate a sensing signal corresponding to sensed information. On the basis of the sensing signal, the controller 180 may control the driving or operation of the mobile terminal 100 or perform data processing, functions, or operations related to an application program installed in the mobile terminal 100. Representative sensors among various sensors that can be included in the sensor 140 will now be described in more detail.

First, the proximity sensor 141 may be a sensor that senses the presence of an object that is approaching a predetermined sensing surface or the presence of nearby objects, by using the force of an electromagnetic field or infrared ray without any mechanical contact. The proximity sensor 141 may be disposed in an internal area of the mobile terminal 100, which is enclosed by the above-described touch screen, or may be disposed in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, and an infrared proximity sensor. When the touch screen is a capacitive type, the proximity sensor 141 may be configured to detect proximity of an object by sensing a change in the electric field caused by an approaching object having conductivity. Here, the touch screen (or the touch sensor) itself may be classified as a proximity sensor.

For convenience of description, when an object approaches the touch screen without contacting the touch screen, and it is recognized that the object is located above the touch screen, it is referred to as a "proximity touch." When the object actually touches the touch screen, it is referred to as a "contact touch." A position at which the object proximately touches the touch screen may be a position at which the object vertically corresponds to the touch screen when the object proximately touches the touch screen. The proximity sensor 141 may sense a proximity touch and a proximity touch pattern (for example, a proximity touch distance, a proximity touch direction, a proximity touch speed, a proximity touch time, a proximity touch position, a proximity touch movement state, etc.). As described above, the controller 180 may process data (or information) corresponding to a proximate touch operation and a proximate touch pattern sensed by the proximity sensor 141, and may output visual information corresponding to the processed data on the touch screen. Furthermore, the controller 180 may control the mobile terminal 100 to process different operations or data (or information) depending on whether the touch on the same point on the touch screen is the proximity touch or the contact touch.

The touch sensor may sense a touch (or a touch input) applied to the touch screen (or the display 151) by using at least one of various touch types, such as a resistive film type, a capacitive type, an infrared type, an ultrasonic type, and a magnetic field type.

For example, the touch sensor may be configured to convert a change in pressure that is applied to a specific portion of the touch screen, or a change in capacitance that is generated in a specific portion of the touch screen, into an electrical input signal. The touch sensor may be configured to detect a position where a touch subject which applies a touch onto the touch screen is touched on the touch sensor, the surface area of the touch, the pressure of the touch, and the capacitance at the time of the touch. Here, the touch subject may be an object that applies a touch to the touch sensor, and may include, for example, a finger, a touch pen, a stylus pen, and a pointer.

As described above, when there is a touch input to the touch sensor, a signal or signals corresponding to the touch input may be transmitted to a touch controller. The touch controller may process the signal(s) and then transmit corresponding data to the controller 180. Then, the controller 180 may confirm which area of the display 151 was touched. Here, the touch controller may be a separate element from the controller 180, or may be the controller 180 itself.

The controller 180 may perform a different control or the same control depending on a type of a touch subject touching the touch screen (or a touch key provided other than the touch screen). Whether to perform a different control or the same control depending on the type of touch subject may be determined in accordance with a current operating state of the mobile terminal 100 or an application program that is being executed.

The touch sensor and the proximity sensor described above may, independently or in combination, sense various types of touches on the touch screen, such as a short (or tap) touch, a long touch, a multi touch, a drag touch, a flick touch, a pinch-in touch, a pinch-out touch, a swipe touch, or a hovering touch.

The ultrasonic sensor may recognize position information of a sensing object by using an ultrasonic wave. The controller 180 may be able to calculate a position of a wave generating source from information sensed by an optical sensor and a plurality of ultrasonic sensors. The position of the wave generating source may be calculated by using the property of light that light is much faster than an ultrasonic wave, that is, the time in which light reaches the optical sensor is much shorter than the time in which the ultrasonic wave reaches the ultrasonic sensor. More specifically, the position of the wave generating source may be calculated by using the difference between the arrival time of the ultrasonic wave and the arrival time of the light, with the light as a reference signal.

As an element of the input interface 120, the camera 121 may include at least one of a camera sensor (for example, a CCD or a CMOS), a photo sensor (or an image sensor), or a laser sensor.

The camera 121 and the laser sensor may be combined to sense a touch of a sensing object for a three-dimensional stereoscopic image. The photo sensor may be stacked on a display element and may be configured to scan a motion of the sensing object proximate to the touch screen. More specifically, the photo sensor may be formed by mounting a photo diode and a transistor (TR) in rows/columns to scan an object on the photo sensor by using an electrical signal which changes in accordance with the amount of light applied to the photo diode. That is, the photo sensor may calculate coordinates of a sensing object in accordance with a change in the amount of light, to thereby obtain position information of the sensing object.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

Further, the display 151 may be configured as a stereoscopic display which displays a stereoscopic video.

A three-dimensional display type, such as a stereoscopic type (a glasses type), an autostereoscopic type (a glasses-free type), and a projection type (a holographic type), may be applied to the stereoscopic display.

The sound output interface 152 may output audio data received from the wireless transceiver 110 in, for example, a call signal reception mode, a phone-call mode, a recording mode, a voice recognition mode, and a broadcast reception mode, or audio data stored in the memory 170. The sound output interface 152 may also output a sound signal (for example, a call signal reception sound and a message reception sound) related to a function performed in the mobile terminal 100. The sound output interface 152 may include, for example, a receiver, a speaker, and a buzzer.

The haptic module 153 may generate various tactile effects the user can feel. A representative example of the tactile effect generated by the haptic module 153 may be vibration. An intensity and a pattern of the vibration generated in the haptic module 153 may be controlled by the user or a setting of the controller 180. For example, the haptic module 153 may synthesize vibrations different from one another to output the synthesized vibrations, or sequentially output the different vibrations.

In addition to vibration, the haptic module 153 may generate various tactile effects, such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect through direct contact, but may also be implemented to allow the user to feel a tactile effect through muscular sensation of a finger or an arm. Two or more haptic modules 153 may be provided depending on the configuration of the mobile terminal 100.

The optical output interface 154 may output a signal for providing notification of occurrence of an event by using light of a light source of the mobile terminal 100. Examples of the events generated in the mobile terminal 100 may include, for example, message reception, call signal reception, missed call, alarm, schedule notification, email reception, and information reception through an application.

The signal outputted from the optical output interface 154 may be implemented as the mobile terminal 100 emits light of a single color or a plurality of colors to a front surface or a rear surface thereof. The output of the signal may end as the mobile terminal 100 senses confirmation of the event by the user.

The interface 160 may serve as a passage to all external devices that are connected to the mobile terminal 100. The interface 160 may receive data from an external device or may be supplied with the power source and transmit the supplied power source to each element in the mobile terminal 100, or may transmit data in the mobile terminal 100 to an external device. The interface 160 may include, for example, a wired/wireless headset port, an external charger port, a wired/wireless data port, a memory card port, a port for connecting a device equipped with an identification module, an audio input/output (I/O) port, a video input/output (I/O) port, and an earphone port.

The identification module may be a chip in which various information for authenticating a user right of the mobile terminal 100 is stored, and may include a user identification module (UIM), a subscriber identification module (SIM), and a universal subscriber identity module (USIM). A device provided with an identification module (hereinafter, "identification device") may be manufactured in the form of a smart card. Therefore, the identification device may be connected to the mobile terminal 100 through the interface 160.

When the mobile terminal 100 is connected to an external cradle, the interface 160 may serve as a passage through which power is supplied from the cradle to the mobile terminal 100 or a passage through which various command signals inputted to the cradle by a user are transmitted to the mobile terminal 100. Various command signals inputted from the cradle or the power source may serve as a signal for recognizing that the mobile terminal 100 has been precisely mounted in the cradle.

The memory 170 may store a program for operation of the controller 180, or temporarily store inputted/outputted data (for example, a phone book, a message, a still image, and a moving image). The memory 170 may store data on various patterns of vibration or sound outputted when a touch is inputted onto the touch screen.

The memory 170 may include at least one type of storage medium from among a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

As described above, the controller 180 may control an operation related to application programs and overall operation of the mobile terminal 100. For example, when the state of the mobile terminal 100 satisfies a predetermined condition, the controller 180 may perform a locking function which limits input of a control command of a user for applications or may release the locking function.

Further, the controller 180 may perform control and processing related to voice call, data communication, and video call, or perform a pattern recognition process by which a handwriting input or a picture drawing input performed on the touch screen may be recognized as a text or an image, respectively. Moreover, the controller 180 may control any one element or a combination of a plurality of the elements described above, to implement various embodiments of the mobile terminal 100 according to the present disclosure which will now be described below.

Under the control of the controller 180, the power supply 190 may be supplied with an external power or an internal power and may supply power required for operating each element. The power supply 190 may include a battery, wherein the battery may be an embedded rechargeable battery or may be detachably coupled to a body of the mobile terminal 100 to be charged.

Further, the power supply 190 may be provided with a connection port, and the connection port may be configured as one example of the interface 160 to which an external charger that supplies power for charging the battery is electrically connected.

As another example, the power supply 190 may be configured to wirelessly charge the battery without using the connection port. Here, the power supply 190 may receive power from an external wireless power transmission device by using one or more of an inductive coupling scheme based on a magnetic induction phenomenon or a magnetic resonance coupling scheme based on an electromagnetic resonance phenomenon.

Various embodiments that will now be described below may be implemented in a recording medium which can be read by a computer or a device similar thereto by using software, hardware, or a combination thereof, for example.

The display 151 may display (output) information processed in the mobile terminal 100. For example, the display 151 may display execution screen information of an application program driven in the mobile terminal 100, or user interface (UI) and graphic user interface (GUI) information in accordance with the execution screen information.

The display 151 may include at least one of a liquid crystal display (LCD), a thin film transistor liquid crystal display (TFT LCD), an organic light emitting diode (OLED), a flexible display, a three-dimensional display (3D display), or an electronic ink display (e-ink display).

Further, the display 151 may be two or more displays 151 depending on the implementation of the mobile terminal 100. Here, a plurality of displays 151 may be disposed to be spaced apart from each other or disposed integrally on one surface of the mobile terminal 100, or each of the plurality of displays 151 may be disposed on different surfaces of the mobile terminal 100.

The display 151 may include a touch sensor which senses a touch on the display 151 so as to receive input of a control command in the touch method. When a touch is made on the display 151, the touch sensor may sense the touch, and on the basis of the sensed touch, the controller 180 may generate a control command corresponding to the sensed touch. Contents inputted through the touch method may include letters, numbers, instructions in various modes, and menu items.

The microphone 122 may be configured to receive voice of the user and other sounds. The microphone 122 may be provided in a plurality of positions so as to receive stereo sounds.

The interface 160 may serve as a passage connecting the mobile terminal 100 to external devices. For example, the interface 160 may be at least one of a connection terminal for connection with other devices (for example, an earphone or an external speaker), a port for short-range communications (for example, an infrared port (IrDA port), a Bluetooth port, a wireless LAN port, etc.), or a power supply terminal for supplying power to the mobile terminal 100. The interface 160 may be implemented in the form of a socket accommodating an external card, such as a subscriber identification module (SIM), a user identity module (UIM), and a memory card for storing information.

At least one antenna for wireless communications may be provided in the body of the mobile terminal 100. The antenna may be embedded in the body of the mobile terminal 100 or may be formed in a case. For example, an antenna that forms a part of the broadcast receiving module 111 (see FIG. 1) may be implemented so as to be drawable from the body of the mobile terminal 100. Alternatively, the antenna may be formed as a film type to be attached to an inner surface of a housing, or a case including a conductive material may serve as an antenna.

The power supply 190 (see FIG. 1) for supplying power to the mobile terminal 100 may be provided in the body of the mobile terminal 100. The power supply 190 may be embedded in the body of the mobile terminal 100, or may include a battery 191 outside the body of the mobile terminal 100, the battery 191 being detachable.

The battery 191 may be configured to be supplied with power through a power cable connected to the interface 160. Further, the battery 191 may be configured to be wirelessly charged by a wireless charging device. The wireless charging may be implemented by a magnetic induction scheme or a resonance scheme (magnetic resonance scheme).

An accessory that protects an exterior of the mobile terminal 100 or supports or extends a function thereof may be added to the mobile terminal 100. An example of the accessory may be a cover that covers at least one surface of the mobile terminal 100 or a pouch accommodating the mobile terminal 100. The cover or the pouch, in conjunction with the display 151, may extend the function of the mobile terminal 100. Another example of the accessory may be a touch pen which supports or extends a touch input on the touch screen.

The flexible display device 1 according to the embodiment of the present disclosure may include a flexible display 300 which is configured to be deformed by an external force.

The deformation may be at least one of warping, bending, folding, twisting, rolling, or spreading of a display module. Such a deformable display module may be referred to as a "flexible display." Here, the flexible display 300 may include a general flexible display, an electronic paper (e-paper), and a combination thereof.

A general flexible display refers to a durable display which, while still having characteristics of existing flat panel displays, is produced on a thin and flexible substrate which can be warped, bent, folded, twisted, rolled, and spread like paper, so as to be light in weight and not to be easily broken.

Further, electronic paper is a display technique to which characteristics of general ink are applied. Electronic paper may be different from existing flat panel displays in that electronic paper uses reflection light. Electronic paper may change information thereon by using a twist ball or electrophoresis using a capsule.

Information displayed on the flexible display 300 may include visual information outputted on a curved surface. The visual information may be implemented as the light emission of unit pixels (sub pixels) that are arranged in a matrix form is independently controlled. The unit pixel refers to a minimum unit for implementing one color.

A portion of the flexible display 300 may be in a bent state, not in a flat state. Here, when an external force is applied to the flexible display 300, a portion of the flexible display 300 may be deformed into a flat state, a less bent state, or a more bent state.

Meanwhile, the flexible display 300 may be combined with a touch sensor to implement a flexible touch screen. When a touch input is made on the flexible touch screen, the controller 180 (see FIG. 1) may perform control corresponding to the touch input. The flexible touch screen may be configured to sense a touch input while a portion of the flexible display 300 is in the flat state or in the bent state.

A flexible display device 1 according to the example in which the flexible display 300 is deformable may include a deformation sensor capable of sensing deformation in the flexible display 300. The deformation sensor may be included in the sensor 140 (see FIG. 1).

The deformation sensor may be provided in the flexible display 300 or in a body 200, and may sense information related to deformation of the flexible display 300. Here, the information related to the deformation may include information on a direction in which the flexible display 300 is deformed, information on a degree of the deformation of the flexible display 300, information on a position of the deformation in the flexible display 300, information on a time of the deformation, and information on an acceleration at which the deformed flexible display 300 is recovered. In addition to the above information, various other types of information that can be sensed as the flexible display 300 is bent may also be included.

Further, the controller 180 (see FIG. 1) may change information displayed on the flexible display 300 or generate a control signal for controlling a function of the flexible display device 1, on the basis of the information related to the deformation of the flexible display 300 sensed by the deformation sensor.

The deformation of the flexible display 300 may not be limited to the deformation caused by an external force. For example, when the flexible display 300 is in a state in which a portion thereof is spread, the portion may be deformed to be bent by a command of the user or an application.

FIG. 2a is a perspective view of the flexible display device 1 in a first state, and FIG. 2b is a perspective view of the flexible display device 1 of FIG. 2a in a second state in which the flexible display has been deformed.

FIG. 3a is a rear view of the flexible display device 1 of FIG. 2a, and FIG. 3b is a rear view of the flexible display device 1 of FIG. 2b.

FIG. 4 is an exploded perspective view of the flexible display device 1 of FIG. 2a.

The flexible display device 1 may include a body 200, a plurality of support bars 370, and a support 400. The body 200 may include a first body 200a and a second body 200b.

In describing embodiments of the present disclosure, a first direction (X direction), a second direction (Y direction), and a third direction (Z direction) shown in the drawings are directions perpendicular to one another.

The flexible display device 1 may include two surfaces 1a and 1b which are opposite to each other. In other words, the flexible display device 1 may include a first surface 1a and a second surface 1b. A direction the first surface 1a faces (i.e. a direction perpendicular to or substantially perpendicular to the first surface 1a) may be opposite to a direction the second surface 1b faces (i.e. a direction perpendicular to or substantially perpendicular to the second surface 1b). In the flexible display device 1, the first surface 1a may face the third direction (Z direction), and the second surface 1b may face a direction opposite to the third direction (Z direction). When the first surface 1a is a front surface of the flexible display device 1, the second surface 1b may be a rear surface of the flexible display device 1.

Hereinafter, unless otherwise specified, the third direction (Z direction) refers to the forward direction of the flexible display device 1, and the direction opposite to the third direction (Z direction) refers to the rearward direction of the flexible display device 1.

The body 200 may form the overall shape of the flexible display device 1. The body 200 may form the frame of the flexible display device 1. The body 200 may be made of a relatively hard material. For example, the body 200 may be made of plastic, carbon, metal, or a combination thereof. Other components of the flexible display device 1 may be coupled to the body 200.

The body 200 may be formed in various shapes so as to support other components coupled thereto.

The body 200 may have a flat shape as a whole, or may have a curved shape such as a curved surface. An interior of the body 200 may be fully filled or may not be fully filled.

For example, when viewed from the front (third direction), the body 200 may have a quadrangular shape as a whole, and may be flat as a whole.

The body 200 may be divided into two or more parts. As described in detail above, the body 200 may include the first body 200a and the second body 200b, and the first body 200a and the second body 200b may be formed to move relative to each other (see FIGS. 2a, 2b, 3a, and 3b).

The second body 200b may slide and reciprocate relative to the first body 200a. Accordingly, when viewed from the front, the total area occupied by the body 200 may change as the second body 200b moves.

The second body 200b may reciprocate relative to the first body 200a between a first position and a second position.

When viewed from the front or rear, the total area occupied by the body 200 (the area of the body 200 projected in the Z direction) may be the smallest when the second body 200b is in the first position (see FIGS. 2a and 3a), and the total area occupied by the body 200 (the area of the body 200 projected in the Z direction) may be the largest when the second body 200b is in the second position (see FIGS. 2b and 3b).

When viewed from the front or rear, the overlapping area between the first body 200a and the second body 200b may be the largest when the second body 200b is in the first position (see FIGS. 2a and 3a), and the overlapping area between the first body 200a and the second body 200b may be the smallest when the second body 200b is in the second position (see FIGS. 2b and 3b).

A movement direction of the second body 200b relative to the first body 200a may be parallel to the first direction (X direction).

The first body 200a may have a predetermined length in the first direction (X direction), and may also have a predetermined length in the second direction (Y direction) orthogonal to the first direction. The first body 200a may have a predetermined length in the third direction (Z direction) orthogonal to the first and second directions, but the length of first body 200a in the third direction may be sufficiently small compared to the lengths thereof in the first and second directions. Accordingly, the first body 200a may be formed to be flat or substantially flat along the first and second directions.

The first body 200a may have a plate shape.

The second body 200b may have a predetermined length in the first and second directions. The second body 200b may have a predetermined length in the third direction, but the length of the second body 200b in the third direction may be sufficiently small compared to the lengths thereof in the first and second directions. Accordingly, the second body 200b may be formed to be flat or substantially flat in the first and second directions.

The second body 200b may have a plate shape.

The first body 200a and the second body 200b may be formed in the shape of plates parallel to each other.

FIG. 5a is a perspective view of a flexible display separated from the flexible display device in the first state, and FIG. 5b is a perspective view of the flexible display of FIG. 5a when the flexible display has been deformed (i.e. when the flexible display device is in the second state).

FIG. 6a is a cross-sectional view of the flexible display device of FIG. 2a taken along the line A to A'. FIG. 6b is a cross-sectional view of the flexible display device of FIG. 6a when the flexible display device has been deformed.

FIG. 7a is a cross-sectional view of the flexible display separated from the flexible display device of FIG. 6a, and FIG. 7b is a cross-sectional view of the flexible display separated from the flexible display device of FIG. 6b.

The support 400 may be fixed to the second body 200b.

The support 400 may be formed along the second direction (Y). The support 400 may be formed to extend in the second direction (Y direction), and may have a constant cross section along the second direction.

In the flexible display device 1, the support 400 may be formed to support a portion of an inner surface of the flexible display 300. That is, a portion of the flexible display 300 may be curved around the support 400, and a direction of formation of the flexible display 300 may be changed along the circumferential direction of the support 400.

The support 400 may be formed to rotate in both directions about a central axis 401 which is parallel to the second direction. That is, the support 400 may be coupled to the second body 200b so as to rotate about the central axis 401.

The support 400 may be formed in the shape of a roller.

The flexible display 300 may be formed in the form of a thin film, and may have an outer surface and an inner surface. The outer surface of the flexible display 300 may be a surface facing an outside of the flexible display device 1, and the inner surface of the flexible display 300 may be a surface facing an inside of the flexible display device 1. An image may be displayed on at least a portion of the outer surface of the flexible display 300.

When the second body 200b moves relative to the first body 200a, the flexible display 300, which is formed such that at least a portion thereof is curved, may change in shape.

The flexible display 300 may include a first region 310 and a second region 320 which are connected to each other.

The flexible display 300 may include a first region 310, a second region 320, and a third region 330, which are sequentially connected. The flexible display 300 may include a fourth region 340.

If the flexible display 300 is not coupled to the body 200 and is spread flat, the fourth region 340, the first region 310, the second region 320, and the third region 330 may form a single plane.

Broken lines shown in FIG. 2b are imaginary lines respectively representing a boundary between the first region 310 and (a first connected region 321 of) the second region 320, a boundary between the first region 310 and the fourth region 340, and a boundary between the first connected region 321 and a second connected region 322.

The first region 310 may have a predetermined area and may be coupled to the body 200 from any one side of the body 200. The first region 310 may be coupled to the first body 200a, and may be fixed to the first body 200a. That is, the first region 310 may be formed so as not to move relative to the first body 200a.

The first region 310 may be parallel to the first and second directions. The first region 310 may be fixed in front of the first body 200a. The first region 310 may be fixed in front of the first body 200a based on the third direction. The first region 310 and the first body 200a may be coupled to each other so as to be parallel to each other.

In an embodiment of the present disclosure, the first region 310 may form a curved surface as a whole. Here, a curvature of the first region 310 may be smaller than a curvature of the first connected region 321, which will be described below, and a radius of curvature of the first region 310 may be greater than a radius of curvature of the first connected region 321. The radius of curvature of the first region 310 may be sufficiently greater than the radius of curvature of the first connected region 321. For example, when the radius of curvature of the first connected region 321 is "a," the radius of curvature of the first region 310 may be "10*a" or greater.

In another embodiment of the present disclosure, the first region 310 may form a plane surface as a whole. The first region 310 may form a planar outer surface of the flexible display 300 and may be disposed on a front surface of the body 200. The first region 310 may have a constant cross section in the first and second directions.

Hereinafter, description will be made on the assumption that the first region 310 of the flexible display device 1 is a plane surface.

A direction the first region 310 faces (i.e. a direction an outer surface of the first region 310 faces) may be the third direction. The first region 310 may form a part or the entirety of the first surface 1a of the flexible display device 1.

The fourth region 340 may extend from the first region 310 and form an end portion of the flexible display 300. The fourth region 340 may have a constant cross section along the second direction, and may form a curved surface. An image may be displayed on the fourth region 340.

The second region 320 may extend from the first region 310, and a portion of the second region 320 may be curved around support 400. That is, a direction of formation of the second region 320 may be changed as the second region 320 passes around the support 400.

The second region 320 may have a constant cross section along the second direction.

A portion of the second region 320 may be curved into a semicircular shape, and a curved position of the second region 320 may change according to movement of the second body 200b. When the second body 200b is in the first position, the first connected region 321 may be curved into a semicircular shape, and when the second body 200b is in the second position, a portion of the second connected region 322 may be curved into a semicircular shape.

The second region 320 may include the first connected region 321 and the second connected region 322.

The first connected region 321 may be directly connected to the first region 310, and the second connected region 322 may be directly connected to the first connected region 321 and the third region 330.

When the second body 200b is in the first position, the first connected region 321 may form a curved surface along the circumferential direction of the support 400.

When the second body 200b is in the first position, the first connected region 321 may form an outer surface of the flexible display 300 that is curved about a curvature center line CL1. When the second body 200b is in the first position, the curvature center line CL1 may be an imaginary straight line that forms a center of curvature of the first connected region 321, and may be parallel to the second direction.

When the second body 200b is in the first position, a cross section of the first connected region 321 may form a semicircular shape.

The curvature center line CL1 may coincide with the central axis 401 of support 400.

When the second body 200b is in the second position, the curvature center line CL1 may be a center of curvature of the second connected region 322 forming a curved surface.

An image may be displayed on the first connected region 321 and the first region 310.

A surface area of the first region 310 may be greater than a surface area of the first connected region 321.

When the second body 200b is in the first position, the second connected region 322 may form an outer surface of the flexible display 300 that is an opposite surface to the first region 310. That is, when the second body 200b is in the first position, and the first region 310 faces the third direction (Z direction), the second connected region 322 may face a direction opposite to the third direction (Z direction). An image may be displayed on the second connected region 322.

The second connected region 322 may have a constant cross section along the second direction. When the second body 200b is in the first position, the second connected region 322 may have a constant cross section along the first direction.

The flexible display 300 may be formed in such a manner that the first region 310, the first connected region 321, and the second connected region 322 are sequentially connected, and when the second body 200b is in the first position, the first region 310, the first connected region 321, and the second connected region 322 may form a U-shape as a whole.

In one embodiment of the present disclosure, when the second body 200b is in the first position, the second connected region 322 may form a curved surface as a whole. Here, a curvature of the second connected region 322 may be smaller than a curvature of the first connected region 321, and a radius of curvature of the second connected region 322 may be greater than a radius of curvature of the first connected region 321. The radius of curvature of the second connected region 322 may be sufficiently greater than the radius of curvature of the first connected region 321. For example, when the radius of curvature of the first connected region 321 is "a," the radius of curvature of the second connected region 322 may be "10*a" or greater.

In another embodiment of the present disclosure, when the second body 200b is in the first position, the second connected region 322 may form a plane surface as a whole. In addition, the second connected region 322 may be parallel to the first region 310. Hereinafter, description will be made on the assumption that when the second body 200b is in the first position, the second connected region 322 forms a plane surface and is parallel to the first region 310.

The third region 330, on the opposite side to the first region 310, may extend from the second region 320. The third region 330 may be formed to extend from the second connected region 322 and may form an end portion of the flexible display 300.

In the flexible display 300, the first region 310, the second region 320, and the fourth region 340 may be configured to display an image thereon, and the third region 330 may be configured not to display an image thereon. In the flexible display 300, the third region 330 may be an extended portion of a display substrate, and may form a dummy portion on which an image is not displayed.

The third region 330 may be formed separately from the flexible display 300 and then be coupled to the flexible display 300. Or, the third region 330 may be formed integrally with the flexible display 300 in the manufacturing process of the flexible display 300. The third region 330 may be formed as a substrate of the flexible display 300.

The third region 330 may be formed in the form of a plastic film, and may be flexibly curved.

The camera 121 may be fixed to a rear surface of the body 200. The camera 121 may be coupled to the body 200 so as to face the direction opposite to the third direction (Z direction).

The camera 121 may be fixed to a rear surface of the first body 200a.

The camera 121 may be fixed to the body 200 at a portion away from the support 400. That is, if the support 400 is coupled to the body 200 at a lower portion of the flexible display device 1, the camera 121 may be coupled to the body 200 at an upper portion of the flexible display device 1. The camera 121 may be fixed to an edge of the first body 200a that is farthest from the support 400.

The camera 121 may be two or more cameras 121 arranged in the second direction.

The first body 200a may include a support plate 230.

The support plate 230 may be formed in a flat plate shape, and may be formed in a size the same as or similar to a size of the first region 310. The support plate 230 may be coupled in a form in which the first region 310 is laminated on an outside (front side) of the support plate 230, and the support plate 230 may support the first region 310 from inside the first region 310.

The first body 200a may include a first edge portion 205.

The first edge portion 205 may form any one edge of the flexible display device 1. The first edge portion 205 may form any one side of the flexible display device 1 having a rectangular shape.

The first edge portion 205 may form an upper side edge of the first body 200a.

The first edge portion 205 may be fixed to the first body 200a. The first edge portion 205 may be integrally formed with the first body 200a, or may be formed separately from the first body 200a and then fixed thereto.

The first edge portion 205 may generally be formed to extend in the second direction (Y direction).

At least a portion of the first edge portion 205 may have a constant cross section in the second direction (Y direction). An outer surface of the first edge portion 205 may form a convex curved surface, and a cross section of the first edge portion 205 may have, for example, a semicircular shape.

The fourth region 340 may be fixed to the first edge portion 205.

The first body 200a may include a first side edge portion 210 and a second side edge portion 220. The first side edge portion 210 and the second side edge portion 220 may form edges on both sides of the first body 200a, and may extend in the first direction. The first side edge portion 210 may be formed over the entire section of any one edge of the first body 200a, or may be formed over a partial section thereof. The second side edge portion 220 may be formed over the entire section of any one edge of the first body 200a, or may be formed over a partial section thereof.

The first side edge portion 210 and the second side edge portion 220 may be formed to be parallel to the first direction, and may have constant cross sections in the first direction. If the first side edge portion 210 forms a left side edge of the first body 200a, the second side edge portion 220 may form a right side edge of the first body 200a.

The second body 200b may include a second edge portion 206.

The second edge portion 206 may form an edge of the flexible display device 1 on the opposite side of the flexible display device 1 to the first edge portion 205. If the first edge portion 205 forms an upper side edge of the flexible display device 1, the second edge portion 206 may form a lower side edge of the flexible display device 1.

The second edge portion 206 may be disposed at an outer side of the support 400.

Between the second edge portion 206 and the support 400, a gap 207, which is relatively narrow, may be provided, and through the gap 207, the flexible display 300 may move, forming a curved surface (see FIGS. 6a and 6b).

In addition, a connection arm 373 of the support bar 370 may move through the gap 207.

The second edge portion 206 may be fixed to the second body 200b. The second edge portion 206 may be integrally formed with the second body 200b, or may be formed separately from the second body 200b and then fixed thereto.

The second edge portion 206 may generally be formed to extend in the second direction (Y direction).

At least a portion of the second edge portion 206 may have a constant cross section along the second direction (Y direction). An outer surface of the second edge portion 206 may form a convex curved surface, and a cross section of the second edge portion 206 may have a semicircular shape.

The second body 200b may include a third side edge portion 250 and a fourth side edge portion 260. The third side edge portion 250 and the fourth side edge portion 260 may form edges on both sides of the second body 200b, and may be formed to extend in the first direction. The third side edge portion 250 and the fourth side edge portion 260 may be formed to be parallel to the first direction, and may have constant cross sections along the first direction.

If the third side edge portion 250 forms a left side edge of the second body 200b, the fourth side edge portion 260 may form a right side edge of the second body 200b.

The third side edge portion 250 may be disposed to align with the first side edge portion 210, and may be disposed so as to come into close contact with the first side edge portion 210 or to be close thereto.

The third side edge portion 250 may be disposed at an outer side of the first side edge portion 210 or at an inner side of the first side edge portion 210.

The fourth side edge portion 260 may be disposed to align with the second side edge portion 220, and may be disposed so as to come into close contact with the second side edge portion 220 or to be close thereto.

The fourth side edge portion 260 may be disposed at an outer side of the second side edge portion 220 or at an inner side of the second side edge portion 220.

The flexible display device 1 may include a back cover 280.

The back cover 280 may be formed in a shape of a plate that is substantially parallel to the first direction (X direction) and the second direction (Y direction). The back cover 280 may be parallel to or substantially parallel to the first region 310.

The back cover 280 may form a rear surface of the second body 200b. The back cover 280 may be fixed to the second body 200b or may be detachably coupled to the second body 200b.

The back cover 280 may be formed to be transparent or opaque.

When the second body 200b is in the first position, a surface area of the back cover 280 may correspond to a surface area of the second connected region 322, or may be equal to or greater than the surface area of the second connected region 322.

When the back cover 280 is formed to be transparent, an image displayed on the second connected region 322 while the second body 200b is in the first position may be seen through the back cover 280.

The flexible display device 1 according to the embodiment of the present disclosure may include a plurality of support bars 370.

Each of the plurality of support bars 370 may be formed to extend generally in the second direction, and may be fixed to an inner surface of the second region 320. The plurality of support bars 370 may be directly fixed to the second region 320, or may be fixed thereto by means of a separate element.

Each of the plurality of support bars 370 may support the first connected region 321 or the second connected region 322 from inside the first connected region 321 or the second connected region 322, and the plurality of support bars 370 may be disposed one by one along the first connected region 321 and the second connected region 322.

Each of the plurality of support bars 370 may be disposed to be parallel to one another.

The plurality of support bars 370 may be made of a relatively hard material so as to support the flexible display 300. The plurality of support bars 370 may be made of plastic or metal.

The flexible display device 1 may further include an inner plate 350.

The inner plate 350 may be coupled in a form in which the inner plate 350 is stacked on an inner surface of the flexible display 300.

The inner plate 350 may be formed of a metal plate having elasticity. The inner plate 350 may include a superelastic metal. The inner plate 350 may be formed in a shape of a relatively thin plate. The inner plate 350 may have a thickness in the range of 0.05 mm to 0.2 mm, and may have a thickness of 0.1 mm.

According to an embodiment of the present disclosure, the inner plate 350 may be formed in the same or similar size and in the same or similar shape as the flexible display 300 such that the inner plate 350 is coupled to an entire inner surface of the flexible display 300.

According to another embodiment of the present disclosure, the inner plate 350 may be formed in the same or similar size and in the same or similar shape as the second region 320 such that the inner plate 350 is coupled to an inner surface of the second region 320.

The inner plate 350 may facilitate elastic deformation and elastic recovery of the flexible display 300.

When the inner plate 350 is provided in the flexible display device 1, the plurality of support bars 370 may be coupled to the flexible display 300 by means of the inner plate 350. That is, the inner plate 350 may be fixed to the inner surface of the flexible display 300, and the plurality of support bars 370 may be fixed to an inner surface of the inner plate 350.

The flexible display device 1 may further include a sliding plate 360.

The sliding plate 360 may generally be formed in a shape of a flat plate extending along the second direction. The sliding plate 360 may be made of metal, plastic, and the like.

The sliding plate 360 may be fixed to an end portion of the flexible display 300. The sliding plate 360 may be fixed to the third region 330.

The sliding plate 360 may be coupled to the second body 200b such that the sliding plate 360 moves relative to the second body 200b along the first direction.

The sliding plate 360 may be slidably coupled to the second body 200b, and for this, both end portions of the sliding plate 360 may respectively be inserted into a first rear guide groove 252 and a second rear guide groove 262 and move therein.

FIG. 8a is a cross-sectional view illustrating inner surfaces of the third side edge portion 250 and the second edge portion 206, and FIG. 8b is a cross-sectional view illustrating inner surfaces of the fourth side edge portion 260 and the second edge portion 206.

FIG. 9 is a cross-sectional view schematically illustrating a state in which the support bar 370, the inner plate 350, and the flexible display 300 are coupled.

The second body 200b may include a first movement guide groove 251 and a second movement guide groove 261.

The first movement guide groove 251 may be formed as a U-shaped groove, and may form a path into which a first support slider 371, which will be described below, is inserted and moves therein.

The second movement guide groove 261 may be formed as a U-shaped groove, and may form a path into which a second support slider 372, which will be described below, is inserted and moves therein.

The first movement guide groove 251 may include a first rear guide groove 252, a first front guide groove 253, and a first connection guide groove 254.

The second movement guide groove 261 may include a second rear guide groove 262, a second front guide groove 263, and a second connection guide groove 264.

The first rear guide groove 252 and the first front guide groove 253 may be formed in the third side edge portion 250, and the second rear guide groove 262 and the second front guide groove 263 may be formed in the fourth side edge portion 260.

In one embodiment of the present disclosure, the first connection guide groove 254 may be formed in the third side edge portion 250, and the second connection guide groove 264 may be formed in the fourth side edge portion 260. In another embodiment of the present disclosure, the first connection guide groove 254 and the second connection guide groove 264 may be formed in the second edge portion 206.

The first rear guide groove 252 may form a space inside the third side edge portion 250, may have a constant cross section along the first direction, and may be formed to be open inwards from a rear side of the third side edge portion 250.

The first front guide groove 253 may form a space inside the third side edge portion 250, may have a constant cross section along the first direction, and may be formed to be open inwards from a front side of the third side edge portion 250. The first front guide groove 253 may be symmetric with respect to the first rear guide groove 252.

The first connection guide groove 254 may form a semi-circular-shaped space inside the second edge portion 206 of the second body 200b and may connect the first rear guide groove 252 to the first front guide groove 253.

The first rear guide groove 252, the first connection guide groove 254, and the first front guide groove 253 may form a U-shaped space together, and may form a movement path of the plurality of support bars 370 (in particular, the first support slider 371) to serve as a rail, which will be described below.

The second rear guide groove 262 may form a space inside the fourth side edge portion 260, may have a constant cross section along the first direction, and may be formed to be open inwards from a rear side the fourth side edge portion 260.

The second front guide groove 263 may form a space inside the fourth side edge portion 260, may have a constant cross section along the first direction, and may be formed to be open inwards from a front side of the fourth side edge portion 260. The second front guide groove 263 may be symmetric with respect to the second rear guide groove 262.

The second connection guide groove 264 may form a semicircular-shaped space inside the second edge portion 206 of the second body 200b and may connect the second rear guide groove 262 to the second front guide groove 263.

The second rear guide groove 262, the second connection guide groove 264, and the second front guide groove 263 may form a U-shaped space together, and may form a movement path of the plurality of support bars 370 (in particular, the second support slider 372) to serve as a rail, which will be described below.

The first rear guide groove 252, the first front guide groove 253, and the first connection guide groove 254 may respectively be symmetric to the second rear guide groove 262, the second front guide groove 263, and the second connection guide groove 264.

Each of the plurality of support bars 370 may be formed to extend in the second direction (Y direction) as a whole.

Each of the plurality of support bars 370 may include a first support slider 371, a second support slider 372, and a connection arm 373.

The first support slider 371 may form an end portion of the plurality of support bars 370 at one side thereof.

The first support slider 371 may be inserted into the first rear guide groove 252, the first connection guide groove 254, and the first front guide groove 253, so as to move along the space (path) formed by the first rear guide groove 252, the first connection guide groove 254, and the first front guide groove 253.

The second support slider 372 may form the other end portion of the plurality of support bars 370 in the opposite side to the first support slider 371.

The second support slider 372 may be inserted into the second rear guide groove 262, the second connection guide groove 264, and the second front guide groove 263, so as to move along the space (path) formed by the second rear guide groove 262, the second connection guide groove 264, and the second front guide groove 263.

The connection arm 373 may have a constant cross section along the second direction (Y direction).

The connection arm 373 may connect the first support slider 371 to the second support slider 372, may support an inner surface of the flexible display 300, and may assist in maintaining the first connected region 321 and the second connected region 322 in a stable plane surface or curved surface.

The connection arm 373 may be formed in such a shape that a cross section thereof is a trapezoid (i.e. in a shape in which a width of the connection arm 373 becomes increasingly smaller away from a rear surface of the flexible display 300).

The plurality of support bars 370 may have a predetermined thickness such that when the plurality of support bars 370, which are successively arranged, form a plane parallel to the first region 310, the second region 320, which is supported by the plurality of support bars 370, are maintained stable like the first region 310.

A front surface of the connection arm 373 and a front surface of the support plate 230 may form a single plane.

The second region 320 may be maintained in a stable state by means of the plurality of support bars 370. In particular, when the second region 320 is formed as a touch screen to receive a touch input, the second region 320 may be stably supported by the plurality of support bars 370.

FIG. 10a and FIG. 10b are perspective views respectively illustrating some parts of the flexible display device 1 according to an embodiment of the present disclosure. In FIG. 10a, the second body 200b is in the first position, and in FIG. 10b, the second body 200b is in the second position. FIGS. 10a and 10b illustrate a first wheel 510 and a second wheel 520 in broken lines, and FIG. 10b illustrates expanded cross-sectional views of portions at which the first wheel 510 and the second wheel 520 are coupled.

FIG. 11a is a perspective view illustrating a state in which a first wheel 510 and a first bracket 530 (or a second wheel 520 and a second bracket 540) are coupled to each other according to an embodiment of the present disclosure, and FIG. 11b is an exploded perspective view of FIG. 11a.

FIG. 11c is a perspective view illustrating a state in which the first wheel 510 and the first bracket 530 (or the second wheel 520 and the second bracket 540) are decoupled from each other according to an embodiment of the present disclosure, and FIG. 11d is a cross-sectional view schematically illustrating a state in which the first wheel 510 and the first bracket 530 (or the second wheel 520 and the second bracket 540) of FIG. 11c are coupled to each other.

FIG. 12a illustrates a state in which the first wheel 510 and the first bracket 530 are coupled to a first coupling groove 212 of the first body 200a, FIG. 12b illustrates the first coupling groove 212 of the first body 200a, FIG. 12c illustrates a state in which the second wheel 520 and the second bracket 540 are coupled to a second coupling groove 222 of the first body 200a, and FIG. 12d illustrates the second coupling groove 222 of the first body 200a.

FIG. 13 is a rear view of the flexible display device 1 in the second state according to an embodiment of the present disclosure. In FIG. 13, the second body 200b is illustrated in broken lines.

In an embodiment, the flexible display device 1 may include a first rolling surface 257, a second rolling surface 267, a first wheel 510, and a second wheel 520.

The first rolling surface 257 and the second rolling surface 267 may form an inner surface of the second body 200b.

The first rolling surface 257 may be a surface that faces and comes into contact with the first wheel 510, and the second rolling surface 267 may be a surface that faces and comes into contact with the second wheel 520.

The first rolling surface 257 and the second rolling surface 267 may be formed to be parallel to the first direction (X direction). Each of the first rolling surface 257 and the second rolling surface 267 may be formed to have a constant cross section along the first direction (X direction).

The first rolling surface 257 may be formed to extend in the first direction (X direction). That is, the first rolling surface 257 may be formed such that a length of the first rolling surface 257 in the first direction (X direction) is greater than a length thereof in the second direction (Y direction) and the third direction (Z direction).

Hereinafter, unless otherwise specified, when it is described that "the length of A is relatively great in direction B," it means that the length of A in direction B is greater than the length of A in a direction other than direction B.

The first rolling surface 257 may be formed such that the length of the first rolling surface 257 in the first direction (X direction) is the same as or greater than the movement range (or stroke) of the second body 200b relative to the first body 200a. That is, the first rolling surface 257 may be formed such that the length of the first rolling surface 257 in the first direction (X direction) is the same as or greater than the movement distance of the second body 200b from the first position to the second position (or from the second position to the first position).

The second rolling surface 267 may be formed to extend in the first direction (X direction).

The second rolling surface 267 may be formed such that the length of the second rolling surface 267 in the first direction (X direction) is the same as or greater than the movement range (or stroke) of the second body 200b relative to the first body 200a. That is, the second rolling surface 267 may be formed such that the length of the second rolling surface 267 in the first direction (X direction) is the same as or greater than the movement distance of the second body 200b from the first position to the second position (or from the second position to the first position).

The first rolling surface 257 and the second rolling surface 267 may be symmetrical to each other about a reference surface CS. The reference surface CS described in the embodiments of the present disclosure is an imaginary surface that bisects the first body 200a and the second body 200b along a direction parallel to the first direction (X direction). Further, the reference surface CS may be formed to be parallel to the first direction (X direction) and the third direction (Z direction), and may be an imaginary surface that bisects the first body 200a and the second body 200b.

The first wheel 510 may be rotatably coupled to the first body 200a. A first shaft 511, which forms a rotational axis S1 of the first wheel 510, may be fixedly coupled to the first body 200a, and the first wheel 510 may be rotatable relative to the first body 200a. When viewed along the rotational axis S1, the first wheel 510 may have a circular shape.

The first wheel 510 may come into contact with the first rolling surface 257 on a lateral surface of the first wheel 510 in a first contact direction CD1 perpendicular to the first direction (X direction). The first contact direction CD1 may be variously formed within the scope in which the first contact direction CD1 is perpendicular to the first direction (X direction).

The second wheel 520 may be rotatably coupled to the first body 200a. A second shaft, which is a rotational axis S2 of the second wheel 520, may be fixedly coupled to the first body 200a, and the second wheel 520 may be rotatable relative to the first body 200a. When viewed along the rotational axis S2, the second wheel 520 may have a circular shape.

The second wheel 520 may come into contact with the second rolling surface 267 on a lateral surface of the second wheel 520 in a second contact direction CD2 perpendicular to the first direction (X direction). The second contact direction CD2 may be variously formed in the scope in which the second contact direction CD2 is perpendicular to the first direction (X direction).

The first contact direction CD1 and second contact direction CD2 may be symmetrical to each other about the reference surface CS.

In an embodiment, the first wheel 510 may be positioned further outside than the first rolling surface 257 while coming into contact with the first rolling surface 257, and the second wheel 520 may be positioned further outside than the second rolling surface 267 while coming into contact with the second rolling surface 267.

In another embodiment, the first wheel 510 may be positioned further inside than the first rolling surface 257 while coming into contact with the first rolling surface 257, and the second wheel 520 may be positioned further inside than the second rolling surface 267 while coming into contact with the second rolling surface 267.

The rotational axis S1 of the first wheel 510 may be parallel to a direction perpendicular to a surface of the first region 310. That is, the rotational axis S1 of the first wheel 510 may be parallel to the third direction (Z direction).

The rotational axis S2 of the second wheel 520 may be parallel to a direction perpendicular to the surface of the first region 310, and may be parallel to the third direction (Z direction).

In an embodiment, the first wheel 510 may include a first shaft 511, a first bearing 512, and a first rubber cap 513.

The first shaft 511 may form the rotational axis S1 of the first wheel 510, and may be formed to extend along the third direction (Z direction). The first shaft 511 may be fixed to the first side edge portion 210.

The first bearing 512 may be rotatably coupled to the first shaft 511.

The first bearing 512 may be formed in the shape of a general bearing. For example, the first bearing 512 may include an inner ring 512a, an outer ring 512b, and a plurality of balls 512c.

In an embodiment, the first rubber cap 513 may be made of a rubber material. The first rubber cap 513 may be formed so as to be elastically deformable, and may be formed to be relatively soft. The first rubber cap 513 may be uniformly formed along a circumferential direction of the first wheel 510 about the rotational axis S1, and may form an outer circumferential surface of the first wheel 510.

The first rubber cap 513 may be fixedly coupled to an outer circumferential surface of the first bearing 512. That is, the first rubber cap 513 may be fixedly coupled to the outer ring 512b of the first bearing 512.

In an embodiment, the second wheel 520 may include a second shaft 521, a second bearing 522, and a second rubber cap 523.

The second shaft 521 may form the rotational axis S2 of the second wheel 520, and may be formed to extend along the third direction (Z direction). The second shaft 521 may be fixed to the second side edge portion 220.

The second bearing 522 may be rotatably coupled to the second shaft 521.

The second bearing 522 may be formed in the shape of a general bearing. For example, the second bearing 522 may include an inner ring 522a, an outer ring 522b, and a plurality of balls 522c.

In an embodiment, the second rubber cap 523 may be made of a rubber material. The second rubber cap 523 may be formed so as to be elastically deformable, and may be formed to be relatively soft. The second rubber cap 523 may be uniformly formed along a circumferential direction of the second wheel 520 about the rotational axis S2, and may form an outer circumferential surface of the second wheel 520.

The second rubber cap 523 may be fixedly coupled to an outer circumferential surface of the second bearing 522. That is, the second rubber cap 523 may be fixedly coupled to the outer ring 522b of the second bearing 522.

In an embodiment, the first wheel 510 may include the first shaft 511, a first rotation part 514, and the first rubber cap 513. That is, the first wheel 510 may include the first rotation part 514 instead of the first bearing 512 described in detail above.

The first rotation part 514 may be made of an engineering plastic having lubricity. In an embodiment, the first rotation part 514 may be made of polyacetal (POM). The first rotation part 514 may be rotatably coupled to the first shaft 511.

When the first wheel 510 includes the first rotation part 514, the first rubber cap 513 may be fixedly coupled to an outer circumferential surface of the first rotation part 514. Here, a thickness d1 of the first rubber cap 513 in the direction of the rotational axis S1 may be smaller than a thickness d2 of the first rotation part 514 in the direction of the rotational axis S1.

In an embodiment, the second wheel 520 may include the second shaft 521, a second bearing 524, and the second rubber cap 523. That is, the second wheel 520 may include the second rotation part 524 instead of the second bearing 522 described in detail above.

The second rotation part 524 may be made of an engineering plastic having lubricity. In an embodiment, the second rotation part 524 may be made of polyacetal (POM). The second rotation part 524 may be rotatably coupled to the second shaft 521.

When the second wheel 520 includes the second rotation part 524, the second rubber cap 523 may be fixedly coupled to an outer circumferential surface of the second rotation part 524. Here, a thickness d1 of the second rubber cap 523 in the direction of the rotational axis S2 may be smaller than a thickness d2 of the second rotation part 524 in the direction of the rotational axis S2.

The first wheel 510 and the second wheel 520 may be formed in the same shape, in the same structure, and in the same size, and may be made of the same material. The first wheel 510 and the second wheel 520 may be symmetrical to each other about the reference surface CS.

When the first side edge portion 210 forms a portion of any one edge of the first body 200a, and the second side edge portion 220 forms a portion of another edge of the first body 200a on the opposite side, a length of each of the first side edge portion 210 and the second side edge portion 220 may be the same as or greater than the movement distance (or stroke) of the second body 200b relative to the first body 200a. That is, the length of each of the first side edge portion 210 and the second side edge portion 220 may be the same as or greater than the movement distance of the second body 200b from the first position to the second position (or from the second position to the first position).

When the third side edge portion 250 forms a portion of any one edge of the second body 200b, and the fourth side edge portion 260 forms a portion of another edge of the second body 200b on the opposite side, a length of each of the third side edge portion 250 and the fourth side edge portion 260 may be the same as or greater than the movement distance (or stroke) of the second body 200b relative to the first body 200a. That is, the length of each of the third side edge portion 250 and the fourth side edge portion 260 may be the same as or greater than the movement distance of the second body 200b from the first position to the second position (or from the second position to the first position).

The first side edge portion 210 and the second side edge portion 220 may be symmetrical to each other about the reference surface CS.

The third side edge portion 250 and the fourth side edge portion 260 may be symmetrical to each other about the reference surface CS.

In an embodiment, the first wheel 510 may be rotatably fixed to the first side edge portion 210, and the second wheel 520 may be rotatably fixed to the second side edge portion 220.

In an embodiment, the first rolling surface 257 may form an inner surface of the third side edge portion 250, and the second rolling surface 267 may form an inner surface of the fourth side edge portion 260.

In an embodiment, the flexible display device 1 may include a first bracket 530 and a second bracket 540. Also, the flexible display device 1 may include a first coupling groove 212 and a second coupling groove 222.

When the first bracket 530 and the second bracket 540 are provided in the flexible display device 1, the first wheel 510 may be coupled to the first side edge portion 210 by means of the first bracket 530, and the second wheel 520 may be coupled to the second side edge portion 220 by means of the second bracket 540.

The first bracket 530 may be made of a metal material. The first bracket 530 may include a first front cover 531 and a first rear cover 532. Each of the first front cover 531 and the first rear cover 532 may be formed by bending a metal board. Each of the first front cover 531 and the first rear cover 532 may be made of stainless steel.

The first front cover 531 and the first rear cover 532 may be formed to be symmetrical to each other in the forward-backward direction.

The first front cover 531 may include a first frontal central portion 531a, a first frontal upper portion 531b, and a first frontal lower portion 531c. The first frontal central portion 531a may be a central portion of the first front cover 531, and the first frontal upper portion 531b and the first frontal lower portion 531c may be formed to be bent on both sides of the first frontal central portion 531a.

The first rear cover 532 may include a first rear central portion 532a, a first rear upper portion 532b, and a first rear lower portion 532c. The first rear central portion 532a may be a central portion of the first rear cover 532, and the first rear upper portion 532b and the first rear lower portion 532c may be formed to be bent on both sides of the first rear central portion 532a.

The first front cover 531 and the first rear cover 532 may respectively include holes 533 and 534 formed therein to penetrate through the first front cover 531 and the first rear cover 532, and the first shaft 511, which forms the rotational axis S1, may be inserted into the holes 533 and 534 to be coupled thereto. The first shaft 511, which forms the rotational axis S1 of the first wheel 510, may be inserted into the holes 533 and 534 of the first front cover 531 and the first rear cover 532 and then may be fixed to the first bracket 530 by a welding process. By doing so, the first wheel 510 may be coupled to the first bracket 530.

The first bracket 530 may include a first spaced portion 530a, a first upper contact portion 530b, and a first lower contact portion 530c.

The first spaced portion 530a may be a central portion of the first bracket 530, and may be a portion that is formed as the first front cover 531 and the first rear cover 532 are spaced apart from each other. The first wheel 510 may be received in the first spaced portion 530a within the first bracket 530.

As described in detail above, when the first wheel 510 includes the first rotation part 514 and the first rubber cap 513, the thickness d1 of the first rubber cap 513 in the direction of the rotational axis S1 of the first wheel 510 may be smaller than the thickness d2 of the first rotation part 514 in the direction of the rotational axis S1. That is, the first rotation part 514 may protrude more than the first rubber cap 513 in the third direction (Z direction) and in the direction opposite to the third direction (Z direction).

Accordingly, when the first wheel 510 rotates while received within the first bracket 530, the first rubber cap 513 may not come into contact with inner surfaces of the first front cover 531 and the first rear cover 532 even when the first rotation part 514 comes into contact with the inner surfaces of the first front cover 531 and the first rear cover 532. Accordingly, the first wheel 510 may smoothly rotate within the first bracket 530 with the help of the first rotation part 514, which serves as a lubricant, and an outer circumferential surface of the first rubber cap 513 may come into contact with the first rolling surface 257 without slipping.

The first upper contact portion 530b and the first lower contact portion 530c may be portions of the first bracket 530 that are formed on both sides of the first spaced portion 530a, and may be portions at which the first front cover 531 and the first rear cover 532 come into close contact with each other. At the first upper contact portion 530b and the first lower contact portion 530c, the first front cover 531 and the first rear cover 532 may be welded to each other.

The first coupling groove 212 may be formed in the first side edge portion 210 in the shape of a concave groove that is dented inward from an outside of the first side edge portion 210. The first coupling groove 212 may be formed at a foremost portion of the first side edge portion 210 with respect to the first direction (X direction), or may be formed at a portion of the first side edge portion 210 that is adjacent to the foremost portion of the first side edge portion 210.

The first coupling groove 212 may include a first reception portion 212a and a first insertion portion 212b.

The first reception portion 212a may be a central portion of the first coupling groove 212, and may be a portion in which the first wheel 510 and the first spaced portion 530a of the first bracket 530 are positioned.

The first insertion portion 212b may be a portion that is formed on both sides of the first reception portion 212a. The first insertion portion 212b may be formed in the shape of a narrow slit in the first side edge portion 210 along the second direction (Y direction). The first upper contact portion 530b and the first lower contact portion 530c of the first bracket 530 may be fittingly inserted into the first insertion portion 212b. The first upper contact portion 530b and the first lower contact portion 530c of the first bracket 530 may be forcibly inserted into the first insertion portion 212b.

When the first wheel 510 is coupled to the first side edge portion 210, the lateral surface of the first wheel 510 may protrude slightly more than an outer side surface 211 of the first side edge portion 210. That is, the lateral surface of the first wheel 510 may protrude more than the outer side surface 211 of the first side edge portion 210 in the first contact direction CD1, and thus the first wheel 510 may come into contact with the first rolling surface 257 of the second body 200b.

The second bracket 540 may be made of a metal material. The second bracket 540 may include a second front cover 541 and a second rear cover 542. Each of the second front cover 541 and the second rear cover 542 may be formed by bending a metal board. Each of the second front cover 541 and the second rear cover 542 may be made of stainless steel.

The second front cover 541 and the second rear cover 542 may be formed to be symmetrical to each other in the forward-backward direction.

The second front cover 541 may include a second frontal central portion 541a, a second frontal upper portion 541b, and a second frontal lower portion 541c. The second frontal central portion 541a may be a central portion of the second front cover 541, and the second frontal upper portion 541b and the second frontal lower portion 541c may be formed to be bent on both sides of the second frontal central portion 541a.

The second rear cover 542 may include a second rear central portion 542a, a second rear upper portion 542b, and a second rear lower portion 542c. The second rear central portion 542a may be a central portion of the second rear cover 542, and the second rear upper portion 542b and the second rear lower portion 542c may be formed to be bent on both sides of the second rear central portion 542a.

The second front cover 541 and the second rear cover 542 may respectively include holes 543 and 544 formed therein to penetrate through the second front cover 531 and the second rear cover 532, and the second shaft 521, which forms the rotational axis S2 of the second wheel 520, may be inserted into the holes 543 and 544 to be coupled thereto. The second shaft 521, which forms the rotational axis S2 of the second wheel 520, may be inserted into the holes 543 and 544 of the second front cover 541 and the second rear cover 542 and then may be fixed to the second bracket 540 by a welding process. By doing so, the second wheel 520 may be coupled to the second bracket 540.

The second bracket 540 may include a second spaced portion 540a, a second upper contact portion 540b, and a second lower contact portion 540c.

The second spaced portion 540a may be a central portion of the second bracket 540, and may be a portion that is formed as the second front cover 541 and the second rear cover 542 are spaced apart from each other. The second wheel 520 may be received in the second spaced portion 540a within the second bracket 540.

As described in detail above, when the second wheel 520 includes the second rotation part 524 and the second rubber cap 523, the thickness d1 of the second rubber cap 523 in the direction of the rotational axis S2 of the second wheel 520 may be smaller than the thickness d2 of the second rotation part 524 in the direction of the rotational axis S2. That is, the second rotation part 524 may protrude more than the second rubber cap 523 in the third direction (Z direction) and in the direction opposite to the third direction (Z direction).

Accordingly, when the second wheel 520 rotates while received within the second bracket 540, the second rubber cap 523 may not come into contact with inner surfaces of the second front cover 541 and the second rear cover 542 even when the second rotation part 524 comes into contact with the inner surfaces of the second front cover 541 and the second rear cover 542. Accordingly, the second wheel 520 may smoothly rotate within the second bracket 540 with the help of the second rotation part 524, which serves as a lubricant, and an outer circumferential surface of the second rubber cap 523 may come into contact with the second rolling surface 267 without slipping.

The second upper contact portion 540b and the second lower contact portion 540c may be portions of the second bracket 530 that are formed on both sides of the second spaced portion 540a, and may be portions at which the second front cover 541 and the second rear cover 542 come into close contact with each other. At the second upper contact portion 540b and the second lower contact portion 540c, the second front cover 541 and the second rear cover 542 may be welded to each other.

The second coupling groove 222 may be formed in the second side edge portion 220 in the shape of a concave groove that is dented inward from an outside of the second side edge portion 210. The second coupling groove 222 may be formed at a foremost portion of the second side edge portion 220 with respect to the first direction (X direction), or may be formed at a portion of the second side edge portion 220 that is adjacent to the foremost portion of the second side edge portion 210.

The second coupling groove 222 may include a second reception portion 222a and a second insertion portion 222b.

The second reception portion 222a may be a central portion of the second coupling groove 222, and may be a portion in which the second wheel 520 and the second spaced portion 540a of the second bracket 540 are positioned.

The second insertion portion 222b may be a portion that is formed on both sides of the second reception portion 222a. The second insertion portion 222b may be formed in the shape of a narrow slit in the second side edge portion 220 along the second direction (Y direction). The second upper contact portion 540b and the second lower contact portion 540c of the second bracket 540 may be fittingly inserted into the second insertion portion 222b. The second upper contact portion 540b and the second lower contact portion 540c of the second bracket 540 may be forcibly inserted into the second insertion portion 222b.

When the second wheel 520 is coupled to the second side edge portion 220, the lateral surface of the second wheel 520 may protrude slightly more than an outer side surface 221 of the second side edge portion 220. That is, the lateral surface of the second wheel 520 may protrude more than the outer side surface 221 of the second side edge portion 220 in the second contact direction CD2, and thus the second wheel 520 may come into contact with the second rolling surface 267 of the second body 200b.

The first bracket 530 and the second bracket 540 may be symmetrical to each other about the reference surface CS, and the first coupling groove 212 and the second coupling groove 222 may be symmetrical to each other about the reference surface CS.

FIG. 14 is a perspective view illustrating a state in which the first wheel 510 and the first bracket 530 (or the second wheel 520 and the second bracket 540) are decoupled from each other according to an embodiment of the present disclosure.

The flexible display device 1 may include a first guide ring 515 and a second guide ring 525.

The first guide ring 515 may be formed in the shape of a circular ring, and an inner diameter of the first guide ring 515 may be the same as or slightly greater than a diameter of the first shaft 511, which forms the rotational axis S1 of the first wheel 510. The first guide ring 515 may be placed on the first shaft 511, which forms the rotational axis S1 of the first wheel 510, and may be interposed between the first wheel 510 and the first bracket 530.

An outer diameter of the first guide ring 515 may be sufficiently small compared to an inner diameter of the first rubber cap 513. The outer diameter of the first guide ring 515 may be smaller than an outer diameter of the inner ring 512a of the first bearing 512.

The first guide ring 515 may be a pair of first guide rings 515, and the pair of first guide rings 515 may be coupled to the first wheel 510 on both sides thereof. That is, any one of the pair of first guide rings 515 may be interposed between the first front cover 531 and the first wheel 510, and the other of the pair of first guide rings 515 may be interposed between the first rear cover 532 and the first wheel 510.

The first guide ring 515 may prevent a front surface and a rear surface (or a top surface and a bottom surface) of the first wheel 510 from coming into direct contact with an inner surface of the first bracket 530, and may help the first wheel 510 smoothly rotate within the first bracket 530.

In particular, the first guide ring 515 may prevent the first rubber cap 513 from coming into direct contact with inner surfaces of the first front cover 531 and the first rear cover 532. Accordingly, the first wheel 510 may smoothly rotate within the first bracket 530, and the outer circumferential surface of the first rubber cap 513 may come into contact with the first rolling surface 257 without slipping.

The second guide ring 525 may be formed in the shape of a circular ring, and an inner diameter of the second guide ring 515 may be the same as or slightly greater than a diameter of the second shaft 521, which forms the rotational axis S2 of the second wheel 520. The second guide ring 525 may be placed on the second shaft 521, which forms the rotational axis S2 of the second wheel 520, and may be interposed between the second wheel 520 and the second bracket 540.

An outer diameter of the second guide ring 525 may be sufficiently small compared to an inner diameter of the second rubber cap 523. The outer diameter of the second guide ring 525 may be smaller than an outer diameter of the inner ring 522a of the second bearing 522.

The second guide ring 525 may be a pair of second guide rings 525, and the pair of second guide rings 525 may be coupled to the second wheel 520 on both sides thereof. That is, any one of the pair of second guide rings 525 may be interposed between the second front cover 541 and the second wheel 520, and the other of the pair of second guide rings 525 may be interposed between the second rear cover 542 and the second wheel 520.

The second guide ring 525 may prevent a front surface and a rear surface (or a top surface and a bottom surface) of the second wheel 520 from coming into direct contact with an inner surface of the second bracket 540, and may help the second wheel 520 smoothly rotate within the second bracket 540.

In particular, the second guide ring 525 may prevent the second rubber cap 523 from coming into direct contact with inner surfaces of the second front cover 541 and the second rear cover 542. Accordingly, the second wheel 520 may smoothly rotate within the second bracket 540, and the outer circumferential surface of the second rubber cap 523 may come into contact with the second rolling surface 267 without slipping.

FIGS. 15a and 15b are views for explaining the coupling relationship and working relationship between the first wheel 510, the second wheel 520, a third wheel 550, a fourth wheel 560, a first outer rail 610, a second outer rail 620, a first inner rail 630, and a second inner rail 640. FIG. 15a schematically illustrates the flexible display device 1 in the first state, and FIG. 15b schematically illustrates the flexible display device 1 in the second state.

FIG. 16a is a cross-sectional view of the flexible display device 1 of FIG. 15a taken along the line B to B', and FIG. 16b is a cross-sectional view of the flexible display device of FIG. 15b taken along the line C to C'.

FIG. 17a illustrates the first wheel 510, the third wheel 550, the first outer rail 610, and the first inner rail 630 of the flexible display device 1 in the first state, FIG. 17b illustrates the second wheel 520, the fourth wheel 560, the second outer rail 620, and the second inner rail 640 of the flexible display device 1 in the first state, FIG. 17c illustrates the first wheel 510, the third wheel 550, the first outer rail 610, and the first inner rail 630 of the flexible display device 1 in the second state, and FIG. 17d illustrates the second wheel 520, the fourth wheel 560, the second outer rail 620, and the second inner rail 640 of the flexible display device 1 in the second state. In FIGS. 17a and 17c, the first inner rail 630 is illustrated in broken lines, and in FIGS. 17b and 17d, the second inner rail 640 is illustrated in broken lines.

In an embodiment, the flexible display device 1 may include a first outer rail 610 and a second outer rail 620.

The first outer rail 610 may be located further outside than the first wheel 510.

The first outer rail 610 may be formed to extend in the first direction (X direction). A length of the first outer rail 610 in the first direction (X direction) may be sufficiently greater than a diameter of the first wheel 510. The length of the first outer rail 610 in the first direction (X direction) may be greater than the movement distance of the second body 200b from the first position to the second position.

A first outer rolling groove 611 may be formed on an inner surface of the first outer rail 610 to be parallel to the first direction (X direction). The first outer rolling groove 611 may be formed in the shape of a concave groove such that a portion of the lateral surface of the first wheel 510 is received in the first outer rolling groove 611 and comes into contact therewith. The first outer rolling groove 611 may be formed to extend in the first direction (X direction), and may have a constant cross section along the first direction (X direction).

The first outer rolling groove 611 may be formed to extend in the first direction (X direction). A length of the first outer rolling groove 611 in the first direction (X direction) may be the same as or greater than the movement distance of the second body 200b from the first position to the second position.

In an embodiment, the first outer rail 610 may be formed integrally with the third side edge portion 250. That is, the first outer rail 610 may form a portion of the third side edge portion 250.

In another embodiment, the first outer rail 610 may be fixedly coupled to the third side edge portion 250.

The second outer rail 620 may be located further outside than the second wheel 520.

In the flexible display device 1, each component may be arranged such that the first wheel 510 and the second wheel 520 are positioned between the first outer rail 610 and the second outer rail 620.

The second outer rail 620 may be formed to extend in the first direction (X direction). A length of the second outer rail 620 in the first direction (X direction) may be sufficiently greater than a diameter of the second wheel 520. The length of the second outer rail 620 in the first direction (X direction) may be greater than the movement distance of the second body 200b from the first position to the second position.

A second outer rolling groove 621 may be formed on an inner surface of the second outer rail 620 to be parallel to the first direction (X direction). The second outer rolling groove 621 may be formed in the shape of a concave groove such that a portion of the lateral surface of the second wheel 520 is received in the second outer rolling groove 621 and comes into contact therewith. The second outer rolling groove 621 may be formed to extend in the first direction (X direction), and may have a constant cross section along the first direction (X direction).

The second outer rolling groove 621 may be formed to extend in the first direction (X direction). A length of the second outer rolling groove 621 in the first direction (X direction) may be the same as or greater than the movement distance of the second body 200b from the first position to the second position.

In an embodiment, the second outer rail 620 may be formed integrally with the fourth side edge portion 260. That is, the second outer rail 620 may form a portion of the fourth side edge portion 260.

In another embodiment, the second outer rail 620 may be fixedly coupled to the fourth side edge portion 260.

In an embodiment, the flexible display device 1 may further include a first inner rail 630 and a second inner rail 640. Also, the flexible display device 1 may further include a third wheel 550 and a fourth wheel 560.

The first inner rail 630 may be located further inside than the first wheel 510.

The first inner rail 630 may be formed to extend in the first direction (X direction). A length of the first inner rail 630 in the first direction (X direction) may be sufficiently greater than the diameter of the first wheel 510. The length of the first inner rail 630 in the first direction (X direction) may be greater than the movement distance of the second body 200b from the first position to the second position.

A first inner rolling groove 631 may be formed on an outer surface of the first inner rail 630 to be parallel to the first direction (X direction). The first inner rolling groove 631 may be formed in the shape of a concave groove such that a portion of the lateral surface of the first wheel 510 and/or a portion of a lateral surface of the third wheel 550 is received in the first inner rolling groove 631 and comes into contact therewith. The first inner rolling groove 631 may be formed to extend in the first direction (X direction), and may have a constant cross section along the first direction (X direction).

The first inner rolling groove 631 may be formed to extend in the first direction (X direction). A length of the first inner rolling groove 631 in the first direction (X direction) may be the same as or greater than the movement distance of the second body 200b from the first position to the second position.

In an embodiment, the first inner rail 630 may be formed integrally with the first side edge portion 210. That is, the first inner rail 630 may form a portion of the first side edge portion 210.

In another embodiment, the first inner rail 630 may be formed independently from the first side edge portion 210, and may be fixedly coupled to the first side edge portion 210.

The second inner rail 640 may be located further inside than the second wheel 520.

In the flexible display device 1, each component may be arranged such that the first inner rail 630 and the second inner rail 640 are positioned between the first wheel 510 and the second wheel 520.

The second inner rail 640 may be formed to extend in the first direction (X direction). A length of the second inner rail 640 in the first direction (X direction) may be sufficiently greater than the diameter of the second wheel 520. The length of the second inner rail 640 in the first direction (X direction) may be greater than the movement distance of the second body 200b from the first position to the second position.

A second inner rolling groove 641 may be formed on an outer surface of the second inner rail 640 to be parallel to the first direction (X direction). The second inner rolling groove 641 may be formed in the shape of a concave groove such that a portion of the lateral of the second wheel 520 and/or a portion of a lateral of the fourth wheel 560 is received in the second inner rolling groove 641 and comes into contact therewith. The second inner rolling groove 641 may be formed to extend in the first direction (X direction), and may have a constant cross section along the first direction (X direction).

The second inner rolling groove 641 may be formed to extend in the first direction (X direction). A length of the second inner rolling groove 641 in the first direction (X direction) may be the same as or greater than the movement distance of the second body 200*b* from the first position to the second position.

In an embodiment, the second inner rail 640 may be formed integrally with the second side edge portion 220. That is, the second inner rail 640 may form a portion of the second side edge portion 220.

In another embodiment, the second inner rail 640 may be formed independently from the second side edge portion 220, and may be fixedly coupled to the second side edge portion 220.

The third wheel 550 may be positioned further behind the first wheel with respect to the first direction (X direction).

The third wheel 550 may be rotatably coupled to the third side edge portion 250. Accordingly, when the second body 200*b* moves between the first position and the second position, a distance between the first wheel 510 and the third wheel 550 may change. When the second body 200*b* is in the first position, the distance between the first wheel 510 and the third wheel 550 may be greatest, and when the second body 200*b* is in the second position, the distance between the first wheel 510 and the third wheel 550 may be smallest.

The third wheel 550 may include a third shaft 551 and a third bearing 552.

The third shaft 551 may form a rotational axis of the third wheel 550, and may be formed to extend along the third direction (Z direction). The third shaft 551 may be fixed to the third side edge portion 250.

The third bearing 552 may be rotatably coupled to the third shaft 551.

The third bearing 552 may be formed in the shape of a general bearing. For example, the third bearing 552 may include an inner ring 552*a*, an outer ring 552*b*, and a plurality of balls 552*c*.

The fourth wheel 560 may be positioned further behind the second wheel 520 with respect to the first direction (X direction).

The fourth wheel 560 may be rotatably coupled to the fourth side edge portion 260. Accordingly, when the second body 200*b* moves between the first position and the second position, a distance between the second wheel 520 and the fourth wheel 560 may change. When the second body 200*b* is in the first position, the distance between the second wheel 520 and the fourth wheel 560 may be greatest, and when the second body 200*b* is in the second position, the distance between the second wheel 520 and the fourth wheel 560 may be smallest.

The fourth wheel 560 may include a fourth shaft 561 and a fourth bearing 562.

The fourth shaft 561 may form a rotational axis of the fourth wheel 560, and may be formed to extend along the third direction (Z direction). The fourth shaft 561 may be fixed to the fourth side edge portion 260.

The fourth bearing 562 may be rotatably coupled to the fourth shaft 561.

The fourth bearing 562 may be formed in the shape of a general bearing. For example, the fourth bearing 562 may include an inner ring 562*a*, an outer ring 562*b*, and a plurality of balls 562*c*.

In the flexible display device 1, each component may be arranged such that the first inner rail 630 and the second inner rail 640 are positioned between the third wheel 550 and the fourth wheel 560.

The third wheel 550 may come into contact with the first inner rolling groove 631. The fourth wheel 560 may come into contact with the second inner rolling groove 641.

In an embodiment, the first wheel 510 may be inserted into the first inner rolling groove 631 and come into contact therewith, and the second wheel 520 may be inserted into the second inner rolling groove 641 and come into contact therewith.

In an embodiment, the third wheel 550 may be inserted into the first outer rolling groove 611 and come into contact therewith, and the fourth wheel 560 may be inserted into the second outer rolling groove 621 and come into contact therewith.

In an embodiment, the first wheel 510 and the second wheel 520 may be provided as a pair of first wheels 510 and a pair of second wheels 520.

In an embodiment, the pair of first wheels 510 and the pair of second wheels 520 may be symmetrical to each other, the first outer rail 610 and the second outer rail 620 may be symmetrical to each other, the first inner rail 630 and the second inner rail 640 may be symmetrical to each other, and the third wheel 550 and the fourth wheel 560 may be symmetrical to each other, about the reference surface CS.

In an embodiment, a longitudinal section of each of the first wheel 510, the second wheel 520, the third wheel 550, and the fourth wheel 560 may have a rhombus shape. In some embodiments, a longitudinal cross-section of a lateral surface of each of the first wheel 510, the second wheel 520, the third wheel 550, and the fourth wheel 560 may have a shape of an isosceles triangle that is rotationally symmetrical about each of the rotational axis. In some embodiments, a radially outer surface of each of the first wheel 510, the second wheel 520, the third wheel 550, and the fourth wheel 560 may have a V-shaped convex cross section. Each of the first outer rolling groove 611 and the first inner rolling groove 631 may have a V-shaped concave cross section corresponding to the radially outer surface of the first wheel 510 or the third wheel 550, and each of the second outer rolling groove 621 and the second inner rolling groove 641 may have a V-shaped concave cross section corresponding to the radially outer surface of the second wheel 520 or the fourth wheel 560. A cross section of each of the first outer rolling groove 611, the second outer rolling groove 621, the first inner rolling groove 631, and the second inner rolling groove 641 cut along the first direction (X direction) may have a triangular shape (see FIGS. 16*a* and 16*b*).

Accordingly, the first wheel 510 may come into contact with the first outer rolling groove 611 at two points, and the first wheel 510 may come into contact with the first inner rolling groove 631 at two points.

Here, a direction of a force applied from the first wheel 510 to the first outer rolling groove 611 and a direction of a force applied from the first wheel 510 to the first inner rolling groove 631 may be, respectively, inclined directions (with respect to the second direction (Y direction) or the third direction (Z direction)), and may be symmetrical to each other about the reference surface CS. Also, a direction of a force applied from the first outer rolling groove 611 to the first wheel 510 and a direction of a force applied from the first inner rolling groove 631 to the first wheel 510 may be, respectively, inclined directions (with respect to the second direction (Y direction) or the third direction (Z direction)), and may be symmetrical to each other about the reference surface CS.

Also, the second wheel 520 may come into contact with the second outer rolling groove 621 at two points, and the second wheel 520 may come into contact with the second inner rolling groove 641 at two points.

Here, a direction of a force applied from the second wheel 520 to the second outer rolling groove 621 and a direction of a force applied from the second wheel 520 to the second inner rolling groove 641 may be, respectively, inclined directions (with respect to the second direction (Y direction) or the third direction (Z direction)), and may be symmetrical to each other about the reference surface CS. Also, a direction of a force applied from the second outer rolling groove 621 to the second wheel 520 and a direction of a force applied from the second inner rolling groove 641 to the second wheel 520 may be, respectively, inclined directions (with respect to the second direction (Y direction) or the third direction (Z direction)), and may be symmetrical to each other about the reference surface CS.

Further, the third wheel 550 may come into contact with the first inner rolling groove 631 at two points, and the third wheel 550 may come into contact with the first outer rolling groove 611 at two points.

Here, a direction of a force applied from the third wheel 550 to the first inner rolling groove 631 and a direction of a force applied from the third wheel 550 to the first outer rolling groove 611 may be, respectively, inclined directions (with respect to the second direction (Y direction) or the third direction (Z direction)), and may be symmetrical to each other about the reference surface CS. Also, a direction of a force applied from the first inner rolling groove 631 to the third wheel 550 and a direction of a force applied from the first outer rolling groove 611 to the third wheel 550 may be, respectively, inclined directions (with respect to the second direction (Y direction) or the third direction (Z direction)), and may be symmetrical to each other about the reference surface CS.

Also, the fourth wheel 560 may come into contact with the second inner rolling groove 641 at two points, and the fourth wheel 560 may come into contact with the second outer rolling groove 621 at two points.

Here, a direction of a weight applied as the fourth wheel 560 and the second inner rolling groove 641 communicate with each other and a direction of a weight applied as the fourth wheel 560 and the second outer rolling groove 621 communicate with each other may be, respectively, inclined directions (with respect to the second direction (Y direction) or the third direction (Z direction)), and may be symmetrical to each other about the reference surface CS.

Accordingly, friction occurring between each of the first wheel 510, the second wheel 520, the third wheel 550, and the fourth wheel 560 and each of the first outer rolling groove 611, the second outer rolling groove 621, the first inner rolling groove 631, and the second inner rolling groove 641 may be significantly small or relatively small, and relative movement therebetween may be stably made.

In the flexible display device 1, the first body 200a and the second body 200b may be connected to each other by means of the first wheel 510 and the second wheel 520 (or by the first wheel 510, the second wheel 520, the third wheel 550, and the fourth wheel 560). When the first body 200a and the second body 200b move relative to each other, the connection between the first body 200a and the second body 200b may be made by means of the first wheel 510 and the second wheel 520 (or by the first wheel 510, the second wheel 520, the third wheel 550, and the fourth wheel 560).

Accordingly, a weight applied by the first body 200a may be transferred to the second body 200b through the first wheel 510 and the second wheel 520 (or by the first wheel 510, the second wheel 520, the third wheel 550, and the fourth wheel 560), and a weight applied by the second body 200b may be transferred to the first body 200a through the first wheel 510 and the second wheel 520 (or by the first wheel 510, the second wheel 520, the third wheel 550, and the fourth wheel 560).

When the first body 200a and the second body 200b move relative to each other, the first wheel 510 and the second wheel 520 (or by the first wheel 510, the second wheel 520, the third wheel 550, and the fourth wheel 560) may move by rolling, wherein the first wheel 510 and the second wheel 520 (or by the first wheel 510, the second wheel 520, the third wheel 550, and the fourth wheel 560) may be prevented from slipping, and an occurrence of friction (i.e., kinetic friction) may be minimized.

The first wheel 510, the first outer rail 610, the second wheel 520, and the second outer rail 620 may block movement of the second body 200b relative to the first body 200a in a direction other than the first direction (X direction) and the direction opposite to the first direction (X direction) while guiding movement of the second body 200b relative to the first body 200a in the first direction (X direction) or in the direction opposite to the first direction (X direction). Accordingly, the second body 200b may be moved relative to the first body 200a accurately in an intended direction without tilting, and thus an unintended deformation of the flexible display 300 may be prevented from occurring.

Also, the first wheel 510, the first outer rail 610, the second wheel 520, the second outer rail 620, the third wheel 550, the first inner rail 630, the fourth wheel 560, and the second inner rail 640 may block movement of the second body 200b relative to the first body 200a in a direction other than the first direction (X direction) and the direction opposite to the first direction (X direction) while guiding movement of the second body 200b relative to the first body 200a in the first direction (X direction) or in the direction opposite to the first direction (X direction). Accordingly, the second body 200b may be moved relative to the first body 200a accurately in an intended direction without tilting, and thus an unintended deformation of the flexible display 300 may be prevented from occurring.

FIGS. 18a and 18b are views for explaining the coupling relationship and working relationship between the first body 200a, the second body 200b, and an actuator 700. FIG. 18a schematically illustrates the flexible display device 1 in the first state, and FIG. 18b schematically illustrates the flexible display device 1 in the second state.

In an embodiment, the flexible display device 1 may further include an actuator 700.

The actuator 700 may be formed along a surface that is parallel to the first region 310, and may be formed in a curved shape. The actuator 700 may be formed such that a thickness or width thereof in the third direction (Z direction) is relatively very small, and may prevent the flexible display device 1 from being relatively thick in the third direction (Z direction).

The actuator 700 may include a first end portion 710, a second end portion 720, and an elastically deformed portion 730.

The first end portion 710, which is one end of the actuator 700, may be rotatably coupled to the first body 200a, and the second end portion 720, which is the other end of the actuator 700, may be rotatably coupled to the second body 200b. The elastically deformed portion 730 may connect the first end portion 710 and the second end portion 720, wherein the first end portion 710, the second end portion 720, and the elastically deformed portion 730 may be integrally formed.

The actuator 700 may be made of a metal material, may be formed in the shape of, for example, a spring, and may be elastically deformed.

The actuator 700 may be coupled to the first body 200a and the second body 200b, with the elastically deformed portion 730 of the actuator 700 being elastically deformed. That is, when the second body 200b is in the first position (i.e., when the flexible display device 1 is in the first state), the elastically deformed portion 730 of the actuator 700 may be elastically deformed (for example, when the flexible display device 1 is in the first state, elastic energy stored in the elastically deformed portion 730 of the actuator 700 is E1), and when the second body 200b is in the second position (i.e., when the flexible display device 1 is in the second state), the elastically deformed portion 730 of the actuator 700 may be elastically deformed (for example, when the flexible display device 1 is in the second state, elastic energy stored in the elastically deformed portion 730 of the actuator 700 is E2).

A degree of elastic deformation of the elastically deformed portion 730 of the actuator 700 measured when the second body 200b is between the first position and the second position (that is, between the first state and the second state of the flexible display device 1) may be greater than a degree of elastic deformation of the elastically deformed portion 730 of the actuator 700 measured when the second body 200b is in the first position or the second position. That is, elastic energy E3 stored in the actuator 700 while the flexible display device 1 is in a state between the first state and the second state may be greater than E1 and E2.

In the following description, it is assumed that an external force is applied to the second body 200b to move the second body 200b from the first position to the second position, and then the external force is removed.

Here, the actuator 700 may be deformed such that the elastic energy of the actuator 700 increases from E1 to Ex1, wherein when Ex1 is smaller than E3, the second body 200b may move back to the first position semi-automatically.

On the contrary, when Ex1 increases to be as great as E3, which is a threshold value, the second body 200b may move to the second position semi-automatically.

In the following description, it is assumed that an external force is applied to the second body 200b to move the second body 200b from the second position to the first position, and then the external force is removed.

Here, the actuator 700 may be deformed such that the elastic energy of the actuator 700 increases from E2 to Ex2, wherein when Ex2 is smaller than E3, the second body 200b may move back to the second position semi-automatically.

On the contrary, when Ex2 increases to be as great as E3, which is the threshold value, the second body 200b may move to the first position semi-automatically.

In an embodiment, the actuator 700 may be provided as a pair of actuators 700, and the pair of actuators 700 may be symmetrical to each other about the reference surface CS.

While specific exemplary embodiments of the present disclosure have been described above and illustrated, it will be understood by those skilled in the art that the present disclosure is not limited to the described exemplary embodiments, and various changes and modifications may be made to the present disclosure without departing from the spirit and the scope of the present disclosure. Therefore, the scope of the present disclosure is not limited to the above-described exemplary embodiments, but shall be defined by the technical thought as recited in the following claims.

INDUSTRIAL APPLICABILITY

The flexible display device according to the embodiments of the present disclosure may include a first wheel, a second wheel, a first rolling surface, and a second rolling surface, which facilitate sliding movement between the first body and the second body, wherein slip and friction occurring between the first wheel and the first rolling surface and between the second wheel and the second rolling surface may be minimized. Accordingly, the flexible display device may be smoothly and stably operated (or deformed), and the flexible display may be stably deformed. In this regard, the present disclosure has high industrial applicability.

What is claimed is:

1. A flexible display device comprising:
   a first body;
      a second body configured to move in a first direction or in a direction opposite to the first direction with respect to the first body;
      a flexible display comprising:
   a first region fixed to the first body and having a planar surface parallel to the first direction; and
   a second region extending from the first region and configured to be curved around an edge of the device, wherein a portion of the second region that is coplanar with the first region increases as the second body moves in the first direction with respect to the first body;
      a first wheel coupled to the first body and configured to contact a first rolling surface of the second body in a first contact direction perpendicular to the first direction; and
      a second wheel coupled to the first body and configured to contact a second rolling surface of the second body in a second contact direction perpendicular to the first direction,
   wherein the first contact direction and the second contact direction are symmetrical to each other about a reference surface that bisects the first body and the second body along a line parallel to the first direction.

2. The flexible display device of claim 1, wherein a rotational axis of the first wheel and a rotational axis of the second wheel are orthogonal to the planar surface of the first region.

3. The flexible display device of claim 1,
   wherein the first wheel comprises:
      a first shaft forming a rotational axis of the first wheel;
      a first bearing rotatably coupled to the first shaft; and
      a first rubber cap made of a rubber material and fixedly coupled to an outer circumferential surface of the first bearing to form an outer circumferential surface of the first wheel, and
   wherein the second wheel comprises:
      a second shaft forming a rotational axis of the second wheel;
      a second bearing rotatably coupled to the second shaft; and
      a second rubber cap made of a rubber material and fixedly coupled to an outer circumferential surface of the second bearing to form an outer circumferential surface of the second wheel.

4. The flexible display device of claim 1,
wherein the first wheel comprises:
a first shaft forming a rotational axis of the first wheel;
a first rotation part made of an engineering plastic having lubricity, the first rotation part being rotatably coupled to the first shaft; and
a first rubber cap made of a rubber material, fixedly coupled to an outer circumferential surface of the first rotation part to form an outer circumferential surface of the first wheel, and formed to have a thickness in a direction of the rotational axis of the first wheel that is smaller than a thickness of the first rotation part in the direction of the rotational axis of the first wheel, and
wherein the second wheel comprises:
a second shaft forming a rotational axis of the second wheel;
a second rotation part made of an engineering plastic having lubricity, the second rotation part being rotatably coupled to the second shaft; and
a second rubber cap made of a rubber material, fixedly coupled to an outer circumferential surface of the second rotation part to form an outer circumferential surface of the second wheel, and formed to have a thickness in a direction of the rotational axis of the second wheel that is smaller than a thickness of the second rotation part in the direction of the rotational axis of the second wheel.

5. The flexible display device of claim 1, wherein:
the first body includes a first side edge portion and a second side edge portion which are parallel to the first direction;
the second body includes a third side edge portion and a fourth side edge portion which are respectively positioned further laterally outward than the first side edge portion and the second side edge portion;
the first wheel is rotatably fixed to the first side edge portion,
the second wheel is rotatably fixed to the second side edge portion,
the first rolling surface corresponds to an inner surface of the third side edge portion, and
the second rolling surface corresponds to an inner surface of the fourth side edge portion.

6. The flexible display device of claim 5, comprising:
a first coupling groove formed at the first side edge portion;
a second coupling groove formed at the second side edge portion;
a first bracket configured to receive the first wheel such that both end portions of a first shaft, which forms a rotational axis of the first wheel, are fixed, wherein the first bracket is configured to be fixed in the first coupling groove; and
a second bracket configured to receive the second wheel such that both end portions of a second shaft, which forms a rotational axis of the second wheel, are fixed, wherein the second bracket is configured to be fixed in the second coupling groove.

7. The flexible display device of claim 6, further comprising:
a first guide ring placed on the first shaft and interposed between the first wheel and the first bracket; and
a second guide ring placed on the second shaft and interposed between the second wheel and the second bracket.

8. The flexible display device of claim 1, wherein:
the second body further comprises a support extending along a second direction orthogonal to the first direction;
the second body is configured to move between a first position and a second position with respect to the first body;
the second region includes a first connected region extending from the first region and a second connected region extending from the first connected region;
when the second body is in the first position, at least a portion of the first connected region is curved around the support and a planar surface of the second connected region is spaced apart and parallel to the planar surface of the first region, and
when the second body is in the second position, the first connected region is coplanar with the first region and at least a portion of portion of the second connected region is curved around the support.

9. The flexible display device of claim 8, wherein the support is configured to be rotatable about a rotational axis formed along the second direction.

10. The flexible display device of claim 8, wherein each of the first wheel and the second wheel is fixed at an end of the first body positioned closest to the support with respect to the first direction.

11. A flexible display device comprising:
a first body comprising a first side edge portion and a second side edge portion formed along a first direction;
a second body configured to move in the first direction or in a direction opposite to the first direction with respect to the first body, wherein the second body comprises a third side edge portion and a fourth side edge portion formed along the first direction;
a flexible display comprising:
a first region fixed to the first body and having a planar surface parallel to the first direction; and
a second region extending from the first region and configured to be curved around an edge of the device, wherein a portion of the second region is coplanar with the first region increases as the second body moves in the first direction with respect to the first body;
a first outer rail positioned at the third side edge portion and comprising a first outer rolling groove formed at an inwardly facing surface of the first outer rail to be parallel to the first direction;
a second outer rail positioned at the fourth side edge portion and comprising a second outer rolling groove formed at an inwardly facing surface of the second outer rail to be parallel to the first direction;
a first wheel coupled to the first side edge portion and configured to contact the first outer rolling groove; and
a second wheel coupled to the second side edge portion and configured to contact the second outer rolling groove.

12. The flexible display device of claim 11, further comprising:
a first inner rail positioned at the first side edge portion and comprising a first inner rolling groove formed at an outwardly facing surface of the first inner rail to be parallel to the first direction; and
a second inner rail positioned at the second side edge portion and comprising a second inner rolling groove formed at an outwardly facing surface of the second inner rail to be parallel to the first direction, wherein the first wheel is further configured to contact the first inner rolling groove and the second wheel is further configured to contact the second inner rolling groove.

13. The flexible display device of claim 11, further comprising:
   a first inner rail positioned at the first side edge portion and comprising a first inner rolling groove formed at an outwardly facing surface of the first inner rail to be parallel to the first direction;
   a second inner rail positioned at the second side edge portion and comprising a second inner rolling groove formed at an outwardly facing surface of the second inner rail to be parallel to the first direction;
   a third wheel coupled to the third side edge portion and configured to contact the first inner rolling groove; and
   a fourth wheel coupled to the fourth side edge portion and configured to contact the second inner rolling groove.

14. The flexible display device of claim 13, wherein the first wheel is configured to contact the first inner rolling groove, and the second wheel is configured to contact the second inner rolling groove.

15. The flexible display device of claim 14, wherein the third wheel is configured to contact the first outer rolling groove, and the fourth wheel is configured to contact the second outer rolling groove.

16. The flexible display device of claim 12, wherein an outer surface of the each of the first wheel and the second wheel has an angular shape, and a cross-section of each of the first outer rolling groove, the second outer rolling groove, the first inner rolling groove, and the second inner rolling groove has a concave angular shape corresponding to the outer surface of the first wheel or second wheel.

17. The flexible display device of claim 15, wherein an outer surface of the each of the first wheel and the second wheel has an angular shape, and a cross-section of each of the first outer rolling groove, the second outer rolling groove, the first inner rolling groove, and the second inner rolling groove has a concave angular shape corresponding to the outer surface of the first wheel or second wheel.

18. The flexible display device of claim 15, wherein:
   the first wheel and the second wheel are provided as a pair of first wheels and a pair of second wheels, respectively, and
   the pair of first wheels and the pair of second wheels are symmetrical to each other, the first outer rail and the second outer rail are symmetrical to each other, the first inner rail and the second inner rail are symmetrical to each other, and the third wheel and the fourth wheel are symmetrical to each other, all with respect to a reference surface that bisects the first body and the second body along a line parallel to the first direction.

19. The flexible display device of claim 11, further comprising an actuator made of a metallic material and rotatably coupled to the first body at one end portion of the actuator and rotatably coupled to the second body at another end portion of the actuator,
   wherein the second body moves between a first position and a second position relative to the first body, and
   wherein a degree of elastic deformation of the actuator when the second body is between the first position and the second position is greater than a degree of elastic deformation of the actuator when the second body is in the first position or the second position.

20. The flexible display device of claim 11, comprising a plurality of support bars aligned in a second direction orthogonal to the first direction between the third side edge portion and the fourth side edge portion,
   wherein the plurality of support bars are coupled to an inwardly facing surface of the second region,
   wherein each of the plurality of support bars comprises:
      a first support slider at one end portion of the support bar;
      a second support slider at another end portion of the support bar opposite the first support slider; and
   a connection arm connecting the first support slider to the second support slider and configured to support the second region, and
   wherein the second body further comprises:
      a first movement guide groove formed as a U-shaped groove and defining a path through which the first support slider is moved; and
      a second movement guide groove formed as a U-shaped groove and defining a path through which the second support slider is moved.

* * * * *